(12) United States Patent
Al-Babili

(10) Patent No.: US 11,399,538 B2
(45) Date of Patent: Aug. 2, 2022

(54) PLANT GROWTH PROMOTER WITH STRIGOLACTONES REGULATION ACTIVITIES

(71) Applicant: King Abdullah University of Science and Technology, Thuwal (SA)

(72) Inventor: Salim Al-Babili, Thuwal (SA)

(73) Assignee: KING ABDULLAH UNIVERSITY OF SCIENCE AND TECHNOLOGY, Thuwal (SA)

(*) Notice: Subject to any disclaimer, the term of this patent is extended or adjusted under 35 U.S.C. 154(b) by 401 days.

(21) Appl. No.: 16/625,533

(22) PCT Filed: Jun. 25, 2018

(86) PCT No.: PCT/IB2018/054677
§ 371 (c)(1),
(2) Date: Dec. 20, 2019

(87) PCT Pub. No.: WO2019/003089
PCT Pub. Date: Jan. 3, 2019

(65) Prior Publication Data
US 2021/0360918 A1     Nov. 25, 2021

Related U.S. Application Data

(60) Provisional application No. 62/524,803, filed on Jun. 26, 2017.

(51) Int. Cl.
*A01N 35/02* (2006.01)
*A01P 13/02* (2006.01)

(52) U.S. Cl.
CPC .............. *A01N 35/02* (2013.01); *A01P 13/02* (2021.08)

(58) Field of Classification Search
None
See application file for complete search history.

(56) References Cited

U.S. PATENT DOCUMENTS

2003/0236166 A1* 12/2003 Smiley ................... A01N 25/02
                                                                504/136
2009/0069417 A1*  3/2009 Sharoni ................. A61K 31/203
                                                                514/762
(Continued)

FOREIGN PATENT DOCUMENTS

EP         1243178       9/2002
EP         2351484       8/2011
(Continued)

OTHER PUBLICATIONS

Abe, et al., "Carlactone is converted to carlactonoic acid by MAX1 in *Arabidopsis* and its methyl ester can directly interact with AtD14 in vitro", Proceedings of the National Academy, 111: 18084-9 (2014).

(Continued)

*Primary Examiner* — John J Figueroa
(74) *Attorney, Agent, or Firm* — Pabst Patent Group LLP

(57) ABSTRACT

The present invention uses compound 3-OH-β-apo-13-carotenone (zaxinone) as a negative regulator of the plant hormone strigolactones (SLs). The compound 3-OH-β-apo-13-carotenone is a positive growth regulator which triggers the formation of crown roots and promotes growth in size and number of roots and shoots. Disclosed herein is a method of using 3-OH-β-apo-13-carotenone as a growth-promoting compound for cereal, grain and vegetable crops. The 3-OH-β-apo-13-carotenone compounds is also a negative regulator of strigolactone biosynthesis and release. Disclosed herein is a method of combating root parasitic weeds affecting cereal, grain and vegetable crops. Application of 3-OH-β-apo-13-carotenone to plant growth media (Continued)

down-regulates strigolactone production in cereal, grain and vegetable crops preventing root parasitic weed infestation of the crops by inhibiting germination of parasitic weed seeds.

19 Claims, 59 Drawing Sheets

(56) References Cited

U.S. PATENT DOCUMENTS

| 2013/0036518 | A1* | 2/2013 | Hirschberg | C12N 15/825 536/23.1 |
|---|---|---|---|---|
| 2014/0031228 | A1* | 1/2014 | Mann | A01N 43/80 504/130 |
| 2017/0042148 | A1 | 2/2017 | Bally | |
| 2018/0184651 | A1* | 7/2018 | Al-Babili | C07C 59/90 |

FOREIGN PATENT DOCUMENTS

| WO | 2010137662 | 12/2010 | | |
|---|---|---|---|---|
| WO | 2013140946 | 9/2013 | | |
| WO | 2017001927 | 1/2017 | | |
| WO | WO-2017001927 A1 * | 1/2017 | | A01N 35/02 |

OTHER PUBLICATIONS

Akiyama, et al., "Plant sesquiterpenes induce hyphal branching in arbuscular mycorrhizal fungi", Nature, 435:824-7 (2005).

Al-Babili, et al., "Strigolactones, a novel carotenoid-derived plant hormone", Annual Review of Plant Biology, 66:161-86 (2015).

Brewer, et al., "Lateral Branching Oxidoreductase acts in the final stages of strigolactone biosynthesis *Arabidopsis*", Proceedings of the National Academy of Sciences U.S.A; 113:6301-6 (2016).

International Search Report for corresponding application PCT/IB2018/054677 dated Nov. 13, 2018.

Maoka, et al., "Isolation of a Series of apocarotenoids from the Fruits of the Red Paprika *Capsicum annuum* L.", J. of Agr. And Food Chern., 49(3):1601-1606 (2001).

Parker, "Observations of the current status of Orobanche and Striga problems worldwide", Pest Management Science, 65:453-9 (2009).

Parker, Parasitic Weeds: A World Challenge, Weed Science; 60:269-276 (2012).

Pennisi, "Armed and Dangerous", Science; 327:804-5 (2010).

Xie, et al., "The Strigolactone Story", Annual Review of Phytopathology; 48:93-117 (2010).

Zhang, et al., "Rice cytochrome p450 MAXI homologs catalyze distinct steps in strigolactone biosynthesis", Nature Chemical Biology, 10:1028-33 (2014).

* cited by examiner

Table 1. Distribution of CCD orthologues across land plants. Abreviation: SN, shortened name of the species used in phylgenetic trees of FIGS. 11C, 11D and 12A-12G. The five columns on the far right represent numbers of ZAS, NCED, CCD1, CCD4, CCD7 and CCD8 orthologues in each species' genome.

| SN | Species | RefSeq Assembly Accession | Taxon | ZAS | NECD | CCD1 | CCD4 | CCD7 | CCD8 |
|---|---|---|---|---|---|---|---|---|---|
| MOSS | | | | | | | | | |
| Ppa | Physcomiterlla patens | GCF_000002425.3 | Eukaryota; Viridiplantae; Streptophyta; Streptophytina; Embryophyta; Bryophyta; Bryophytina; Bryopsida; Funariidae; Funariales; Funariaceae; Physcomitrella | 0 | 2 | 4 | 0 | 1 | 1 |
| Mp | Marchantia polymorpha subsp. polymorpha | GCA_0016411455.1 (GenBank) | Eukaryota; Viridiplantae; Streptophyta; Streptophytina; Embryophyta; Marchantiophyta; Marchantiopsida; Marchantiidae; Marchantiales; Marchantiaceae; Marchantia; Marchantia polymorpha | 3 | 2 | 1 | 0 | 1 | 0 |
| FERN | | | | | | | | | |
| Sm | Selaginella moellendorffii | GCF_000143415.3 | Eukaryota; Viridiplantae; Streptophyta; Streptophytina; Embryophyta; Tracheophyta; Lycopodiopsida; Selaginellales; Selaginellaceae; Selaginella | 2 | 14 | 3 | 0 | 2 | 2 |
| MONOCOT | | | | | | | | | |
| Os | Oryza sativa | GCF_001433935.1 | Eukaryota; Viridiplantae; Streptophyta; Streptophytina; Embryophyta; Tracheophyta; Euphyllophyta; Spermatophyta; Magnoliophyta; Mesangiospermae; Liliopsida; Petrosaviidae; commelinids; Poales; Poaceae; BOP clade; Oryzoideae; Oryzeae; Oryzinae; Oryza | 4 | 3 | 1 | 2 | 1 | 2 |
| Zm | Zea mays | GCF_000005005.1 | Eukaryota; Viridiplantae; Streptophyta; Streptophytina; Embryophyta; Tracheophyta; Euphyllophyta; Spermatophyta; Magnoliophyta; Mesangiospermae; Liliopsida; Petrosaviidae; commelinids; Poales; Poaceae; PACMAD clade; Panicoideae; Andropogonodae; Andropogoneae; Tripsacinae; Zea | 3 | 5 | 1 | 1 | 1 | 1 |
| Ac | Ananas comosus | GCF_001540865.1 | Eukaryota; Viridiplantae; Streptophyta; Embryophyta; Tracheophyta; Spermatophyta; Magnoliophyta; Liliopsida; Poales; Bromeliaceae; Bromelioideae; Ananas | 1 | 4 | 1 | 1 | 1 | 1 |
| Ob | Oryza brachyantha | GCF_000231095.1 | Eukaryota; Viridiplantae; Streptophyta; Embryophyta; Tracheophyta; Spermatophyta; Magnoliophyta; Liliopsida; Poales; Poaceae; BOP clade; Oryzoideae; Oryzeae; Oryzinae; Oryza | 1 | 2 | 1 | 3 | 1 | 1 |
| Bd | Brachypodium distachyon | GCF_000005505.2 | Eukaryota; Viridiplantae; Streptophyta; Embryophyta; Tracheophyta; Spermatophyta; Magnoliophyta; Liliopsida; Poales; Poaceae; BOP clade; Pooideae; Brachypodieae; Brachypodium | 2 | 3 | 2 | 1 | 1 | 1 |
| Ata | Aegilops tauschii subsp. tauschii | GCF_001957025.1 | Eukaryota; Viridiplantae; Streptophyta; Embryophyta; Tracheophyta; Spermatophyta; Magnoliophyta; Liliopsida; Poales; Poaceae; BOP clade; Pooideae; Triticodae; Triticeae; Triticinae; Aegilops | 2 | 4 | 3 | 2 | 1 | 4 |
| Sb | Sorghum bicolor | GCF_000003195.2 | Eukaryota; Viridiplantae; Streptophyta; Embryophyta; Tracheophyta; Spermatophyta; Magnoliophyta; Liliopsida; Poales; Poaceae; PACMAD clade; Panicoideae; Andropogonodae; Andropogoneae; Sorghinae; Sorghum | 3 | 2 | 1 | 0 | 1 | 3 |
| Sit | Setaria italica | GCF_000263155.2 | Eukaryota; Viridiplantae; Streptophyta; Embryophyta; Tracheophyta; Spermatophyta; Magnoliophyta; Liliopsida; Poales; Poaceae; PACMAD clade; Panicoideae; Paniceae; Cenchrinae; Setaria | 0 | 3 | 1 | 1 | 1 | 2 |
| Egui | Elaeis guineensis | GCF_000442705.1 | Eukaryota; Viridiplantae; Streptophyta; Embryophyta; Tracheophyta; Spermatophyta; Magnoliophyta; Liliopsida; Arecaceae; Arecoideae; Cocoseae; Elaeidinae; Elaeis | 0 | 2 | 1 | 1 | 1 | 2 |
| Pd | Phoenix dactylifera | GCF_000413155.1 | Eukaryota; Viridiplantae; Streptophyta; Embryophyta; Tracheophyta; Spermatophyta; Magnoliophyta; Liliopsida; Arecaceae; Coryphoideae; Phoeniceae; Phoenix | 0 | 2 | 1 | 1 | 0 | 1 |
| Ao | Asparagus officinalis | GCF_001876935.1 | Eukaryota; Viridiplantae; Streptophyta; Embryophyta; Tracheophyta; Spermatophyta; Magnoliophyta; Liliopsida; Asparagales; Asparagaceae; Asparagoideae; Asparagus | 1 | 0 | 0 | 1 | 0 | 0 |
| Dcat | Dendrobium catenatum | GCF_001605985.1 | Eukaryota; Viridiplantae; Streptophyta; Embryophyta; Tracheophyta; Spermatophyta; Magnoliophyta; Liliopsida; Asparagales; Orchidaceae; Epidendroideae; Malaxideae; Dendrobiinae; Dendrobium | 1 | 2 | 1 | 1 | 3 | 0 |
| Peq | Phalaenopsis equestris | GCF_001263595.1 | Eukaryota; Viridiplantae; Streptophyta; Embryophyta; Tracheophyta; Spermatophyta; Magnoliophyta; Liliopsida; Asparagales; Orchidaceae; Epidendroideae; Vandeae; Aeridinae; Phalaenopsis | 1 | 2 | 3 | 1 | 2 | 1 |
| DICOT | | | | | | | | | |
| Bv | Beta vulgaris subsp. vulgaris | GCF_000511025.2 | Eukaryota; Viridiplantae; Streptophyta; Embryophyta; Tracheophyta; Spermatophyta; Magnoliophyta; eudicotyledons; Gunneridae; Pentapetalae; Caryophyllales; Chenopodiaceae; Betoideae; Beta | 0 | 2 | 1 | 1 | 1 | 1 |

FIG. 11A-1

| SN | Species | RefSeq Assembly Accession | Taxon | ZAS | NECD | CCD1 | CCD4 | CCD7 | CCD8 |
|---|---|---|---|---|---|---|---|---|---|
| Dcar | Daucus carota subsp. sativus | GCF_001625215.1 | Eukaryota; Viridiplantae; Streptophyta; Embryophyta; Tracheophyta; Spermatophyta; Magnoliophyta; eudicotyledons; Gunneridae; Pentapetalae; asterids; campanulids; Apiales; Apiaceae; Apioideae; Scandiceae; Daucinae; Daucus; Daucus sect. Daucus | 2 | 8 | 6 | 1 | 1 | 1 |
| Sin | Sesamum indicum | GCF_000512975.1 | Eukaryota; Viridiplantae; Streptophyta; Embryophyta; Tracheophyta; Spermatophyta; Magnoliophyta; eudicotyledons; Gunneridae; Pentapetalae; asterids; lamiids; Lamiales; Pedaliaceae; Sesamum | 2 | 2 | 2 | 7 | 1 | 2 |
| Egut | Erythranthe guttata | GCF_000504015.1 | Eukaryota; Viridiplantae; Streptophyta; Embryophyta; Tracheophyta; Spermatophyta; Magnoliophyta; eudicotyledons; Gunneridae; Pentapetalae; asterids; lamiids; Lamiales; Phrymaceae; Erythranthe | 1 | 4 | 1 | 9 | 1 | 0 |
| In | Ipomoea nil | GCF_001879475.1 | Eukaryota; Viridiplantae; Streptophyta; Embryophyta; Tracheophyta; Spermatophyta; Magnoliophyta; eudicotyledons; Gunneridae; Pentapetalae; asterids; lamiids; Solanales; Convolvulaceae; Ipomoeeae; Ipomoea | 3 | 6 | 2 | 1 | 1 | 1 |
| Na | Nicotiana attenuata | GCF_001879085.1 | Eukaryota; Viridiplantae; Streptophyta; Embryophyta; Tracheophyta; Spermatophyta; Magnoliophyta; eudicotyledons; Gunneridae; Pentapetalae; asterids; lamiids; Solanales; Solanaceae; Nicotianoideae; Nicotianeae; Nicotiana | 2 | 4 | 2 | 1 | 0 | 1 |
| Ns | Nicotiana sylvestris | GCF_000393655.1 | Eukaryota; Viridiplantae; Streptophyta; Embryophyta; Tracheophyta; Spermatophyta; Magnoliophyta; eudicotyledons; Gunneridae; Pentapetalae; asterids; lamiids; Solanales; Solanaceae; Nicotianoideae; Nicotianeae; Nicotiana | 0 | 1 | 2 | 1 | 1 | 1 |
| Nto | Nicotiana tomentosiformis | GCF_000390325.2 | Eukaryota; Viridiplantae; Streptophyta; Embryophyta; Tracheophyta; Spermatophyta; Magnoliophyta; eudicotyledons; Gunneridae; Pentapetalae; asterids; lamiids; Solanales; Solanaceae; Nicotianoideae; Nicotianeae; Nicotiana | 1 | 3 | 3 | 1 | 1 | 0 |
| Nta | Nicotiana tabacum | GCF_000715135.1 | Eukaryota; Viridiplantae; Streptophyta; Embryophyta; Tracheophyta; Spermatophyta; Magnoliophyta; eudicotyledons; Gunneridae; Pentapetalae; asterids; lamiids; Solanales; Solanaceae; Nicotianoideae; Nicotianeae; Nicotiana | 4 | 7 | 4 | 3 | 2 | 2 |
| Can | Capsicum annuum | GCF_000710875.1 | Eukaryota; Viridiplantae; Streptophyta; Embryophyta; Tracheophyta; Spermatophyta; Magnoliophyta; eudicotyledons; Gunneridae; Pentapetalae; asterids; lamiids; Solanales; Solanaceae; Solanoideae; Capsiceae; Capsicum | 1 | 3 | 2 | 2 | 1 | 1 |
| St | Solanum tuberosum | GCF_000226075.1 | Eukaryota; Viridiplantae; Streptophyta; Embryophyta; Tracheophyta; Spermatophyta; Magnoliophyta; eudicotyledons; Gunneridae; Pentapetalae; asterids; lamiids; Solanales; Solanaceae; Solanoideae; Solaneae; Solanum | 6 | 3 | 3 | 2 | 1 | 1 |
| Sp | Solanum pennellii | GCF_001406875.1 | Eukaryota; Viridiplantae; Streptophyta; Embryophyta; Tracheophyta; Spermatophyta; Magnoliophyta; eudicotyledons; Gunneridae; Pentapetalae; asterids; lamiids; Solanales; Solanaceae; Solanoideae; Solaneae; Solanum | 3 | 3 | 2 | 3 | 1 | 1 |
| Sl | Solanum lycopersicum | GCF_000188115.3 | Eukaryota; Viridiplantae; Streptophyta; Embryophytina; Streptophytina; Embryophyta; Tracheophyta; Euphyllophyta; Spermatophyta; Magnoliophyta; Mesangiospermae; eudicotyledons; Gunneridae; Pentapetalae; asterids; lamiids; Solanales; Solanaceae; Solanoideae; Solaneae; Solanum; Lycopersicon | 3 | 3 | 1 | 2 | 1 | 2 |
| Md | Malus domestica | GCF_000148765.1 | Eukaryota; Viridiplantae; Streptophyta; Embryophytina; Streptophytina; Embryophyta; Tracheophyta; Euphyllophyta; Spermatophyta; Magnoliophyta; Mesangiospermae; eudicotyledons; Gunneridae; Pentapetalae; rosids; fabids; Rosales; Rosaceae; Maloideae; Maleae; Malus | 0 | 5 | 2 | 2 | 0 | 3 |
| Cm | Cucumis melo | GCF_000313045.1 | Eukaryota; Viridiplantae; Streptophyta; Embryophyta; Tracheophyta; Spermatophyta; Magnoliophyta; eudicotyledons; Gunneridae; Pentapetalae; rosids; fabids; Cucurbitales; Cucurbitaceae; Benincaseae; Cucumis | 1 | 4 | 1 | 1 | 1 | 2 |
| Cus | Cucumis sativus | GCF_000004075.2 | Eukaryota; Viridiplantae; Streptophyta; Embryophyta; Tracheophyta; Spermatophyta; Magnoliophyta; eudicotyledons; Gunneridae; Pentapetalae; rosids; fabids; Cucurbitales; Cucurbitaceae; Benincaseae; Cucumis | 1 | 4 | 2 | 1 | 1 | 1 |
| Mt | Medicago truncatula | GCF_000219495.3 | Eukaryota; Viridiplantae; Streptophyta; Embryophytina; Streptophytina; Embryophyta; Tracheophyta; Euphyllophyta; Spermatophyta; Magnoliophyta; Mesangiospermae; eudicotyledons; Gunneridae; Pentapetalae; rosids; fabids; Fabales; Fabaceae; Papilionoideae; Trifolieae; Medicago | 1 | 1 | 4 | 3 | 1 | 2 |
| Car | Cicer arietinum | GCF_000331145.1 | Eukaryota; Viridiplantae; Streptophyta; Embryophyta; Tracheophyta; Spermatophyta; Magnoliophyta; eudicotyledons; Gunneridae; Pentapetalae; rosids; fabids; Fabales; Fabaceae; Papilionoideae; Cicereae; Cicer | 1 | 2 | 1 | 2 | 1 | 1 |

FIG. 11A-2

| SN | Species | RefSeq Assembly Accession | Taxon | ZAS | NECD | CCD1 | CCD4 | CCD7 | CCD8 |
|---|---|---|---|---|---|---|---|---|---|
| La | Lupinus angustifolius | GCF_001865875.1 | Eukaryota; Viridiplantae; Streptophyta; Embryophyta; Tracheophyta; Spermatophyta; Magnoliophyta; eudicotyledons; Gunneridae; Pentapetalae; rosids; fabids; Fabales; Fabaceae; Papilionoideae; Genisteae; Lupinus | 0 | 4 | 3 | 1 | 1 | 1 |
| Cca | Cajanus cajan | GCF_000340665.1 | Eukaryota; Viridiplantae; Streptophyta; Embryophyta; Tracheophyta; Spermatophyta; Magnoliophyta; eudicotyledons; Gunneridae; Pentapetalae; rosids; fabids; Fabales; Fabaceae; Papilionoideae; Phaseoleae; Cajanus | 2 | 2 | 3 | 1 | 1 | 1 |
| Gm | Glycine max | GCF_000004515.4 | Eukaryota; Viridiplantae; Streptophyta; Embryophyta; Tracheophyta; Spermatophyta; Magnoliophyta; eudicotyledons; Gunneridae; Pentapetalae; rosids; fabids; Fabales; Fabaceae; Papilionoideae; Phaseoleae; Glycine; Soja | 3 | 3 | 1 | 1 | 2 | 2 |
| Pv | Phaseolus vulgaris | GCF_000499845.1 | Eukaryota; Viridiplantae; Streptophyta; Embryophyta; Tracheophyta; Spermatophyta; Magnoliophyta; eudicotyledons; Gunneridae; Pentapetalae; rosids; fabids; Fabales; Fabaceae; Papilionoideae; Phaseoleae; Phaseolus | 2 | 2 | 1 | 1 | 0 | 1 |
| Va | Vigna angularis | GCF_001190045.1 | Eukaryota; Viridiplantae; Streptophyta; Embryophyta; Tracheophyta; Spermatophyta; Magnoliophyta; eudicotyledons; Gunneridae; Pentapetalae; rosids; fabids; Fabales; Fabaceae; Papilionoideae; Phaseoleae; Vigna | 2 | 2 | 1 | 1 | 1 | 1 |
| Vr | Vigna radiata var. radiata | GCF_000741045.1 | Eukaryota; Viridiplantae; Streptophyta; Embryophyta; Tracheophyta; Spermatophyta; Magnoliophyta; eudicotyledons; Gunneridae; Pentapetalae; rosids; fabids; Fabales; Fabaceae; Papilionoideae; Phaseoleae; Vigna | 2 | 2 | 1 | 1 | 1 | 1 |
| Jr | Juglans regia | GCF_001411555.1 | Eukaryota; Viridiplantae; Streptophyta; Embryophyta; Tracheophyta; Spermatophyta; Magnoliophyta; eudicotyledons; Gunneridae; Pentapetalae; rosids; fabids; Fagales; Juglandaceae; Juglans | 1 | 5 | 1 | 1 | 1 | 2 |
| Rc | Ricinus communis | GCF_000151685.1 | Eukaryota; Viridiplantae; Streptophyta; Embryophyta; Tracheophyta; Spermatophyta; Magnoliophyta; eudicotyledons; Gunneridae; Pentapetalae; rosids; fabids; Malpighiales; Euphorbiaceae; Acalyphoideae; Acalypheae; Ricinus | 1 | 3 | 1 | 1 | 1 | 1 |
| Jc | Jatropha curcas | GCF_000696525.1 | Eukaryota; Viridiplantae; Streptophyta; Embryophyta; Tracheophyta; Spermatophyta; Magnoliophyta; eudicotyledons; Gunneridae; Pentapetalae; rosids; fabids; Malpighiales; Euphorbiaceae; Crotonoideae; Jatropheae; Jatropha | 2 | 3 | 1 | 1 | 1 | 1 |
| Peu | Populus euphratica | GCF_000495115.1 | Eukaryota; Viridiplantae; Streptophyta; Embryophyta; Tracheophyta; Spermatophyta; Magnoliophyta; eudicotyledons; Gunneridae; Pentapetalae; rosids; fabids; Malpighiales; Salicaceae; Populus | 4 | 3 | 1 | 1 | 0 | 2 |
| Pt | Populus trichocarpa | GCF_000002775.3 | Eukaryota; Viridiplantae; Streptophyta; Embryophyta; Tracheophyta; Spermatophyta; Magnoliophyta; eudicotyledons; Gunneridae; Pentapetalae; rosids; fabids; Malpighiales; Salicaceae; Populus | 4 | 5 | 4 | 4 | 1 | 2 |
| Mn | Morus notabilis | GCF_000414095.1 | Eukaryota; Viridiplantae; Streptophyta; Embryophyta; Tracheophyta; Spermatophyta; Magnoliophyta; eudicotyledons; Gunneridae; Pentapetalae; rosids; fabids; Rosales; Moraceae; Morus | 3 | 3 | 3 | 1 | 1 | 0 |
| Zj | Ziziphus jujuba | GCF_000826755.1 | Eukaryota; Viridiplantae; Streptophyta; Embryophyta; Tracheophyta; Spermatophyta; Magnoliophyta; eudicotyledons; Gunneridae; Pentapetalae; rosids; fabids; Rosales; Rhamnaceae; Paliureae; Ziziphus | 1 | 3 | 1 | 1 | 1 | 1 |
| Pm | Prunus mume | GCF_000346735.1 | Eukaryota; Viridiplantae; Streptophyta; Embryophyta; Tracheophyta; Spermatophyta; Magnoliophyta; eudicotyledons; Gunneridae; Pentapetalae; rosids; fabids; Rosales; Rosaceae; Maloideae; Amygdaleae; Prunus | 1 | 3 | 1 | 1 | 1 | 1 |
| Ppe | Prunus persica | GCF_000346465.2 | Eukaryota; Viridiplantae; Streptophyta; Embryophyta; Tracheophyta; Spermatophyta; Magnoliophyta; eudicotyledons; Gunneridae; Pentapetalae; rosids; fabids; Rosales; Rosaceae; Maloideae; Amygdaleae; Prunus | 4 | 3 | 1 | 1 | 1 | 1 |
| Px | Pyrus x bretschneideri | GCF_000315295.1 | Eukaryota; Viridiplantae; Streptophyta; Embryophyta; Tracheophyta; Spermatophyta; Magnoliophyta; eudicotyledons; Gunneridae; Pentapetalae; rosids; fabids; Rosales; Rosaceae; Maloideae; Maleae; Pyrus | 1 | 4 | 2 | 2 | 0 | 1 |
| Ath | Arabidopsis thaliana | GCF_000001735.3 | Eukaryota; Viridiplantae; Streptophyta; Embryophyta; Tracheophytina; Streptophyta; Tracheophyta; Euphyllophyta; Spermatophyta; Magnoliophyta; Mesangiospermae; eudicotyledons; Gunneridae; Pentapetalae; rosids; malvids; Brassicales; Brassicaceae; Camelineae; Arabidopsis | 0 | 5 | 1 | 1 | 1 | 1 |
| Fv | Fragaria vesca | GCF_000184155.1 | Eukaryota; Viridiplantae; Streptophyta; Embryophyta; Tracheophyta; Spermatophyta; Magnoliophyta; eudicotyledons; Gunneridae; Pentapetalae; rosids; fabids; Rosales; Rosaceae; Rosoideae; Potentilleae; Fragariinae; Fragaria | 3 | 3 | 1 | 1 | 1 | 1 |

FIG. 11A-3

| SN | Species | RefSeq Assembly Accession | Taxon | ZAS | NECD | CCD1 | CCD4 | CCD7 | CCD8 |
|---|---|---|---|---|---|---|---|---|---|
| Br | Brassica rapa | GCF_000309985.1 | Eukaryota; Viridiplantae; Streptophyta; Embryophyta; Tracheophyta; Spermatophyta; Magnoliophyta; eudicotyledons; Gunneridae; Pentapetalae; rosids; malvids; Brassicales; Brassicaceae; Brassica | 0 | 8 | 2 | 2 | 1 | 1 |
| Rs | Raphanus sativus | GCF_000801105.1 | Eukaryota; Viridiplantae; Streptophyta; Embryophyta; Tracheophyta; Spermatophyta; Magnoliophyta; eudicotyledons; Gunneridae; Pentapetalae; rosids; malvids; Brassicales; Brassicaceae; Raphanus | 0 | 9 | 2 | 2 | 1 | 1 |
| Cas | Camelina sativa | GCF_000633955.1 | Eukaryota; Viridiplantae; Streptophyta; Embryophyta; Tracheophyta; Spermatophyta; Magnoliophyta; eudicotyledons; Gunneridae; Pentapetalae; rosids; malvids; Brassicales; Brassicaceae; Camelineae; Camelina | 0 | 16 | 2 | 3 | 2 | 3 |
| Cr | Capsella rubella | GCF_000375325.1 | Eukaryota; Viridiplantae; Streptophyta; Embryophyta; Tracheophyta; Spermatophyta; Magnoliophyta; eudicotyledons; Gunneridae; Pentapetalae; rosids; malvids; Brassicales; Brassicaceae; Camelineae; Capsella | 0 | 4 | 3 | 1 | 1 | 1 |
| Es | Eutrema salsugineum | GCF_000478725.1 | Eukaryota; Viridiplantae; Streptophyta; Embryophyta; Tracheophyta; Spermatophyta; Magnoliophyta; eudicotyledons; Gunneridae; Pentapetalae; rosids; malvids; Brassicales; Brassicaceae; Eutremeae; Eutrema | 0 | 4 | 1 | 1 | 1 | 1 |
| Th | Tarenaya hassleriana | GCF_000463585.1 | Eukaryota; Viridiplantae; Streptophyta; Embryophyta; Tracheophyta; Spermatophyta; Magnoliophyta; eudicotyledons; Gunneridae; Pentapetalae; rosids; malvids; Brassicales; Cleomaceae; Tarenaya | 0 | 4 | 0 | 1 | 1 | 0 |
| Tc | Theobroma cacao | GCF_000208745.1 | Eukaryota; Viridiplantae; Streptophyta; Embryophyta; Tracheophyta; Spermatophyta; Magnoliophyta; eudicotyledons; Gunneridae; Pentapetalae; rosids; malvids; Malvales; Malvaceae; Byttnerioideae; Theobroma | 2 | 3 | 1 | 5 | 1 | 1 |
| Ga | Gossypium arboreum | GCF_000612285.1 | Eukaryota; Viridiplantae; Streptophyta; Embryophyta; Tracheophyta; Spermatophyta; Magnoliophyta; eudicotyledons; Gunneridae; Pentapetalae; rosids; malvids; Malvales; Malvaceae; Malvoideae; Gossypium | 2 | 7 | 1 | 2 | 1 | 2 |
| Gr | Gossypium raimondii | GCF_000327365.1 | Eukaryota; Viridiplantae; Streptophyta; Embryophyta; Tracheophyta; Spermatophyta; Magnoliophyta; eudicotyledons; Gunneridae; Pentapetalae; rosids; malvids; Malvales; Malvaceae; Malvoideae; Gossypium | 2 | 7 | 1 | 2 | 1 | 2 |
| Gh | Gossypium hirsutum | GCF_000987745.1 | Eukaryota; Viridiplantae; Streptophyta; Embryophyta; Tracheophyta; Spermatophyta; Magnoliophyta; eudicotyledons; Gunneridae; Pentapetalae; rosids; malvids; Malvales; Malvaceae; Malvoideae; Gossypium | 3 | 13 | 2 | 2 | 2 | 4 |
| Egr | Eucalyptus grandis | GCF_000612305.1 | Eukaryota; Viridiplantae; Streptophyta; Embryophyta; Tracheophyta; Spermatophyta; Magnoliophyta; eudicotyledons; Gunneridae; Pentapetalae; rosids; malvids; Myrtales; Myrtaceae; Myrtoideae; Eucalypteae; Eucalyptus | 2 | 4 | 2 | 1 | 1 | 2 |
| Csi | Citrus sinensis | GCF_000317415.1 | Eukaryota; Viridiplantae; Streptophyta; Embryophyta; Tracheophyta; Spermatophyta; Magnoliophyta; eudicotyledons; Gunneridae; Pentapetalae; rosids; malvids; Sapindales; Rutaceae; Aurantioideae; Citrus | 1 | 3 | 2 | 2 | 1 | 2 |
| Ccl | Citrus clementina | GCF_000493195.1 | Eukaryota; Viridiplantae; Streptophyta; Embryophyta; Tracheophyta; Spermatophyta; Magnoliophyta; eudicotyledons; Gunneridae; Pentapetalae; rosids; malvids; Sapindales; Rutaceae; Aurantioideae; Citrus | 0 | 2 | 2 | 4 | 1 | 0 |
| Nn | Nelumbo nucifera | GCF_000365185.1 | Eukaryota; Viridiplantae; Streptophyta; Embryophyta; Tracheophyta; Spermatophyta; Magnoliophyta; eudicotyledons; Proteales; Nelumbonaceae; Nelumbo | 0 | 4 | 2 | 1 | 1 | 1 |
| Ma | Musa acuminata subsp. malaccensis | GCF_000313855.2 | Eukaryota; Viridiplantae; Streptophyta; Embryophyta; Tracheophyta; Spermatophyta; Magnoliophyta; Liliopsida; Zingiberales; Musaceae; Musa | 0 | 7 | 1 | 1 | 1 | 2 |
| Atr | Amborella trichopoda | GCF_000471905.2 | basal Magnoliophyta; Amborellales; Amborellaceae; Amborella | 1 | 2 | 2 | 1 | 1 | 2 |
| Vv | Vitis vinifera | GCF_000003745.3 | Eukaryota; Viridiplantae; Streptophyta; Streptophytina; Embryophyta; Tracheophyta; Euphyllophyta; Spermatophyta; Magnoliophyta; Mesangiospermae; eudicotyledons; Gunneridae; Pentapetalae; rosids; rosids incertae sedis; Vitales; Vitaceae; Vitis | 2 | 4 | 2 | 3 | 1 | 1 |

FIG. 11A-4

Table 2. Distribution of sub groups of ZAS orthologues across land plants. Abreviation: SN, shortened name of the species used in phlygenetic trees in FIGS. 11C, 11D and 12A-12G. Columns on the far right represent numbers of Group1-Group10 orthologues in each species' genome.

| SN | Species | RefSeq Assembly Accession | Taxon | Grp 1 | Grp 2 | Grp 3 | Grp 4 | Grp 5 | Grp 6 | Grp 7 | Grp 8 | Grp 9 | Grp 10 |
|---|---|---|---|---|---|---|---|---|---|---|---|---|---|
| MOSS | | | | | | | | | | | | | |
| Mp | Marchantia polymorpha subsp. polymorpha | GCA_001641455.1 (GenBank) | Eukaryota; Viridiplantae; Streptophyta; Streptophytina Embryophyta; Marchantiophyta; Marchantiopsida; Marchantiidae; Marchantiales; Marchantiaceae; Marchantia; Marchantia polymorpha | 3 | 0 | 0 | 0 | 0 | 0 | 0 | 0 | 0 | 0 |
| FERN | | | | | | | | | | | | | |
| Sm | Selaginella moellendorffii | GCF_000143415.3 | Eukaryota; Viridiplantae; Streptophyta; Streptophytina Embryophyta; Tracheophyta; Lycopodiopsida; Selaginellales; Selaginellaceae; Selaginella | 2 | 0 | 0 | 0 | 0 | 0 | 0 | 0 | 0 | 0 |
| MONOCOT | | | | | | | | | | | | | |
| Os | Oryza sativa | GCF_001433935.1 | Eukaryota; Viridiplantae; Streptophyta; Streptophytina Embryophyta; Tracheophyta; Euphyllophyta; Spermatophyta; Magnoliophyta; Mesangiospermae; Liliopsida; Petrosaviidae; commelinids; Poales; Poaceae; BOP clade; Oryzoideae; Oryzeae; Oryzinae; Oryza | 0 | 1 | 3 | 0 | 0 | 0 | 0 | 0 | 0 | 0 |
| Zm | Zea mays | GCF_000005005.1 | Eukaryota; Viridiplantae; Streptophyta; Streptophytina; Embryophyta; Tracheophyta; Euphyllophyta; Spermatophyta; Magnoliophyta; Mesangiospermae; Liliopsida; Petrosaviidae; commelinids; Poales; Poaceae; PACMAD clade; Panicoideae; Andropogonodae; Andropogoneae; Tripsacinae; Zea | 0 | 1 | 1 | 0 | 0 | 0 | 0 | 0 | 0 | 0 |
| Ac | Ananas comosus | GCF_001540865.1 | Eukaryota; Viridiplantae; Streptophyta; Embryophyta; Tracheophyta; Spermatophyta; Magnoliophyta; Liliopsida; Poales; Bromeliaceae; Bromelioideae; Ananas | 0 | 1 | 0 | 0 | 0 | 0 | 0 | 0 | 0 | 0 |
| Ob | Oryza brachyantha | GCF_000231095.1 | Eukaryota; Viridiplantae; Streptophyta; Embryophyta; Tracheophyta; Spermatophyta; Magnoliophyta; Liliopsida; Poales; Poaceae; BOP clade; Oryzoideae; Oryzeae; Oryzinae; Oryza | 0 | 1 | 0 | 0 | 0 | 0 | 0 | 0 | 0 | 0 |

FIG. 11B-1

| SN | Species | RefSeq Assembly Accession | Taxon | Grp 1 | Grp 2 | Grp 3 | Grp 4 | Grp 5 | Grp 6 | Grp 7 | Grp 8 | Grp 9 | Grp 10 |
|---|---|---|---|---|---|---|---|---|---|---|---|---|---|
| Bd | Brachypodium distachyon | GCF_000005505.2 | Eukaryota; Viridiplantae; Streptophyta; Embryophyta; Tracheophyta; Spermatophyta; Magnoliophyta; Liliopsida; Poales; Poaceae; BOP clade; Pooideae; Brachypodieae; Brachypodium | 0 | 0 | 2 | 0 | 0 | 0 | 0 | 0 | 0 | 0 |
| Ata | Aegilops tauschii subsp. tauschii | GCF_001957025.1 | Eukaryota; Viridiplantae; Streptophyta; Embryophyta; Tracheophyta; Spermatophyta; Magnoliophyta; Liliopsida; Poales; Poaceae; BOP clade; Pooideae; Triticodae; Triticeae; Triticinae; Aegilops | 0 | 0 | 2 | 0 | 0 | 0 | 0 | 0 | 0 | 0 |
| Sb | Sorghum bicolor | GCF_000003195.2 | Eukaryota; Viridiplantae; Streptophyta; Embryophyta; Tracheophyta; Spermatophyta; Magnoliophyta; Liliopsida; Poales; Poaceae; PACMAD clade; Panicoideae; Andropogonodae; Andropogoneae; Sorghinae; Sorghum | 0 | 2 | 1 | 0 | 0 | 0 | 0 | 0 | 0 | 0 |
| Ao | Asparagus officinalis | GCF_001876935.1 | Eukaryota; Viridiplantae; Streptophyta; Embryophyta; Tracheophyta; Spermatophyta; Magnoliophyta; Liliopsida; Asparagales; Asparagaceae; Asparagoideae; Asparagus | 0 | 0 | 1 | 0 | 0 | 0 | 0 | 0 | 0 | 0 |
| Dcat | Dendrobium catenatum | GCF_001605985.1 | Eukaryota; Viridiplantae; Streptophyta; Embryophyta; Tracheophyta; Spermatophyta; Magnoliophyta; Liliopsida; Asparagales; Orchidaceae; Epidendroideae; Malaxideae; Dendrobiinae; Dendrobium | 0 | 0 | 1 | 0 | 0 | 0 | 0 | 0 | 0 | 0 |
| Peq | Phalaenopsis equestris | GCF_001263595.1 | Eukaryota; Viridiplantae; Streptophyta; Embryophyta; Tracheophyta; Spermatophyta; Magnoliophyta; Liliopsida; Asparagales; Orchidaceae; Epidendroideae; Vandeae; Aeridinae; Phalaenopsis | 0 | 0 | 1 | 0 | 1 | 0 | 0 | 0 | 0 | 0 |
| DICOT | | | | | | | | | | | | | |
| Dcar | Daucus carota subsp. sativus | GCF_001625215.1 | Eukaryota; Viridiplantae; Streptophyta; Embryophyta; Tracheophyta; Spermatophyta; Magnoliophyta; eudicotyledons; Gunneridae; Pentapetalae; asterids; campanulids; Apiales; Apiaceae; Apioideae; Scandiceae; Daucinae; Daucus; Daucus sect. Daucus | 0 | 0 | 0 | 0 | 0 | 0 | 1 | 2 | 0 | 0 |
| Sin | Sesamum indicum | GCF_000512975.1 | Eukaryota; Viridiplantae; Streptophyta; Embryophyta; Tracheophyta; Spermatophyta; Magnoliophyta; eudicotyledons; Gunneridae; Pentapetalae; asterids; lamiids; Lamiales; Pedaliaceae; Sesamum | 0 | 0 | 0 | 0 | 0 | 0 | 0 | 0 | 0 | 0 |

FIG. 11B-2

| SN | Species | RefSeq Assembly Accession | Taxon | Grp 1 | Grp 2 | Grp 3 | Grp 4 | Grp 5 | Grp 6 | Grp 7 | Grp 8 | Grp 9 | Grp 10 |
|---|---|---|---|---|---|---|---|---|---|---|---|---|---|
| Egut | Erythranthe guttata | GCF_000504015.1 | Eukaryota; Viridiplantae; Streptophyta; Embryophyta; Tracheophyta; Spermatophyta; Magnoliophyta; eudicotyledons; Gunneridae; Pentapetalae; asterids; lamiids; Lamiales; Phrymaceae; Erythranthe | 0 | 0 | 0 | 0 | 0 | 0 | 0 | 0 | 0 | 0 |
| In | Ipomoea nil | GCF_001879475.1 | Eukaryota; Viridiplantae; Streptophyta; Embryophyta; Tracheophyta; Spermatophyta; Magnoliophyta; eudicotyledons; Gunneridae; Pentapetalae; asterids; lamiids; Solanales; Convolvulaceae; Ipomoeeae; Ipomoea | 0 | 0 | 0 | 0 | 1 | 0 | 1 | 0 | 0 | 0 |
| Na | Nicotiana attenuata | GCF_001879085.1 | Eukaryota; Viridiplantae; Streptophyta; Embryophyta; Tracheophyta; Spermatophyta; Magnoliophyta; eudicotyledons; Gunneridae; Pentapetalae; asterids; lamiids; Solanales; Solanaceae; Nicotianoideae; Nicotianeae; Nicotiana | 0 | 0 | 0 | 0 | 2 | 0 | 2 | 0 | 0 | 0 |
| Nto | Nicotiana tomentosiformis | GCF_000390325.2 | Eukaryota; Viridiplantae; Streptophyta; Embryophyta; Tracheophyta; Spermatophyta; Magnoliophyta; eudicotyledons; Gunneridae; Pentapetalae; asterids; lamiids; Solanales; Solanaceae; Nicotianoideae; Nicotianeae; Nicotiana | 0 | 0 | 0 | 0 | 0 | 0 | 1 | 0 | 0 | 0 |
| Nta | Nicotiana tabacum | GCF_000715135.1 | Eukaryota; Viridiplantae; Streptophyta; Embryophyta; Tracheophyta; Spermatophyta; Magnoliophyta; eudicotyledons; Gunneridae; Pentapetalae; asterids; lamiids; Solanales; Solanaceae; Nicotianoideae; Nicotianeae; Nicotiana | 0 | 0 | 0 | 0 | 0 | 0 | 4 | 0 | 0 | 0 |
| Can | Capsicum annuum | GCF_000710875.1 | Eukaryota; Viridiplantae; Streptophyta; Embryophyta; Tracheophyta; Spermatophyta; Magnoliophyta; eudicotyledons; Gunneridae; Pentapetalae; asterids; lamiids; Solanales; Solanaceae; Solanoideae; Capsiceae; Capsicum | 0 | 0 | 0 | 0 | 0 | 0 | 1 | 0 | 0 | 0 |
| St | Solanum tuberosum | GCF_000226075.1 | Eukaryota; Viridiplantae; Streptophyta; Embryophyta; Tracheophyta; Spermatophyta; Magnoliophyta; eudicotyledons; Gunneridae; Pentapetalae; asterids; lamiids; Solanales; Solanaceae; Solanoideae; Solaneae; Solanum | 0 | 0 | 0 | 0 | 0 | 0 | 6 | 0 | 0 | 0 |

FIG. 11B-3

| SN | Species | RefSeq Assembly Accession | Taxon | Grp 1 | Grp 2 | Grp 3 | Grp 4 | Grp 5 | Grp 6 | Grp 7 | Grp 8 | Grp 9 | Grp 10 |
|---|---|---|---|---|---|---|---|---|---|---|---|---|---|
| Sp | Solanum pennellii | GCF_001406875.1 | Eukaryota; Viridiplantae; Streptophyta; Embryophyta; Tracheophyta; Spermatophyta; Magnoliophyta; eudicotyledons; Gunneridae; Pentapetalae; asterids; lamiids; Solanales; Solanaceae; Solanoideae; Solaneae; Solanum; Lycopersicon | 0 | 0 | 0 | 0 | 0 | 0 | 0 | 0 | 0 | 0 |
| Sl | Solanum lycopersicum | GCF_000188115.3 | Eukaryota; Viridiplantae; Streptophyta; Streptophytina; Embryophyta; Tracheophyta; Euphyllophyta; Spermatophyta; Magnoliophyta; Mesangiospermae; eudicotyledons; Gunneridae; Pentapetalae; asterids; lamiids; Solanales; Solanaceae; Solanoideae; Solaneae; Solanum; Lycopersicon | 0 | 0 | 0 | 0 | 0 | 0 | 3 | 0 | 0 | 0 |
| Cm | Cucumis melo | GCF_000313045.1 | Eukaryota; Viridiplantae; Streptophyta; Embryophyta; Tracheophyta; Spermatophyta; Magnoliophyta; eudicotyledons; Gunneridae; Pentapetalae; rosids; fabids; Cucurbitales; Cucurbitaceae; Benincaseae; Cucumis | 0 | 0 | 0 | 0 | 0 | 1 | 0 | 0 | 0 | 0 |
| Cus | Cucumis sativus | GCF_000004075.2 | Eukaryota; Viridiplantae; Streptophyta; Embryophyta; Tracheophyta; Spermatophyta; Magnoliophyta; eudicotyledons; Gunneridae; Pentapetalae; rosids; fabids; Cucurbitales; Cucurbitaceae; Benincaseae; Cucumis | 0 | 0 | 0 | 0 | 0 | 1 | 3 | 0 | 0 | 0 |
| Mt | Medicago truncatula | GCF_000219495.3 | Eukaryota; Viridiplantae; Streptophyta; Streptophytina; Embryophyta; Tracheophyta; Euphyllophyta; Spermatophyta; Magnoliophyta; Mesangiospermae; eudicotyledons; Gunneridae; Pentapetalae; rosids; fabids; Fabales; Fabaceae; Papilionoideae; Trifolieae; Medicago | 0 | 0 | 0 | 0 | 0 | 0 | 0 | 0 | 0 | 0 |
| Car | Cicer arietinum | GCF_000331145.1 | Eukaryota; Viridiplantae; Streptophyta; Embryophyta; Tracheophyta; Spermatophyta; Magnoliophyta; eudicotyledons; Gunneridae; Pentapetalae; rosids; fabids; Fabales; Fabaceae; Papilionoideae; Cicereae; Cicer | 0 | 0 | 0 | 0 | 0 | 0 | 0 | 0 | 1 | 0 |
| Cca | Cajanus cajan | GCF_000340665.1 | Eukaryota; Viridiplantae; Streptophyta; Embryophyta; Tracheophyta; Spermatophyta; Magnoliophyta; eudicotyledons; Gunneridae; Pentapetalae; rosids; fabids; Fabales; Fabaceae; Papilionoideae; Phaseoleae; Cajanus | 0 | 0 | 0 | 0 | 0 | 0 | 0 | 0 | 2 | 0 |

FIG. 11B-4

| SN | Species | RefSeq Assembly Accession | Taxon | Grp 1 | Grp 2 | Grp 3 | Grp 4 | Grp 5 | Grp 6 | Grp 7 | Grp 8 | Grp 9 | Grp 10 |
|---|---|---|---|---|---|---|---|---|---|---|---|---|---|
| Gm | Glycine max | GCF_000004515.4 | Eukaryota; Viridiplantae; Streptophyta; Embryophyta; Tracheophyta; Spermatophyta; Magnoliophyta; eudicotyledons; Gunneridae; Pentapetalae; rosids; fabids; Fabales; Fabaceae; Papilionoideae; Phaseoleae; Glycine; Soja | 0 | 0 | 0 | 0 | 0 | 0 | 0 | 0 | 3 | 0 |
| Pv | Phaseolus vulgaris | GCF_000499845.1 | Eukaryota; Viridiplantae; Streptophyta; Embryophyta; Tracheophyta; Spermatophyta; Magnoliophyta; eudicotyledons; Gunneridae; Pentapetalae; rosids; fabids; Fabales; Fabaceae; Papilionoideae; Phaseoleae; Phaseolus | 0 | 0 | 0 | 0 | 0 | 0 | 0 | 0 | 2 | 0 |
| Va | Vigna angularis | GCF_001190045.1 | Eukaryota; Viridiplantae; Streptophyta; Embryophyta; Tracheophyta; Spermatophyta; Magnoliophyta; eudicotyledons; Gunneridae; Pentapetalae; rosids; fabids; Fabales; Fabaceae; Papilionoideae; Phaseoleae; Vigna | 0 | 0 | 0 | 0 | 0 | 0 | 0 | 0 | 2 | 0 |
| Vr | Vigna radiata var. radiata | GCF_000741045.1 | Eukaryota; Viridiplantae; Streptophyta; Embryophyta; Tracheophyta; Spermatophyta; Magnoliophyta; eudicotyledons; Gunneridae; Pentapetalae; rosids; fabids; Fabales; Fabaceae; Papilionoideae; Phaseoleae; Vigna | 0 | 0 | 0 | 0 | 0 | 0 | 0 | 0 | 2 | 0 |
| Jr | Juglans regia | GCF_001411555.1 | Eukaryota; Viridiplantae; Streptophyta; Embryophyta; Tracheophyta; Spermatophyta; Magnoliophyta; eudicotyledons; Gunneridae; Pentapetalae; rosids; fabids; Fagales; Juglandaceae; Juglans | 0 | 0 | 0 | 0 | 0 | 0 | 0 | 0 | 0 | 1 |
| Rc | Ricinus communis | GCF_000151685.1 | Eukaryota; Viridiplantae; Streptophyta; Embryophyta; Tracheophyta; Spermatophyta; Magnoliophyta; eudicotyledons; Gunneridae; Pentapetalae; rosids; fabids; Malpighiales; Euphorbiaceae; Acalyphoideae; Acalypheae; Ricinus | 0 | 0 | 0 | 0 | 0 | 0 | 0 | 0 | 0 | 1 |
| Jc | Jatropha curcas | GCF_000696525.1 | Eukaryota; Viridiplantae; Streptophyta; Embryophyta; Tracheophyta; Spermatophyta; Magnoliophyta; eudicotyledons; Gunneridae; Pentapetalae; rosids; fabids; Malpighiales; Euphorbiaceae; Crotonoideae; Jatropheae; Jatropha | 0 | 0 | 0 | 0 | 0 | 0 | 0 | 0 | 0 | 2 |

FIG. 11B-5

| SN | Species | RefSeq Assembly Accession | Taxon | Grp 1 | Grp 2 | Grp 3 | Grp 4 | Grp 5 | Grp 6 | Grp 7 | Grp 8 | Grp 9 | Grp 10 |
|---|---|---|---|---|---|---|---|---|---|---|---|---|---|
| Peu | Populus euphratica | GCF_000495115.1 | Eukaryota; Viridiplantae; Streptophyta; Embryophyta; Tracheophyta; Spermatophyta; Magnoliophyta; eudicotyledons; Gunneridae; Pentapetalae; rosids; fabids; Malpighiales; Salicaceae; Populus | 0 | 0 | 0 | 1 | 0 | 0 | 0 | 0 | 0 | 3 |
| Pt | Populus trichocarpa | GCF_000002775.3 | Eukaryota; Viridiplantae; Streptophyta; Embryophyta; Tracheophyta; Spermatophyta; Magnoliophyta; eudicotyledons; Gunneridae; Pentapetalae; rosids; fabids; Malpighiales; Salicaceae; Populus | 0 | 0 | 0 | 0 | 0 | 0 | 0 | 0 | 0 | 4 |
| Mn | Morus notabilis | GCF_000414095.1 | Eukaryota; Viridiplantae; Streptophyta; Embryophyta; Tracheophyta; Spermatophyta; Magnoliophyta; eudicotyledons; Gunneridae; Pentapetalae; rosids; fabids; Rosales; Moraceae; Morus | 0 | 0 | 0 | 0 | 0 | 0 | 0 | 0 | 0 | 3 |
| Zj | Ziziphus jujuba | GCF_000826755.1 | Eukaryota; Viridiplantae; Streptophyta; Embryophyta; Tracheophyta; Spermatophyta; Magnoliophyta; eudicotyledons; Gunneridae; Pentapetalae; rosids; fabids; Rosales; Rhamnaceae; Paliureae; Ziziphus | 0 | 0 | 0 | 0 | 0 | 0 | 0 | 0 | 0 | 1 |
| Pm | Prunus mume | GCF_000346735.1 | Eukaryota; Viridiplantae; Streptophyta; Embryophyta; Tracheophyta; Spermatophyta; Magnoliophyta; eudicotyledons; Gunneridae; Pentapetalae; rosids; fabids; Rosales; Rosaceae; Maloideae; Amygdaleae; Prunus | 0 | 0 | 0 | 1 | 0 | 0 | 0 | 0 | 0 | 0 |
| Ppe | Prunus persica | GCF_000346465.2 | Eukaryota; Viridiplantae; Streptophyta; Embryophyta; Tracheophyta; Spermatophyta; Magnoliophyta; eudicotyledons; Gunneridae; Pentapetalae; rosids; fabids; Rosales; Rosaceae; Maloideae; Amygdaleae; Prunus | 0 | 0 | 0 | 3 | 0 | 0 | 0 | 0 | 0 | 1 |
| Px | Pyrus x bretschneideri | GCF_000315295.1 | Eukaryota; Viridiplantae; Streptophyta; Embryophyta; Tracheophyta; Spermatophyta; Magnoliophyta; eudicotyledons; Gunneridae; Pentapetalae; rosids; fabids; Rosales; Rosaceae; Maloideae; Maleae; Pyrus | 0 | 0 | 0 | 1 | 0 | 0 | 0 | 0 | 0 | 0 |
| Fv | Fragaria vesca | GCF_000184155.1 | Eukaryota; Viridiplantae; Streptophyta; Embryophyta; Tracheophyta; Spermatophyta; Magnoliophyta; eudicotyledons; Gunneridae; Pentapetalae; rosids; fabids; Rosales; Rosaceae; Rosoideae; Potentilleae; Fragariinae; Fragaria | 0 | 0 | 0 | 2 | 0 | 0 | 0 | 0 | 0 | 1 |

FIG. 11B-6

| SN | Species | RefSeq Assembly Accession | Taxon | Grp 1 | Grp 2 | Grp 3 | Grp 4 | Grp 5 | Grp 6 | Grp 7 | Grp 8 | Grp 9 | Grp 10 |
|---|---|---|---|---|---|---|---|---|---|---|---|---|---|
| Tc | Theobroma cacao | GCF_000208745.1 | Eukaryota; Viridiplantae; Streptophyta; Embryophyta; Tracheophyta; Spermatophyta; Magnoliophyta; eudicotyledons; Gunneridae; Pentapetalae; rosids; malvids; Malvales; Malvaceae; Byttnerioideae; Theobroma | 0 | 0 | 0 | 0 | 0 | 0 | 0 | 0 | 0 | 2 |
| Ga | Gossypium arboreum | GCF_000612285.1 | Eukaryota; Viridiplantae; Streptophyta; Embryophyta; Tracheophyta; Spermatophyta; Magnoliophyta; eudicotyledons; Gunneridae; Pentapetalae; rosids; malvids; Malvales; Malvaceae; Malvoideae; Gossypium | 0 | 0 | 0 | 0 | 0 | 0 | 0 | 0 | 0 | 2 |
| Gr | Gossypium raimondii | GCF_000327365.1 | Eukaryota; Viridiplantae; Streptophyta; Embryophyta; Tracheophyta; Spermatophyta; Magnoliophyta; eudicotyledons; Gunneridae; Pentapetalae; rosids; malvids; Malvales; Malvaceae; Malvoideae; Gossypium | 0 | 0 | 0 | 0 | 0 | 0 | 0 | 0 | 0 | 2 |
| Gh | Gossypium hirsutum | GCF_000987745.1 | Eukaryota; Viridiplantae; Streptophyta; Embryophyta; Tracheophyta; Spermatophyta; Magnoliophyta; eudicotyledons; Gunneridae; Pentapetalae; rosids; malvids; Malvales; Malvaceae; Malvoideae; Gossypium | 0 | 0 | 0 | 0 | 0 | 0 | 0 | 0 | 0 | 3 |
| Egr | Eucalyptus grandis | GCF_000612305.1 | Eukaryota; Viridiplantae; Streptophyta; Embryophyta; Tracheophyta; Spermatophyta; Magnoliophyta; eudicotyledons; Gunneridae; Pentapetalae; rosids; malvids; Myrtales; Myrtaceae; Myrtoideae; Eucalypteae; Eucalyptus | 0 | 0 | 0 | 0 | 0 | 0 | 0 | 0 | 0 | 2 |
| Csi | Citrus sinensis | GCF_000317415.1 | Eukaryota; Viridiplantae; Streptophyta; Embryophyta; Tracheophyta; Spermatophyta; Magnoliophyta; eudicotyledons; Gunneridae; Pentapetalae; rosids; malvids; Sapindales; Rutaceae; Aurantioideae; Citrus | 0 | 0 | 0 | 0 | 0 | 0 | 0 | 0 | 0 | 1 |
| Atr | Amborella trichopoda | GCF_000471905.2 | Eukaryota; Viridiplantae; Streptophyta; Embryophyta; Tracheophyta; Spermatophyta; Magnoliophyta; basal Magnoliophyta; Amborellales; Amborellaceae; Amborella | 0 | 1 | 0 | 2 | 0 | 0 | 0 | 0 | 0 | 0 |
| Vv | Vitis vinifera | GCF_000003745.3 | Eukaryota; Viridiplantae; Streptophyta; Embryophyta; Tracheophyta; Euphyllophyta; Spermatophyta; Magnoliophyta; Mesangiospermae; eudicotyledons; Gunneridae; Pentapetalae; rosids; rosids incertae sedis; Vitales; Vitaceae; Vitis | 0 | 0 | 0 | 0 | 0 | 0 | 0 | 0 | 0 | 0 |

PLANT GROWTH PROMOTER WITH STRIGOLACTONES REGULATION ACTIVITIES

RELATED APPLICATION DATA

This application is a National Phase application under 35 U.S.C. § 371 of International Application No. PCT/IB2018/054677, filed on Jun. 25, 2018, entitled "PLANT GROWTH PROMOTER WITH STRIGOLACTONES REGULATION ACTIVITIES", which claims the benefit of U.S. Provisional Patent Application Ser. No. 62/524,803 filed Jun. 26, 2017, all of which are hereby incorporated herein in their entirety by reference.

TECHNICAL FIELD

The present invention relates to a method of using a plant growth regulator to promote plant growth and combat root parasitic plants in cereal crops.

BACKGROUND OF THE INVENTION

The background of this invention will address root parasitic plants, strigolactone plant hormones, and control of root parasitic plants.

Root Parasitic Plants

Parasitic plants are plants that derive some or all of the necessary nutritional requirements from a living host plant. Parasitic plants use specialized organs called haustoria to infiltrate the vascular tissue of host plants in order to provide the parasitic plant with water and nutrients, and do so to the detriment of the host plant. More than 4000 parasitic plants are known and these plants can cause a range of effects anywhere from minor damage to a host plant up to and including destruction of the host.

While all parasites grow at the expense of the host plant, not all parasites cause significant damage to the host. One well-known example of a parasitic plant is mistletoe, which grows on trees and shrubs by embedding roots into the vascular tissue of branches on the host tree or bush; however, mistletoe rarely causes major damage to the plant. There are parasitic plant species that do cause extensive damage to host plants, and that damage often results in significant economic loss. Some of the most damaging parasites, in terms of plant and economic losses, target the roots of the host plant.

Root parasitic plants specifically parasitize the roots of the host plant. Seeds of the parasitic plants germinate in the soil near the host roots and use haustoria to penetrate the host roots to reach nutrients. Grain crops are among the plants that can be most severely affected by root parasitic plants.

Parasitic plants can be either facultative or obligate parasites, with obligate parasitic weeds being considered one of the most serious difficulties associated with food production in many parts of the world. Obligate parasites can be either hemi-parasites (with chlorophyll), like species of the genus *Striga*, or holo-parasites (without chlorophyll), such as species of the genus *Orobanche*.

Root parasitic plants of the Orobanchaceae family, such as *Striga*, require chemical signals, which are released by roots of the host plant, for the germination of the parasite seeds. Seeds can remain dormant in the soil for years germinating only when the chemical signal from an acceptable host plant is encountered. These signals are mainly plant hormones called strigolactones (SL). This SL-dependent germination strategy ensures the presence of a host that is needed for the survival of the parasites.

Root parasitic weeds are the cause of enormous yield losses in Africa, the Mediterranean and large parts of Asia. The *Striga* species *S. asiatica* and *S. hermonthica* infect cereals, including maize, sorghum, pearl millet, and rice, while *Orobanche* species affect crops such as sunflower, tomato and legumes (Parker, 2009, Observations of the current status of *Orobanche* and *Striga* problems worldwide, *Pest Management Science* 65:453-9). Other cereal, grain and vegetable crops, such as wheat, oats barley sugarcane, tobacco, potato, sweet potato, hemp, clover, and melons, as well as legumes, such as beans, lentils, peas and peanuts, can also be affected by *Striga* and *Orobanche* species.

*Striga hermonthica* is considered as one of the seven more severe biotic threats to food security, affecting subsistence and livelihood of 100 million people in sub-Saharan Africa (Pennisi, 2010, Armed and Dangerous, *Science;* 327:804-5). It is estimated that about 50 million hectares land in the Sahel and Savannah zones of 25 countries in Africa are infested by this weed, causing annual losses of around 7 billion US$ (Parker 2009; Parker, 2012, Parasitic Weeds: A World Challenge, *Weed Science;* 60:269-276; Ejeta, 2007, The *Striga* Scourge in Africa—A growing pandemic, World Scientific Publishing Co. Pte. Ltd.)

Pearl millet is the most widely grown type of millet and is a major staple crop in the semi-arid regions of Africa, India and the Middle East. Infestation of this cereal crop by root parasitic weeds, such as *Striga hermonthica*, causes enormous yield losses. *Striga* species are native to Asia and sub-Saharan Africa. Root parasitic weeds, such as *Striga*, are serious agricultural pests, parasitizing many important food crops, especially staple cereal and grain crops, often causing substantial yield reductions.

Strigolactone Plant Hormone

Plant hormones, also known as phyto-hormones or plant growth substances, are chemicals produced within a plant to regulate plant growth. These signaling molecules are produced in the individual plant cells and regulate many processes, such as the formation of flowers, stems, and leaves, the development and ripening of fruit, and germination of seeds. There are five general categories of plant hormones presently known: abscisic acid, auxins, cytokinins, ethylene, and gibberellins, along with other known hormones that are not included in those five categories.

Abscisic acid regulates several plant development processes, including bud and leaf dormancy and plant response to stress. Auxins influence cell growth, bud formation and root initiation, as well as protein synthesis in seeds. Cytokinins influence cell division, shoot formation and mediate transport of auxins to plant tissues. Ethylene affects fruit ripening and cell growth. Gibberellins cause elongation of stems and mobilize materials stored in seeds during germination. Other known plant hormones have defensive functions, promote cell-to-cell signaling, activate genes and inhibit growth. Strigolactones are categorized within the group of other known plant hormones.

Strigolactones (SL) are plant hormones that enable plants to modify growth and development of the plant architecture. Strigolactones are involved in enabling plants to modify growth and development in order to gain advantage in competition with neighboring organisms for limited resources, and produce effects that are generally beneficial to plants, such as increasing inter-nodal growth, increasing leaf senescence, increasing root hair elongation, and increasing stem thickness, along with inhibiting plant shoot branching.

Strigolactone production has been found to increase in response to nutrient restrictions in the soil, and these SL effects, which favor root production over shoot production, can benefit the plant by helping the plant acquire more nutrients from the soil. When the soil nutrients available are in limited supply, the plant invests resources into finding additional nutrients rather than in increasing shoot production.

Strigolactones are also involved in establishing the beneficial mycorrhizal symbiosis, which is another means used by plants to acquire nutrients from the soil. Strigolactones induce hyphal branching in the fungus, which is required for establishing the mycorrhizal symbiotic process (Akiyama et al.; 2005; Plant sesquiterpenes induce hyphal branching in arbuscular mycorrhizal fungi; *Nature;* 435:824-7). However, strigolactones can also produce effects that are distinctly disadvantageous to plants, such as triggering germination of parasitic plant seeds.

Strigolactones are secondary metabolites originally isolated from root exudates, due to their activity as germination stimulants of roots parasitic weeds of the Orobanchaceae family (Xie et al.; 2010; The Strigolactone Story; *Annual Review of Phytopathology;* 48:93-117). Strigolactones were first discovered in *Striga lutea* (from which the name is derived), a parasitic weed that lacks the ability to photosynthesize. Such plants use strigolactones exuded from the roots of host plants as a cue for germination. Such a mechanism enables the parasitic seeds (for example *Striga* sp.) to germinate close to a suitable host. The lactone part of the strigolactone name refers to the chemical structure. A lactone is a cyclic ester, which is the condensation product of an alcohol group and a carboxylic acid group in the same molecule. Strigolactones are carotenoid-derived and contain a labile ether bond that is easily hydrolyzed in the rhizosphere, meaning that there is a large concentration gradient between areas near the root and those further away.

Strigolactone (SL) biosynthesis was investigated using the genome of *Arabidopsis* plants from the Brassicaceae family. Strigolactone biosynthesis is initiated by the reversible isomerization of all-trans-β-carotene into 9-cis-β-carotene, which is catalyzed by the enzyme DWARF27 (D27) and followed by the stereospecific cleavage of 9-cis-β-carotene into a 9-cis-configured intermediate. The latter undergoes repeated oxidation/cleavage and intramolecular rearrangements lead to carlactone. This combination of reactions is catalyzed by CCD8. In rice, MAX1 homologs, Cytochrome P450 (CYP) enzymes of the 711 clade (enzyme family), convert carlactone into 4-deoxy-orobanchol, the supposed parent molecule of the orobanchol-like subfamily of SLs. Orobanchol is formed by a further rice MAX1 homolog. The *Arabidopsis* MAX1 oxidizes carlactone into carlactonoate that is methylated to methyl carlactonoate. The latter is further converted by the Lateral Branching Oxidoreductase (LBO) into a yet unidentified product. (Al-Babili and Bouwmeester; 2015; Strigolactones, a novel carotenoid-derived plant hormone; *Annual Review of Plant Biology;* 66:161-86. Zhang et al.; 2014; Rice cytochrome p450 MAX1 homologs catalyze distinct steps in strigolactone biosynthesis; *Nature Chemical Biology;* 10:1028-33. Abe et al.; 2014; Carlactone is converted to carlactonoic acid by MAX1 in *Arabidopsis* and it's methyl ester can directly interact with AtD14 in vitro; *Proceedings of the National Academy U.S.A;* 111:18084-9. Brewer et al.; 2016; Lateral Branching Oxidoreductase acts in the final stages of strigolactone biosynthesis in *Arabidopsis; Proceedings of the National Academy of Sciences U.S.A;* 113:6301-6.)

Control of Root Parasitic Plants

Use of herbicides to control root parasitic plants has had limited success for a number of reasons. Herbicides that are effective on root parasitic weeds are typically also toxic to the desired plants, and selective herbicides that do not affect the desired plants are frequently not effective on the parasitic plants. In some areas, limited or uneven water availability punctuated by uncontrolled flooding further reduces the effectiveness of herbicides.

One means of combating root parasitic plants, such as *Striga*, is the application of strigolactone analogs to soil where seeds of the parasite reside. When produced naturally by the host plant's roots, strigolactone induces germination of the parasitic weed seeds near the host plant allowing for penetration of haustoria into the host roots by the parasitic plant seedling. Application of a strigolactone analog in the absence of a suitable host plant induces germination of the parasitic plant's seeds; however, the resulting seedlings are unable to tap into a host plant's roots to acquire the necessary nutrients and will die out before emerging from the soil. Since the parasitic plant would be unable to complete the growth cycle, no new seeds will be produced to remain in the soil. This so called "suicide germination" approach is a promising approach to combat root parasitic weeds when there is adequate time to treat the soil prior to planting a desired cereal, grain or vegetable crop.

To combat *Striga*, a series of SL analogs (methyl phenlactonoates (MPLs)) was previously developed, which contain a phenol ring and resemble the noncanonical SL methyl carlactonoate. Depending on the derivatization of the phenol ring, MPLs showed very high activity in inducing seed germination or in modulating shoot architecture and triggering senescence. MPLs were also hydrolyzed by the highly sensitive SL receptor ShHTL7 and the rice D14 at different ratios, suggesting the role of structure modifications in determining specific SL functions. To test the efficiency of these compounds as suicidal germination agents in combating *Striga*, a mini box test system was established that also allows for determination of the minimal amount of water needed for field application. Results obtained with this test system show that suicidal germination is a very promising approach in combating *Striga*. However, this approach is effective only if used in the absence of a host plant and would not be effective during the growth cycle of the desired crops.

Another approach has been the development of plant varieties that are resistant to root parasitic weeds. Pearl millet accessions contrasting for *Striga* resistance are currently being characterized and show promise. First results point to a role of SLs release, among other factors. However, the process of developing new resistant strains for the many types of affected host plants could take years to complete. There remains a need for an effective means to combat root parasitic weeds that is compatible with growing the desired cereal, grain and vegetable crops.

SUMMARY

Provided herein are methods of for inhibiting growth of a root parasitic weed comprising applying a negative regulator of strigolactone plant hormones comprising 3-OH-β-apo-13-carotenone to a soil or growth medium to inhibit germination of one or more seed of one or more root parasitic weed of an Orobanchaceae family, including *Striga* species or an *Orobanche* species.

The 3-OH-β-apo-13-carotenone is applied to a soil or growth medium for a cereal, grain or vegetable crop that is susceptible to one or more root parasitic weed. The 3-OH- β-apo-13-carotenone is applied in a manner sufficient to reach a root region of the cereal, grain or vegetable crop, which may be applied as a liquid, emulsion, diluted concentrate, powder, granular or crystalline formulation and in a concentration of 1 μM to 100 μM. Application may be made before planting, during planting, after planting, or a combination of before during and after planting for the cereal, grain or vegetable crop. The negative regulator 3-OH-β-apo-13-carotenone can be applied to cereal, grain or vegetable crops, such as maize, sorghum, pearl millet, millet, rice, wheat, oats, barley, sunflower, tomato, sugarcane, tobacco, potato, sweet potato, hemp, clover, melon, legume, bean, pea or peanut.

Also provided herein are methods of down-regulating biosynthesis and release of strigolactone plant hormones in a cereal, grain or vegetable plant comprising contacting a soil or growth medium adjacent to a cereal, grain or vegetable plant with a negative regulator of strigolactone plant hormones comprising 3-OH-β-apo-13-carotenone. The negative regulator 3-OH-β-apo-13-carotenone is applied to the soil or growth medium at a concentration of 1 μM to 100 μM.

The 3-OH-β-apo-13-carotenone decreases the biosynthesis and release of strigolactone plant hormones from the cereal, grain or vegetable plant, and decreasing the release of strigolactone plant hormones inhibits germination of one or more seed of a root parasitic weed of an Orobanchaceae family, such as Striga species or an Orobanche species, in the soil or growth medium adjacent a cereal, grain or vegetable plant. Biosynthesis and release of strigolactone plant hormones from a 3-OH-β-apo-13-carotenone treated cereal, grain or vegetable plant is decreased by 40% to 75% over an untreated cereal, grain or vegetable plant. Application of 3-OH-β-apo-13-carotenone decreases biosynthesis and release of strigolactone plant hormones from one or more roots of the cereal, grain or vegetable crop, and decreasing the biosynthesis and release of strigolactone plant hormones from the cereal, grain or vegetable plant inhibits germination of one or more seeds of the root parasitic weeds residing in the soil or growth medium of the cereal, grain or vegetable crop, thereby preventing or reducing infestation by the root parasitic weeds Also provided are methods of preventing or reducing infestation of a crop by one or more root parasitic weeds of an Orobanchaceae family comprising contacting a soil or growth medium adjacent the root region of a cereal, grain or vegetable crop with 3-OH-β-apo-13-carotenone. The 3-OH-β-apo-13-carotenone decreases biosynthesis and release of strigolactone plant hormones from the roots of the cereal, grain or vegetable crop, and decreasing the biosynthesis and release of strigolactone plant hormones from the cereal, grain or vegetable crop inhibits germination of the seeds of the root parasitic weeds residing in the soil or growth medium of the cereal, grain or vegetable crop, thereby preventing or reducing infestation by said root parasitic weeds

BRIEF DESCRIPTION OF THE DRAWINGS

The above, and other objects and advantages of the present invention will be understood upon consideration of the following detailed description taken in conjunction with the accompanying drawings, in which like reference characters refer to like parts throughout, and in which:

FIGS. 11A and 11B are a tables of CCD orthologue distributions.

Figures 1A, 1B:
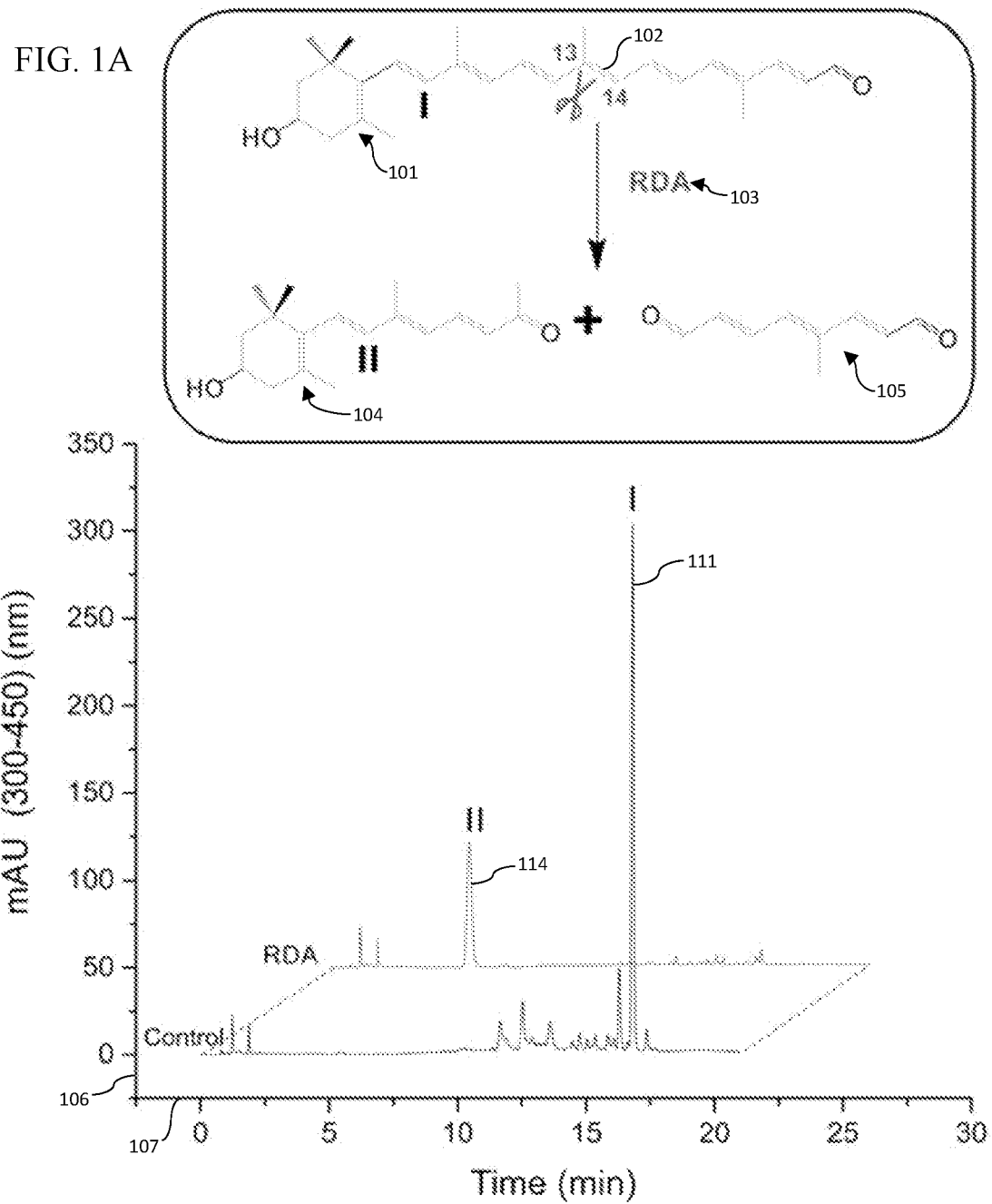
FIG. 1A is a schematic of 3-OH-β-apo-10'-carotenal cleavage with zaxinone synthase.
FIG. 1B shows HPLC analysis of in vitro incubation of zaxinone synthase with 3-OH-β-apo-10'-carotenal.

While the invention is susceptible to various modifications and alternative forms, specific embodiments thereof have been shown by way of example in the drawings and are herein described in detail. It should be understood that the description herein of specific embodiments described herein are not intended to limit the invention to the particular forms disclosed. On the contrary, the claimed invention is meant to cover all modifications, equivalents, and alternatives falling within the spirit and scope of the invention as defined by the appended claims and described herein.

DETAILED DESCRIPTION

Disclosed herein is a new activity of the compound 3-OH-β-apo-13-carotenone (zaxinone) as a negative regulator of the plant hormone strigolactones (SLs). The plant growth regulator, 3-OH-β-apo-13-carotenone, is an enzymatic product of a rice carotenoid cleavage dioxygenase (Rice Dioxygenase A (RDA), zaxinone synthase (ZAS)). The growth regulator 3-OH-β-apo-13-carotenone is a growth-promoting compound that triggers the formation of crown roots. The growth regulator 3-OH-β-apo-13-carotenone has also been found to be a negative regulator of strigolactone biosynthesis and release, and a potent inhibitor of germination for root parasitic weed seeds.

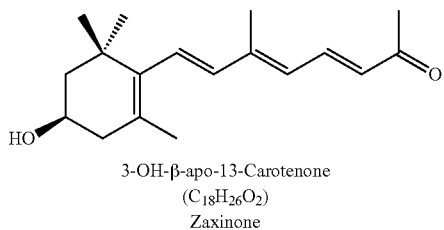

3-OH-β-apo-13-Carotenone
($C_{18}H_{26}O_2$)
Zaxinone

A new activity of 3-OH-β-apo-13-carotenone (zaxinone) was identified by determining the SLs content and release in a corresponding mutant rice variety (designated herein as zas mutant), and by external application of 3-OH-β-apo-13-carotenone to rice seedlings grown under phosphate deficiency, which resulted in a reduction of SLs content and release in both the mutant and wild-type rice plants. The reduction of SLs biosynthetic activity is caused by a decrease in the transcript levels of SL biosynthetic genes. The results indicate that 3-OH-β-apo-13-carotenone is a negative regulator of SLs biosynthesis and opens up new possibilities for applications to certain crops, such as grain, cereal and vegetable crops, that are affected by root parasitic plants. The regulator compound 3-OH-β-apo-13-carotenone (apo-13-zeaxanthinone) is referred to herein as zaxinone and the corresponding Rice Dioxygenase A (RDA) enzyme/gene are referred to as zaxinone synthase (ZAS)/zaxinone synthase.

Plants rely on hormones and other chemical signals to coordinate growth and developmental processes, adapt to environmental changes, and to communicate with surrounding organisms. Many of these signals originate from secondary metabolic pathways, such as carotenoid biosynthesis that provides precursors for the phytohormones abscisic acid (ABA) and strigolactones (SLs). SLs are a key regulator of plant development, best-known for establishing shoot and root architecture in accordance to nutrients availability. In addition, SLs are a rhizospheric signal released by roots, particularly under phosphate starvation, to recruit arbuscular mycorrhizal (AM) fungi for establishing the widely spread, beneficial AM symbiosis. However, SLs are also perceived by root parasitic plants of the genus *Striga* as seed germination signals ensuring host availability required for survival of these obligate parasites. Infestation by *Striga* spp. is a severe problem for agriculture in warm and temperate zones, causing enormous yield losses, and a major threat to global food security.

Carotenoid Cleavage dioxygenases (CCDs) convert carotenoids into signaling molecules and precursors of hormones, such as strigolactones (SLs) that determine the plant's architecture and rhizospheric interactions with root parasitic weeds and symbiotic, mycorrhizal fungi. A rice enzyme representing a plant CCD subfamily was investigated and characterized in aa corresponding loss-of-function mutant. The enzyme, zaxinone synthase (ZAS), formed zaxinone, a natural metabolite present in different plant species, in vitro. The zas mutant rice plants contains less zaxinone in roots, accompanied by retarded growth and higher SL content and release. Exogenous application of zaxinone rescued zas mutant phenotypes and also triggered roots growth in wild-type rice seedlings. Zaxinone's growth-promoting effect is mediated by down-regulating SL biosynthesis at transcripts level.

Carotenoids are isoprenoid pigments characterized by an extended, conjugated double bond system. Plant carotenoids consist of a common $C_{40}$-skeleton, but differ in number of conjugated double bonds, stereo-configuration, presence of oxygen, and end-groups structure. SLs, ABA and further carotenoid-derived compounds, such as the vision chromophore retinal, arise from oxidative cleavage of certain double bonds in defined carotenoid precursor(s). This conversion is a common metabolic process yielding apocarotenoids and is generally catalyzed by Carotenoid Cleavage Dioxygenases (CCDs) represented in all taxa. However, reactive oxygen species (ROSs) can also trigger carotenoid cleavage, as in the formation of the signaling molecule cyclocitral. Apocarotenoids themselves are substrates of some CCDs and frequently modified by different enzymes, such as cytochromes P450.

The *Arabidopsis* genome encodes 9 CCDs including five nine-cis-epoxycarotenoid cleavage dioxygenases (NCED2, 3, 5, 6 and 9) involved in ABA biosynthesis. The further enzymes represent the four other plant CCD subfamilies, designated as CCD1, CCD4, CCD7 and CCD8. CCD1 enzymes are likely scavengers of destructed carotenoids, generating a plentitude of different products from a wide range of carotenoids and apocarotenoids. CCD4 enzymes cleave all-trans-cyclic carotenoids, determining carotenoid content in different tissues and forming apocarotenoid pigments in some fruits. The *Arabidopsis* CCD4 is also supposed to generate a yet unidentified signal required for normal plastid and leaf development. CCD7 is a SL biosynthetic enzyme cleaving 9-cis-β-carotene formed by the all-trans/9-cis-β-carotene isomerase DWARF27 into 9-cis-β-apo-10'-carotenal. CCD8 converts this intermediate into carlactone, the central intermediate of SL biosynthesis and the substrate of cytochrome P450 enzymes (711 clade), such as the rice orobanchol oxidase, that form SLs.

The function and enzymatic activity of plant carotenoid cleavage dioxygenases (CCDs), which are homologous to CCD7 and CCD8 that mediate the synthesis of carlactone from 9-cis-—-carotene, have been investigated. In vitro assays performed with one of these enzymes led to the identification of a carotenoid-derived metabolite, zaxinone, with different biological activities. Zaxinone is a growth-promoting compound that triggers the formation of crown roots. In addition, it has been found to down-regulate the biosynthesis and release of SLs. Expression analysis showed that zaxinone application at micro-molar concentrations leads to a decrease in the transcript levels of SL biosynthetic enzymes, suggesting that zaxinone acts at transcription level. The activities of zaxinone were confirmed by the phenotypes of a rice mutant affected in the corresponding gene. The mutant plants released higher amounts of SLs and showed higher expression of SLs biosynthetic genes, which could be rescued by applying zaxinone. Zaxinone opens up new possibilities in chemical control of root parasitic weeds, and application can increase both crop growth and resistance to root parasitic weeds, such as Striga.

Application of 3-OH-β-apo-13-carotenone as a negative regulator of SLs biosynthesis can combat root parasitic plants which affect grain, cereal and vegetable crops. Enormous yield losses occur because of infestation of cereals, such as pearl millet, by the root parasitic weed Striga hermonthica. Root parasitic weeds of Striga species affect many cereals crops, including maize, sorghum, pearl millet, and rice, while Orobanche species affect crops such as sunflower, tomato and legumes. Other cereal, grain and vegetable crops, such as wheat, oats barley, sugarcane, tobacco, potato, sweet potato, hemp, clover, and melons, as well as legumes, such as beans, lentils, peas and peanuts, can also be negatively affected by root parasitic weeds. Strigolactones produced by roots of these cereal, grain and vegetable plants induces germination of root parasitic plant seeds in the soil around the crops leading to negative effects for the desired crops, such as decreased plant height and biomass, chlorosis, decreased yield, or even plant death. Application of 3-OH-β-apo-13-carotenone to crops decreases germination of root parasitic weed seeds by decreasing SL activity. Decreased germination of root parasitic weed seeds leads to decreased infestation of the crops by root parasitic weeds.

Application of 3-OH-β-apo-13-carotenone is made to the growth media or soil for the crop. Application can be made to the growth media or soil prior to planting or at the time of planting a desired crop. Application can also be made immediately following planting or following emergence of crop seedlings from the soil or growth media. Application can occur one or more times as needed throughout the growth cycle of the crop to control growth of root parasitic weeds, but will be most effective when applied in the earlier stages of the growth cycle.

The 3-OH-β-apo-13-carotenone compound can be applied as a wet formulation including, but not limited to liquids, emulsions, and diluted concentrates. Wet 3-OH-β-apo-13-carotenone formulations, such as liquids, emulsions or diluted concentrates may be applied to the soil or growth media before, during or after planting of a host crop by means such as spraying, drenching, irrigation, or other suitable means for application of a wet formulation.

The 3-OH-β-apo-13-carotenone compound can be applied as a dry formulation including, but not limited to powder, granules, and crystals, or any suitable formulation for application to the soil or growth media. Dry 3-OH-β-apo-13-carotenone formulations, such as powders, granules or crystals, may be applied to the soil or growth media by any suitable means for application of a dry formulation, either before, during or after plowing or furrowing, and the compositions can then be watered into the soil or growth media to release the compound into the soil around the crop.

Alternatively, the 3-OH-β-apo-13-carotenone may be adhered to or mixed with the cereal, grain or vegetable crop seeds as a coating on the seeds or as a co-mixed powder or granule formulation for distribution with the seeds. The 3-OH-β-apo-13-carotenone may also be combined with additional compounds such as growth regulators, plant hormones, soil amendments or other beneficial compounds prior to application to the soil.

As used herein, soil or growth media encompasses any medium that may be used for plant growth, including: naturally occurring, amended or commercially prepared soils and growth media, such as soils having sand, silt, clay, loam, peat and combinations thereof, used to grow plants in farmer fields, plant nurseries, gardens, or container gardens, as well as hydroponic growth media, such as liquids, polymers, fibers, stones, expansive minerals, foams and synthetic growth media.

The 3-OH-β-apo-13-carotenone compound can be applied to the soil or growth media in a concentration range of 1 µM to 100 µM, inclusive of any concentration there between. The compound is preferably applied in a concentration range of 2.5 µM to 10.0 µM, inclusive of any concentration there between.

Analysis of 3-OH-β-apo-13-Carotenone (Zaxinone)

The schematic in FIG. 1A shows 3-OH-β-apo-10'-carotenal cleavage with zaxinone synthase to produce zaxinone. The 3-OH-β-apo-10'-carotenal (101) is incubated with the RDA enzyme, zaxinone synthase (103). This enzyme catalyzes the cleavage of the C13-C14 double bond (102) of 3-OH-β-apo-10'-carotenal (101). The resulting products of the cleavage are 3-OH-β-apo-13-carotenone, II, also known as zaxinone (104), and a C9-aldehyde (105).

FIG. 1B is a chromatogram for HPLC analysis of in vitro incubation of RDA (zaxinone synthase—ZAS) with 3-OH-β-apo-10'-carotenal (C27; I) showing absorbance units (106) plotted over retention time (107). As seen in FIG. 1A, the enzyme catalyzes the cleavage of the C13-C14 double bond, leading to zaxinone (3-OH-β-apo-13-carotenone; II) and a C9-diladehyde (not shown on the chromatogram). Prior to incubation with the enzyme, a defined peak (111) at 325 mAU is seen for 3-OH-β-apo-10'-carotenal (C27; I). After incubation, with zaxinone synthase, a defined peak (114) at 125 mAU is seen for the product-zaxinone (3-OH-β-apo-13-carotenone; II).

Strigolactones and Root Parasitic Plants

Strigolactones (SLs) are secondary metabolites originally isolated from root exudates and are recognized as a new class of plant hormones that regulate different aspects of plant development, including shoot branching, lateral root density, and primary root length, among others. SLs are involved in establishing the beneficial mycorrhizal symbiosis by inducing hyphal branching in the fungus required to establish the symbiotic association with the host plant roots.

Strigolactones (SLs) can also have a negative effect on host plants due to their activity as germination stimulants of root parasitic weeds of the Orobanchaceae family.

Figure 2:
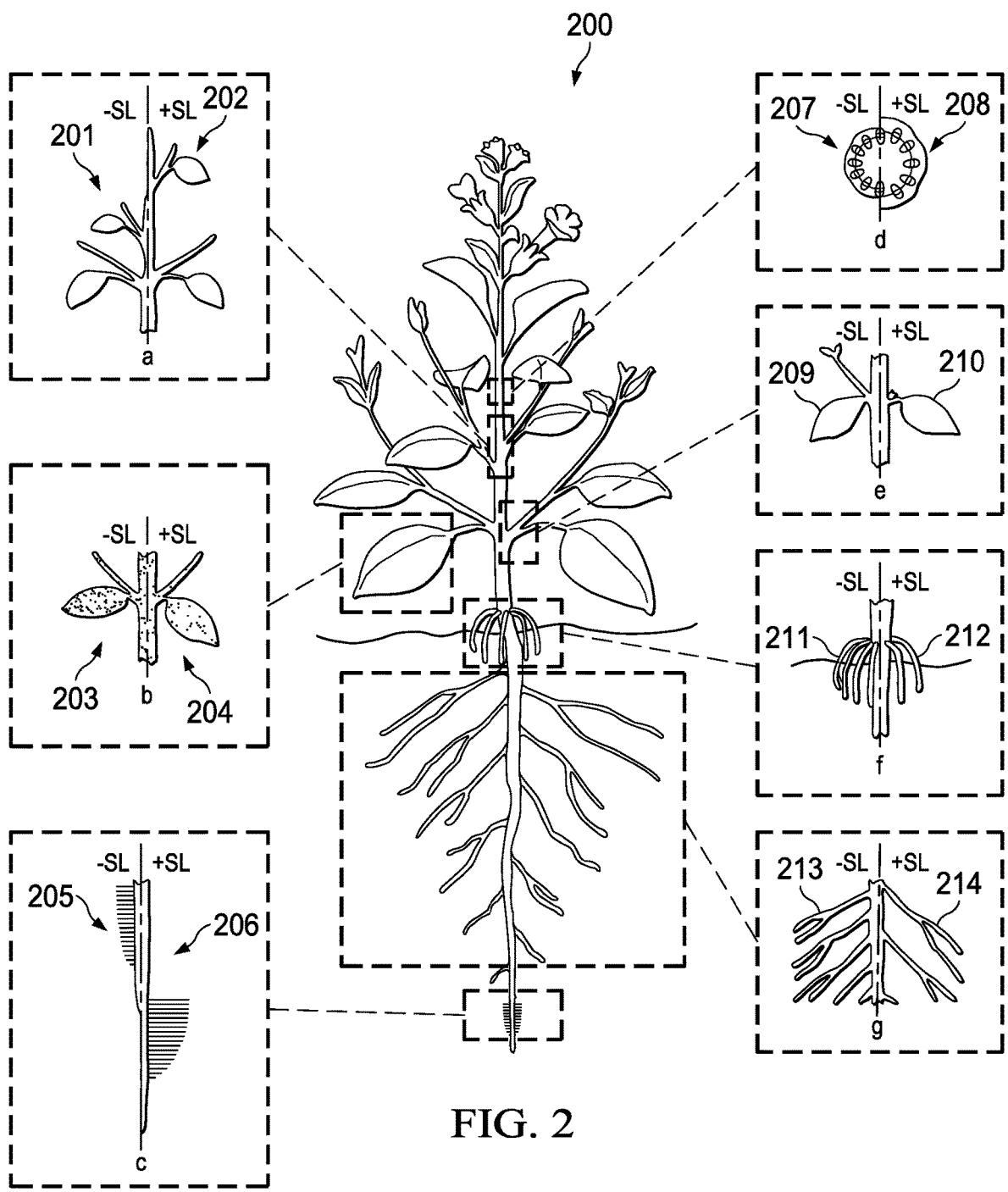
FIG. 2 shows the developmental functions of strigolactones (SLs) in a plant model.

FIG. 2 summarizes the developmental functions of SLs on a representative plant (200). (a) Lateral buds and leaves grow out of the plant stem at intervals called nodes; the intervals on the stem between the nodes are called internodes, and growth in the internode lengthens the stem. When SLs are present, growth in the plant internode is triggered (202) causing more lengthening of the stem than when SL is absent (201). (b) Plant senescence is the final stage of leaf development during which the plant recycles valuable cellular building blocks that have been deposited in the leaves during growth.

The presence of SLs accelerates leaf senescence (204) over the senescence rate when SLs are absent (203). (c) Root hairs are tiny extensions of cells in the maturation zone of roots that assist with collection of water and mineral nutrients from the soil. The presence of SLs enhances the elongation of the roots hairs (206), as well as growth of the primary roots, over the growth seen when SLs are absent (205). (d) Secondary growth results from the activity of the lateral meristematic tissue in plants leading to an increase in girth (thickness) of the plant root or stem. The presence of SLs induces secondary growth and increases stem thickness (208) over the secondary growth seen when SLs are absent (207). (e) Axillary buds are embryonic shoots at the junction of the stem and petiole of a plant, and these buds usually remain dormant.

When SLs are present, the outgrowth of axillary buds is inhibited (210) more than when SLs are absent (209). (f) Adventitious roots are roots that grow from a location other than the underground root region, such as from the plant's stem. Growth of adventitious roots is inhibited by the presence of SLs (212) compared to when SLs are absent (211). (g) Lateral roots extend horizontally from the primary root (radicle) and help to anchor the plant; however excess lateral root growth can be detrimental to the plant. Lateral root growth is inhibited by SLs (214) compared to lateral root growth when SLs is absent (213).

Root parasitic plants of the Orobanchaceae family require chemical signals for the germination of their seeds. These signals are primarily SLs, which are released by the roots of the host plant. This SL-dependent germination strategy ensures the presence of an appropriate host required for survival of the parasites.

Figure 3:
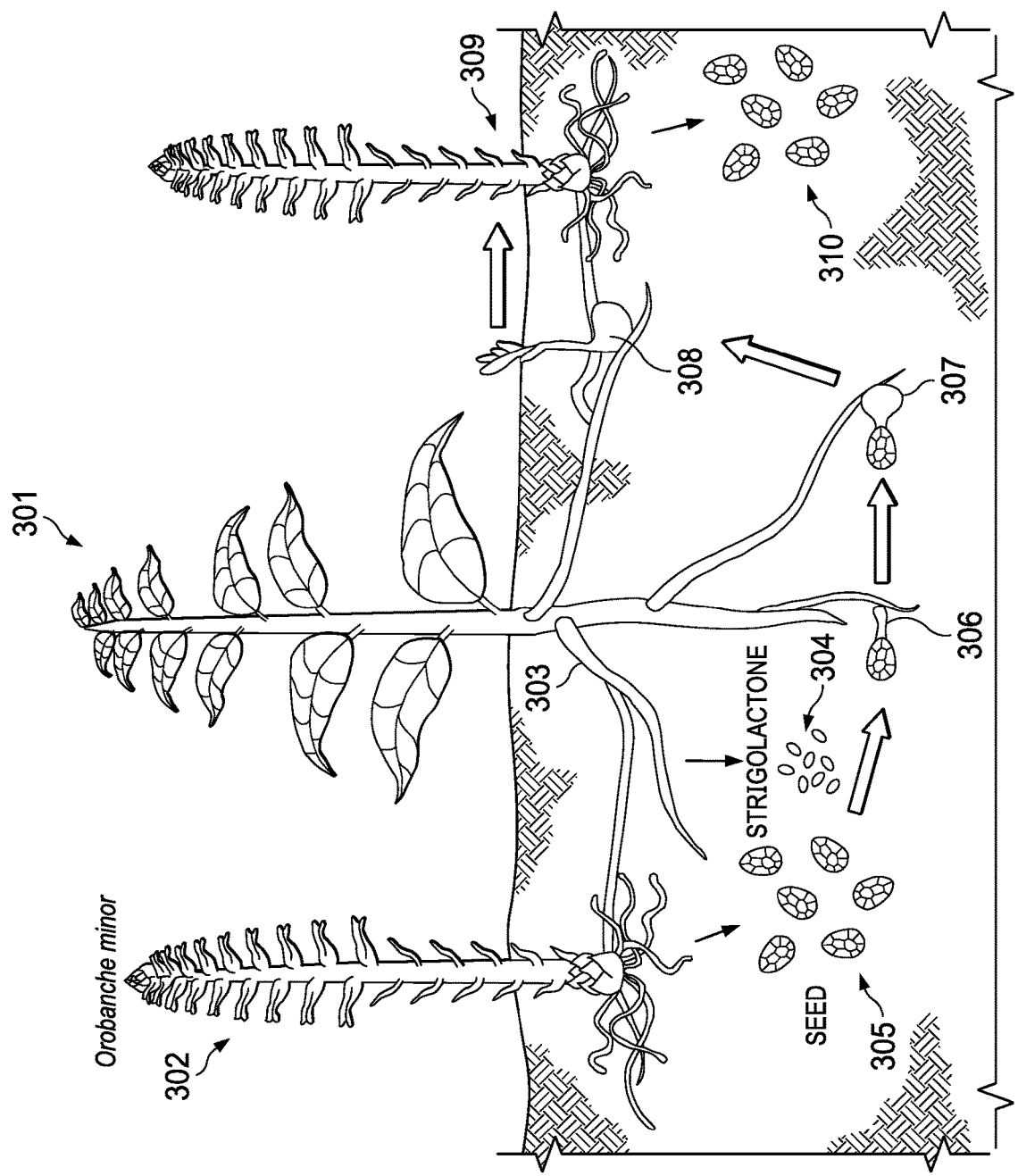
FIG. 3 shows a model life cycle of a root parasitic plant.

FIG. 3 demonstrates the life cycle of a root parasitic plant. A host plant (301) produces roots (303) and from these roots, strigolactones (304) are released into the surrounding soil. The host plant releases the SLs to promote establishment of beneficial mycorrhizal symbiosis; however, the strigolactones can also induce growth of root parasitic plants that are harmful to the host (301). A root parasitic plant (302), represented here by *Orobanche minor*, produces seeds (305) which remain un-germinated in the soil until growth is induced by SLs (304) produced by the host roots (303). After the parasite's seeds (305) germinate, the resulting parasitic seedlings (306) develop haustoria that attach to the host roots. The haustoria of the parasitic seedlings (307) penetrate host cells enabling the parasite to absorb nutrients from the host tissues. The parasitic seedlings grow below the soil surface for several weeks extracting nutrients from the roots to the detriment of the host plant. Eventually, the parasitic seedlings emerge from the soil (308) and develop into mature plants (309) that begin to produce a large number of seeds (310). These seeds (310) can remain viable in the soil for years, and if a host plant is present releasing SLs into the soil, the parasitic cycle will begin again.

These types of root parasitic weeds are responsible for enormous yield losses of crops in Africa, the Mediterranean and large parts of Asia. The *Striga* species *S. asiatica* and *S. hermonthica* infect cereals, including maize, sorghum, pearl millet, and rice, while *Orobanche* species affect crops such as sunflower, tomato and legumes. Other cereal, grain and vegetable crops, such as sugarcane, tobacco, potato, sweet potato, hemp, clover, and melons, as well as legumes, such as beans, lentils, peas and peanuts, may also be negatively affected by root parasitic weeds. *Striga hermonthica* is considered as one of the seven more severe biotic threats to food security, affecting subsistence and livelihood of 100 million people in sub-Saharan Africa. It is estimated that about 50 million hectares of land in the Sahel and Savannah zones of 25 countries in Africa are infested by this weed, causing annual losses of around US$7 billion.

Regulating strigolactone biosynthesis and release would have a beneficial effect on cereal crops grown in areas of the world where *Striga* and *Orobanche* species are prevalent. A decrease in the release of SLs from host plants (cereal crops) would reduce the number of germinating seeds of root parasitic weeds, resulting in significant reduction of the infestation. In addition, manipulation of SLs biosynthesis will allow for modulation of the plant's architecture, specifically in the increased growth of shoots and crown roots.

Strigolactone Biosynthesis

Strigolactone (SL) biosynthesis can be investigated using the genome of *Arabidopsis* plants from the Brassicaceae family. Strigolactone biosynthesis is initiated by the reversible isomerization of all-trans-β-carotene into 9-cis-β-carotene, which is catalyzed by the enzyme DWARF27 (D27) and followed by the stereospecific cleavage of 9-cis-β-carotene into a 9-cis-configured intermediate. The latter undergoes repeated oxidation/cleavage and intramolecular rearrangements lead to carlactone. This combination of reactions is catalyzed by CCD8. In rice, MAX1 homologs, Cytochrome P450 (CYP) enzymes of the 711 clade (enzyme family), convert carlactone into 4-deoxy-orobanchol, the supposed parent molecule of the orobanchol-like subfamily of SLs. Orobanchol is formed by a further rice MAX1 homolog. The *Arabidopsis* MAX1 oxidizes carlactone into carlactonoate that is methylated to methyl carlactonoate. The latter is further converted by the Lateral Branching Oxidoreductase (LBO) into a yet unidentified product.

Figure 4:
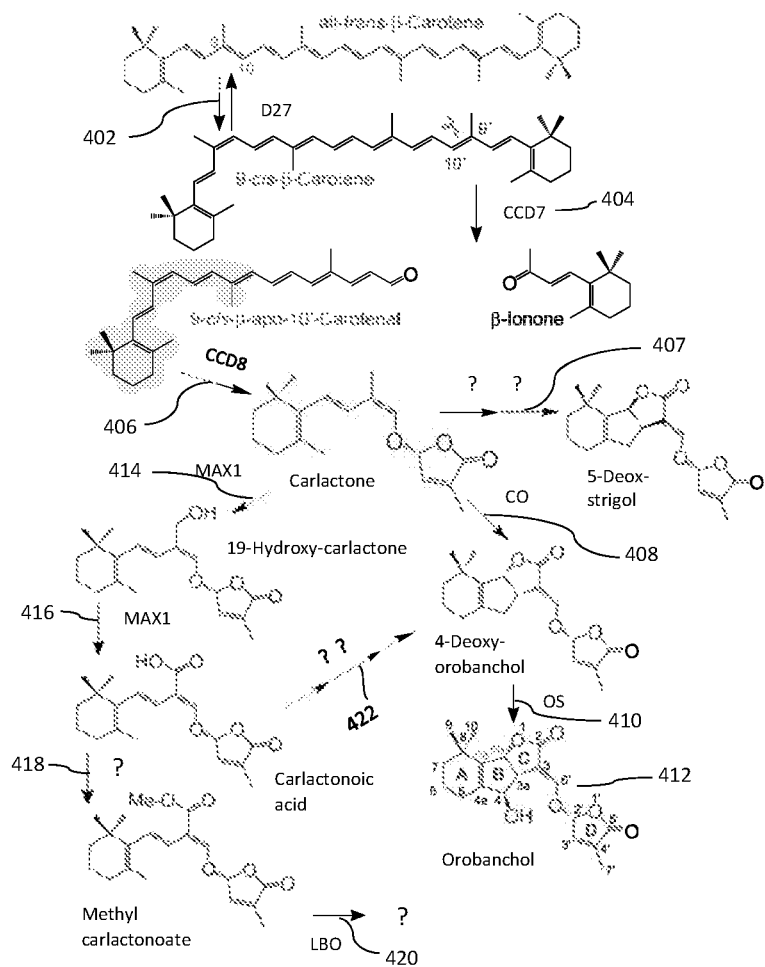
FIG. 4 is a schematic of strigolactone structures and biosynthesis.

FIG. 4 is a schematic of the basic catalytic pathways for strigolactone structures and biosynthesis. Canonical SLs, such as orobanchol (412—shown with C atom numbering), consist of a tricyclic lactone (ABC ring) that is connected to a further cyclic lactone (D-ring) by an enol ether bridge. They are divided based on the stereochemistry of the C8b/C3a atoms into the strigol—(i.e. 5-deoxy-strigol) and orobanchol-like subfamilies.

The reversible 9-cis/all-trans isomerization of β-carotene, which is catalyzed by D27 (402), leads to 9-cis-β-carotene. CCD7 then cleaves (404) the latter at the C9'-C10' double bond, to yield 9-cis-β-apo-10'-carotenal and β-ionone. The central enzyme CCD8 converts (406) the bracketed region (405) of 9-cis-β-apo-10'-carotenal into carlactone. In rice, carlactone is the substrate of the carlactone oxidase (408—CO, Os900), a CYP (711 clade), which catalyzes repeated oxygenation and ring closures to form 4-deoxyorobanchol the parent molecule of the orobanchol-like SLs. A second CYP of the same clade, orobanchol synthase (410—OS, Os1400) converts 4-deoxyorobanchol into orobanchol (412).

In *Arabidopsis*, the CO homolog MAX1 converts (414, 416) carlactone into carlactonoic acid via the intermediate 19-hydroxy-carlactone. Carlactonoic acid is methylated (418) into methyl-carlactonoate and further hydroxylated (420) by the Lateral Branching Oxidoreductase (LBO) into a yet unidentified product. In rice, carlactonoic acid is likely a further precursor of 4-deoxyorobanchol (407). 5-Deoxystrigol, the parent of the strigol-like SLs is supposedly formed from carlactone by yet unidentified CYPs (407)

Zaxinone Synthase Mutant

A survey on CCDs of grasses revealed a clade missing in *Arabidopsis*. The distribution of this subgroup in the plant kingdom was analyzed, the enzymatic activity of a rice representative encoded by LOC_Os09g15240 in vitro investigated and a corresponding loss-of-function mutant was characterized. The work unraveled a carotenoid-derived, growth-regulating metabolite that inhibits SL biosynthesis at transcript level and which is required for normal rice growth and development, and a bona fide plant CCD subfamily common in most land plants.

Figure 5:
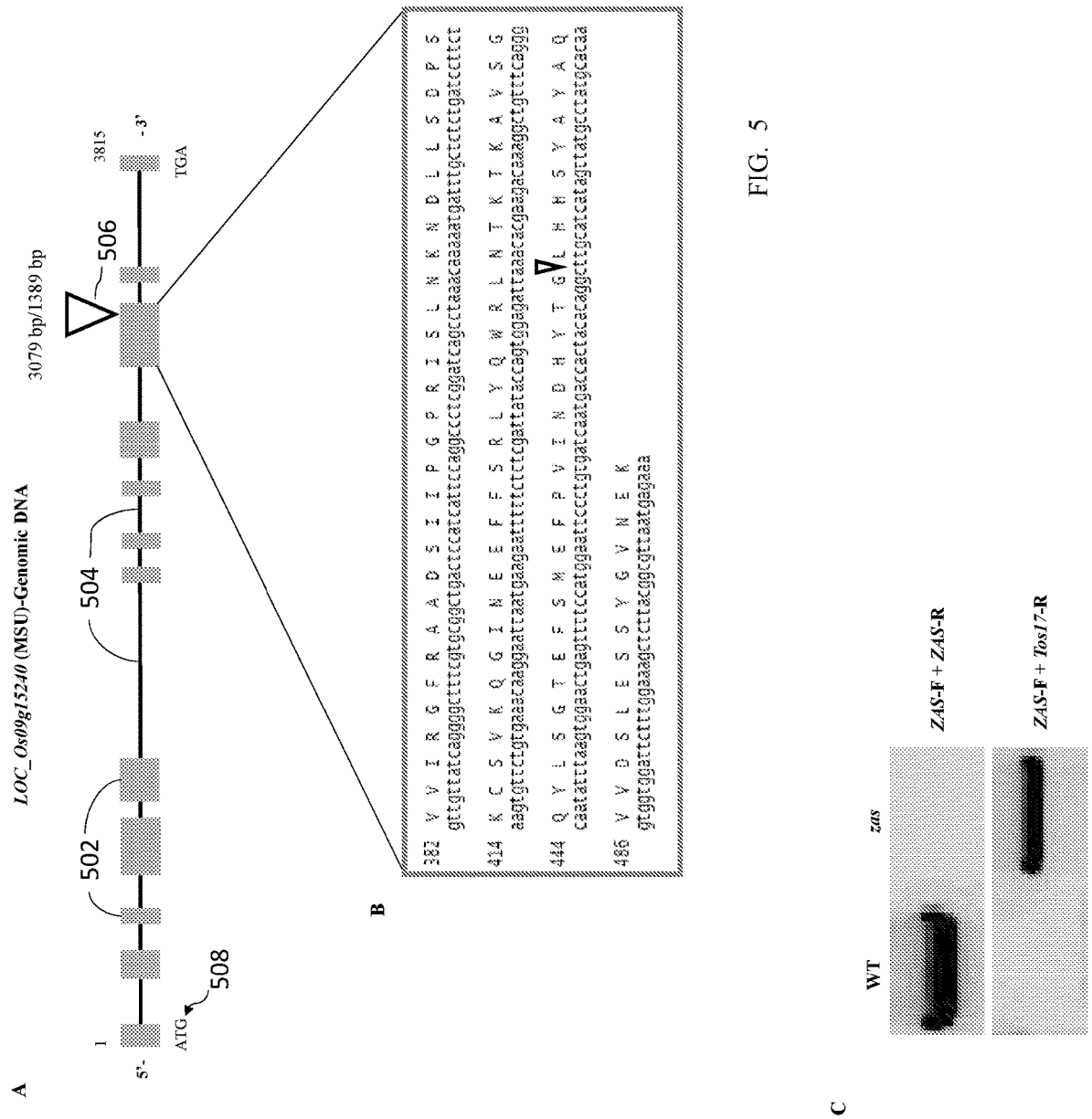
FIG. 5A-C shows the genomic sequence of Oszs and transposon insertion in an oszs mutant.

A rice transposon insertion mutant (*Oryza sativa* Nipponbare background, see FIG. 5) was characterized that is affected in the zaxinone synthase gene. The mutant showed elevated transcript levels of the SL biosynthetic genes D27 (DWARF27), D17 (CCD7), D10 (CCD8) and the rice Os900 (a MAX1). FIG. 5A shows a gene structure of rice ZAS gene (LOC_Os09g15240-MSU) and the Tos17 insertion site. Exons are indicated by the grey boxes separated by intron (solid lines). The A of ATG designates nucleotide 1 and the nucleotide triplet TGA indicates the stop codon. An arrow indicates the Tos17 insertion site with its position in the genomic (3079 bp) and in the coding sequence (1389 bp).

FIG. 5B shows the nucleotide and amino acid sequence of exon 10 carrying Tos17 retrotranspon insertion as represented in the box. The arrow indicates the Tos17 insertion. The homozygous zas rice mutant was verified by PCR assays using ZAS-specific primers (F+R) and ZAS- and Tos17-specific primers (FIG. 5C).

Genomic sequence of Oszs (LOC_Os09g15240) and transposon insertion in the oszs mutant is shown in the FIG. 5 schematic. Oszs genomic DNA is composed of twelve exons (502) and eleven introns (504), indicated by black boxes and black bars, respectively. The insertion site (506) of Tos17 in the NC0507 mutant line (*Oryza sativa* Nipponbare background) is indicated by a triangle. The position of the insertion is in the tenth exon (in position +3060 bp from A of the ATG (508) if considering genomic sequence, or +1370 if considering cDNA).

Figure 6:
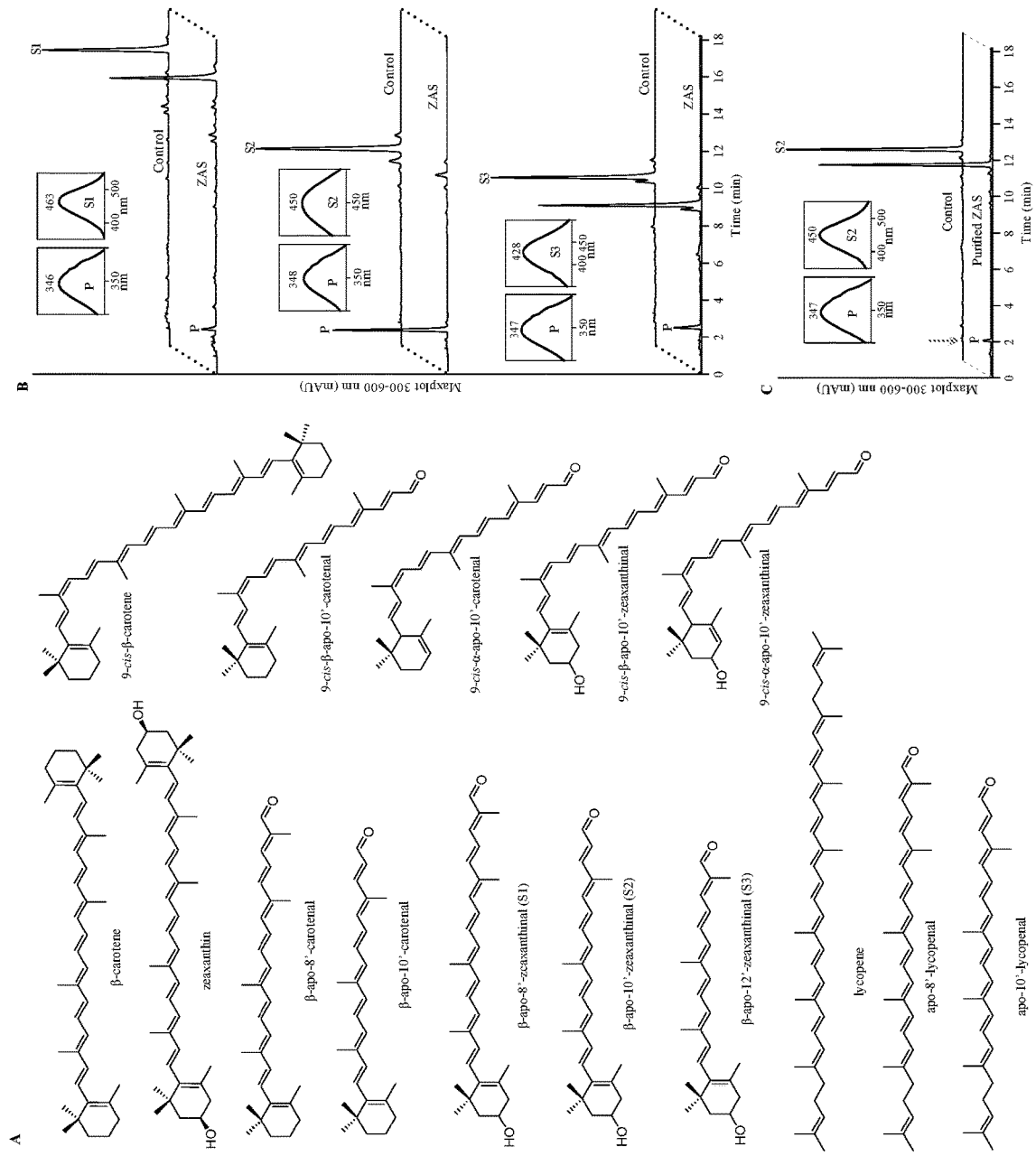
FIG. 6A-B shows UHPLC analysis of crude and purified ZAS incubation with carotenoids and apocarotenoids.

The expressed LOC_Os09g15240 cDNA was fused to thioredoxin in *Escherichia coli* cells and the soluble fraction of these cells was incubated with different carotenoids and apocarotenoids in vitro (FIG. 6). FIGS. 6A-C show UHPLC analysis of crude and purified ZAS incubation with carotenoids and apocarotenoids. FIG. 6A shows structures of apocarotenoids used as substrates in ZAS in vitro assays. In FIG. 6B, it is seen that crude ZAS converted only three of all substrates from 6A (S1, S2 and S3), including apo-8'-zeaxanthinal (S1), apo-10'-zeaxanthinal (S2), and apo-12'-zeaxanthinal (S3), into zaxinone (P). FIG. 6C shows a further analysis of the incubation of purified ZAS with apo-10'-zeaxanthinal (S2), which also led to zaxinone (P). The UV-visible spectra of the substrates (S1, S2, and S3) and product (P) are shown in the insets in FIGS. 6B and 6C, wherein mAU=arbitrary units.

In this assay, the cleavage of 3-OH-apocarotenals (zeaxanthinals) was detected with different chain lengths, i.e. apo-8'-($C_{30}$), apo-10'-($C_{27}$) and apo-12'-zeaxanthinal ($C_{25}$), at the C13,C14 double bond (701, seen in FIG. 7A), yielding apo-13-zeaxanthinone (3-OH-β-apo-13-carotenone, $C_{18}$) identified in HPLC and LC-MS analysis by comparison to an authentic standard. This reaction was confirmed by incubating purified GST-fusion of this enzyme with apo-10'-zeaxanthinal.

Figure 7:
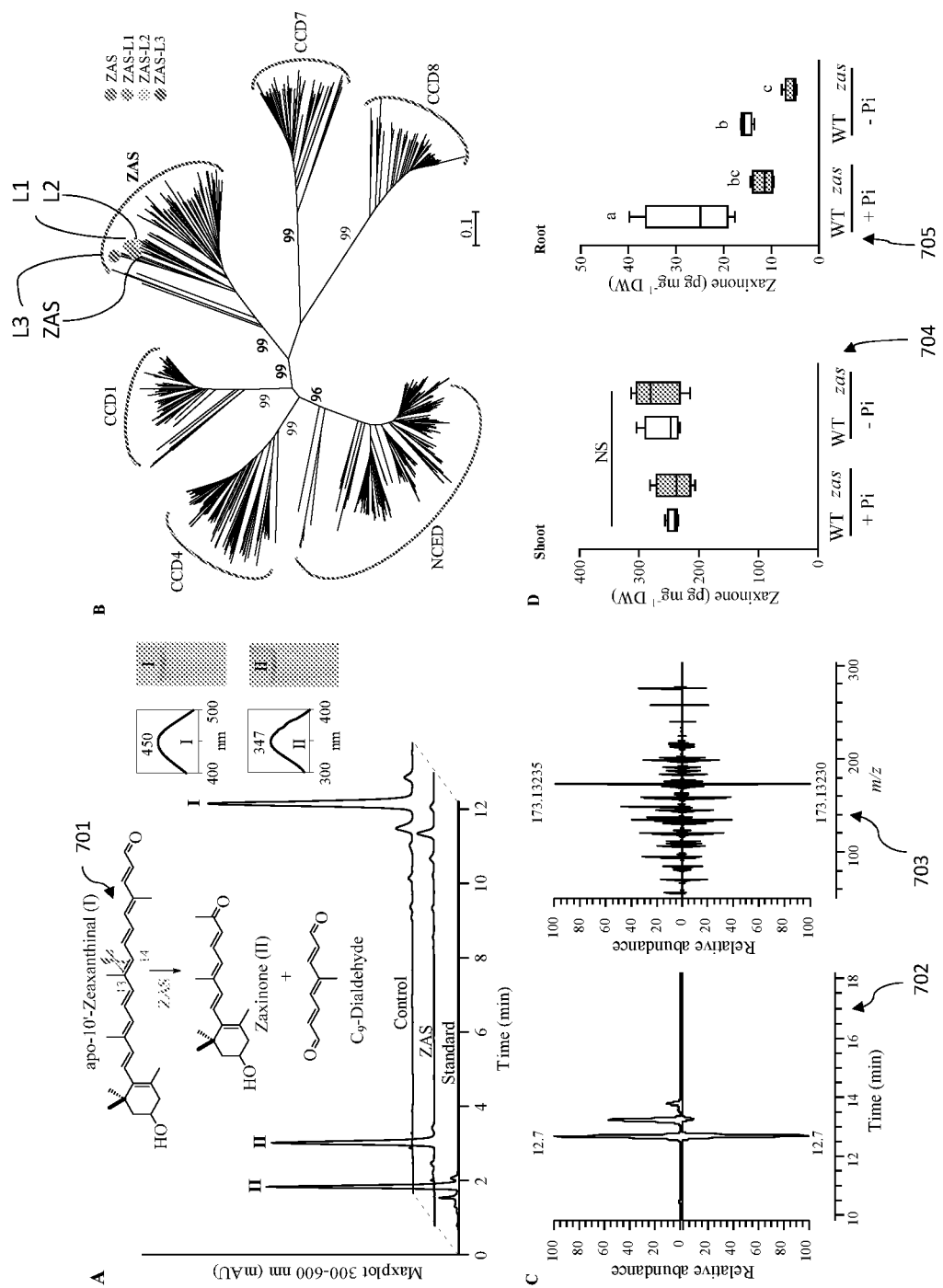
FIG. 7A-D shows a characterization of ZAS with HPLC analysis, a neighbor-joining tree of plant CCD orthologues, mass and MS/MS patterns, and quantification of endogenous zaxinone.

FIG. 7 A-D shows a characterization of ZAS. FIG. 7A shows HPLC analyses of in vitro incubation of ZAS with apo-10'-zeaxanthinal (I) yielded zaxinone (II) and a $C_9$-dialdehyde. FIG. 7B is a neighbor-joining tree of 782 plant CCD orthologues, showing bootstrap values on nodes of NCED, CCD1, CCD4, ZAS, CCD7, and CCD8 clusters only. Additional details of this tree and its bootstrap values are found in FIG. 13. Circles represent sequences of ZAS and its orthologues ZAS-L1, L2 & L3. The scale bar indicates estimated 0.1 change per amino acid. In FIG. 7C, identification of endogenous zaxinone in rice is expressed based on retention time (702), accuracy mass and MS/MS pattern (703), in comparison to an authentic standard. FIG. 7D shows quantification of endogenous zaxinone in wildetype and zas mutant shoots (704) and roots (705) under normal (+Pi) and deficient (−Pi) phosphorus supply. Data are means±SD (n=4). Different letters denote significant difference following a One-way ANOVA test (P<0.05).

Figure 8:
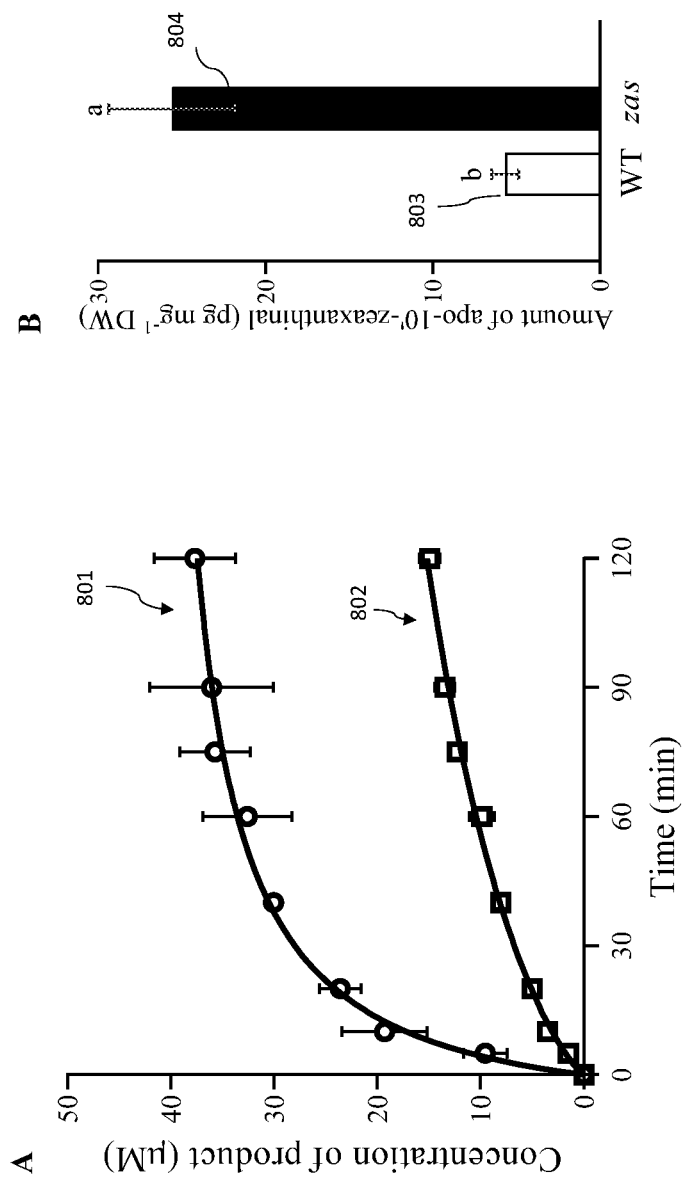
FIG. 8A-B shows graphically the specificity of apo-10'-zeaxanthinal for ZAS.

This product is designated zaxinone and the LOC_Os09g15240-encoded enzyme is designated Zaxinone Synthase (ZAS). To further determine the substrate preference of ZAS, the conversion of apo-10'- and apo-8'-zeaxanthinal was measured over time, which unraveled the former as the best substrate (FIGS. 8A & 8B). FIGS. 8A and 8B show the specificity of apo-10'-zeaxanthinal for ZAS. FIG. 8A shows, in vitro, the conversion rate curve of zaxinone from apo-10'-zeaxanthinal (801) and apo-8'-zeaxanthinal (802) catalyzed by ZAS. FIG. 8B shows quantification of apo-10'-zeaxanthinal in WT (803) and zas (804) roots. Data are the means±SD (n=3). Different letters above each bar denote a significant difference following a One-way ANOVA test (P<0.05). The cleavage of apo-10'-zeaxanthinal ($C_{27}$) to zaxinone ($C_{18}$) must yield a second product, presumably, an unstable dialdehyde with a $C_9$ chain length.

Figure 9:
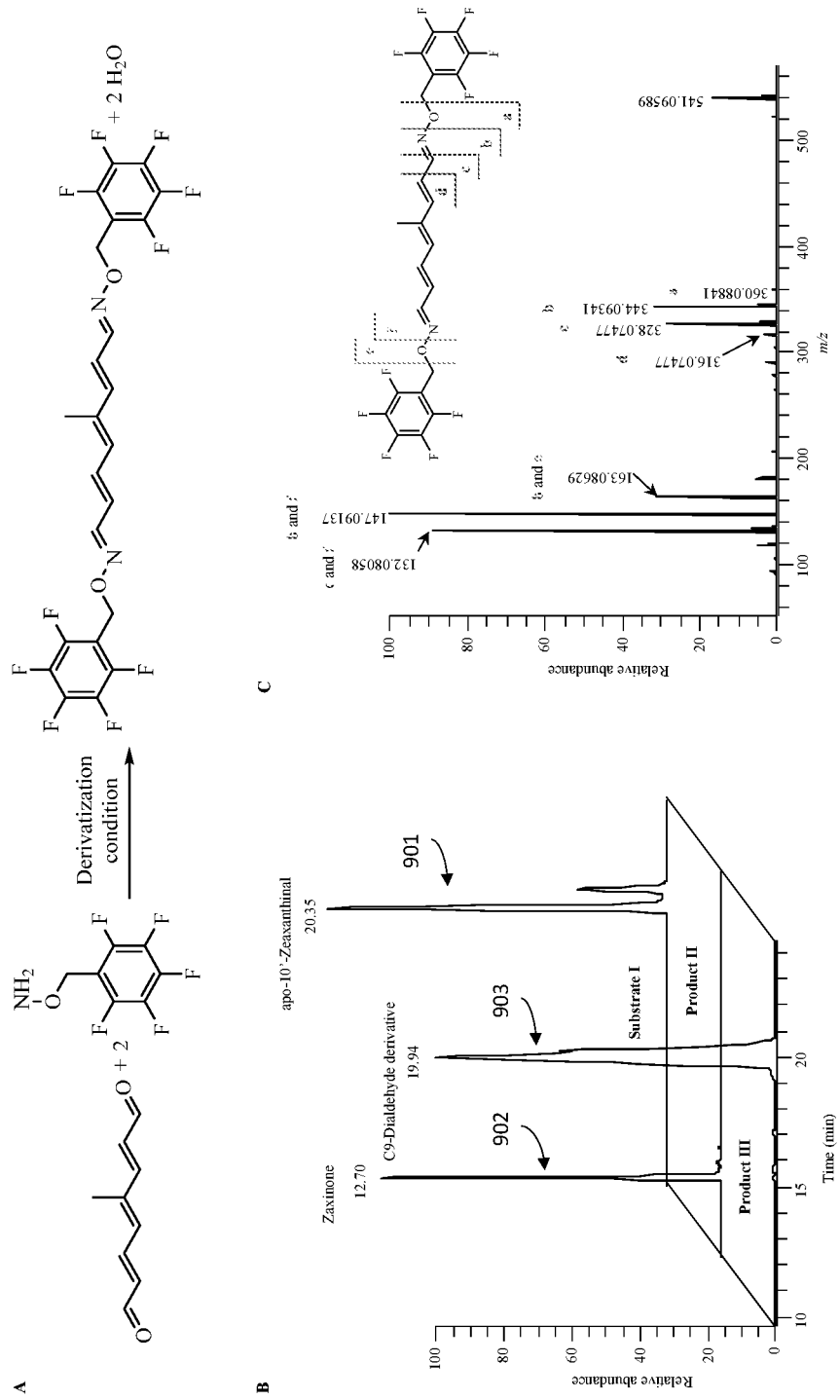
FIG. 9A-C shows identification of a C9-dialdehyde produced from apo-10'-zeaxanthinal after derivatization reaction by using LC-MS/MS.

FIGS. 9A-9C show identification of the $C_9$-dialdehyde produced from apo-10'-zeaxanthinal after derivatization reaction by using LC-MS/MS. FIG. 9A is the derivatization reaction of $C_9$-dialdehyde; and FIG. 9B shows the extracted ion chromatography of substrate I (apo-10'-Zeaxanthinal (901)), its product II (zaxinone (902)) and product III ($C_9$-dialdehyde (903)) derivative in vitro catalyzed by ZAS. In FIG. 9C, full-scan spectra of fragment ions of the $C_9$-dialdehyde derivative is shown. Derivatization with O-(2,3,4, 5,6-Pentafluorobenzyl) hydroxylamine hydrochloride enabled unequivocal identification this product, by using UHPLC-MS/MS analysis (FIG. 7A; FIGS. 9A-C).

Figure 10:
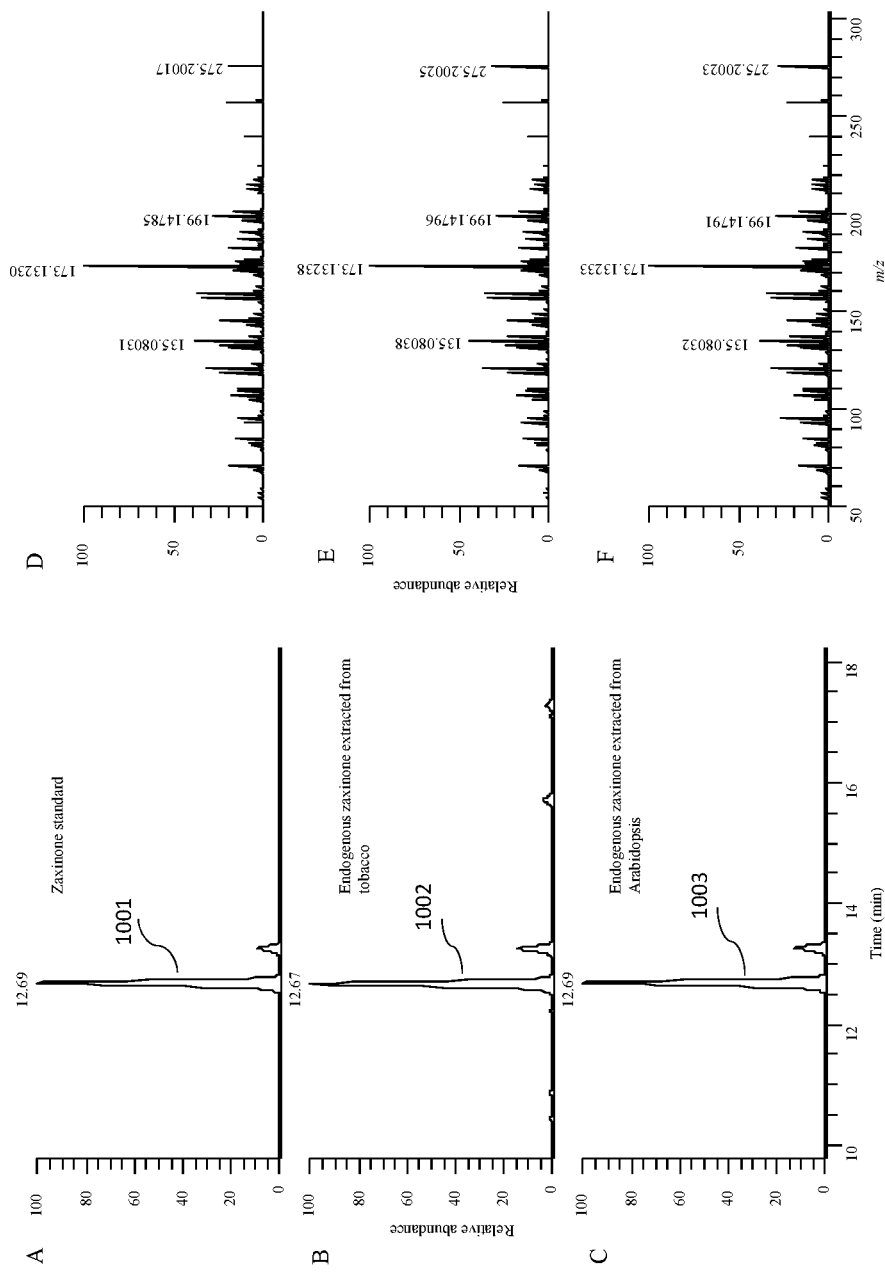
FIG. 10A-F shows the identification of endogenous zaxinone from Tobacco and Arabidopsis by using LC-MS/MS.

A protocol was developed for extraction and UHPLC-MS/MS analysis of zaxinone from plant material, which allowed unambiguous demonstration that this in vitro product is a natural metabolite present in rice (FIG. 7C) as well as in tobacco and *Arabidopsis* (FIG. 10).

FIG. 10 shows identification of endogenous zaxinone from Tobacco and *Arabidopsis* by using LC-MS/MS. Extracted ion chromatography seen in FIGS. 10 A-C demonstrate the relative abundance of zaxinone for zaxinone in tobacco (1002) and *Arabidopsis* (1003) compared to a zaxinone standard (1001). The full-scan spectra of fragment ions of zaxinone standard (FIG. 10D), zaxinone extracted from tobacco (FIG. 10E) and zaxinone extracted from *Arabidopsis* (FIG. 10F) are shown and support the identification in FIGS. 10 A-C.

Figures 1, 11C:
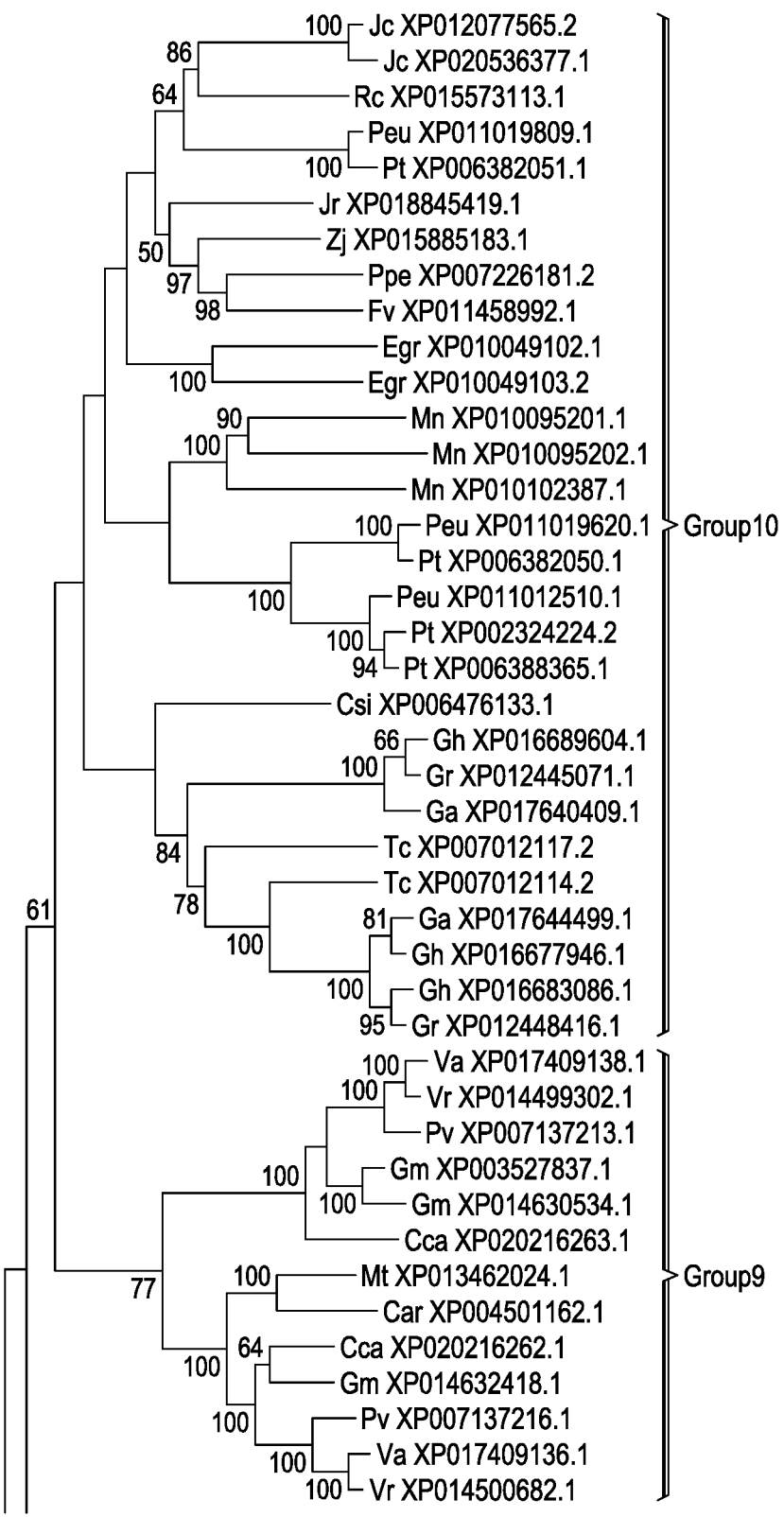
FIGS. 11C and 11D are Neighbor-joining trees of CCD orthologues of ZAS, A. thaliana and O. sativa.
Figures 2, 11C:
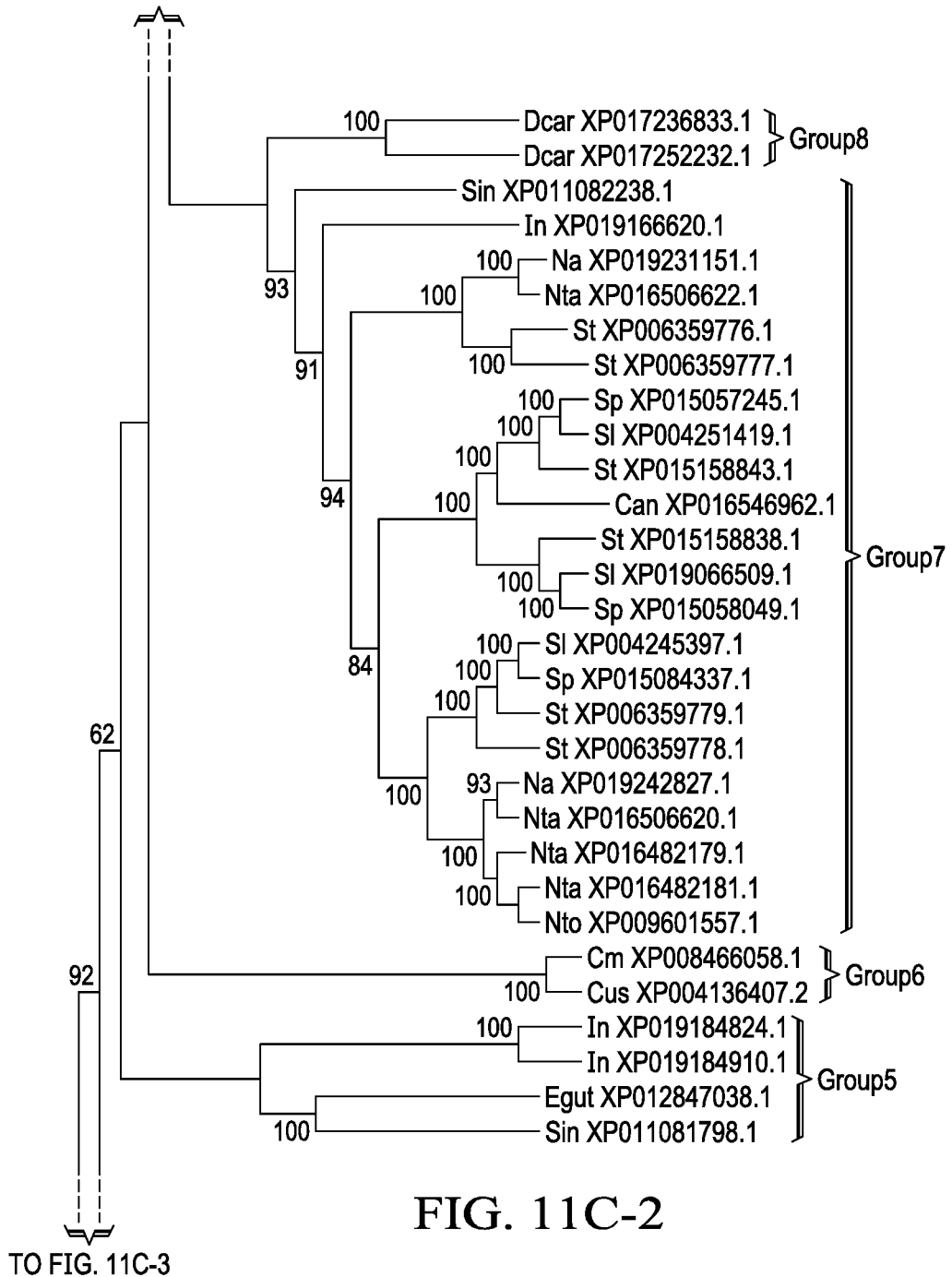
Figures 3, 11C:
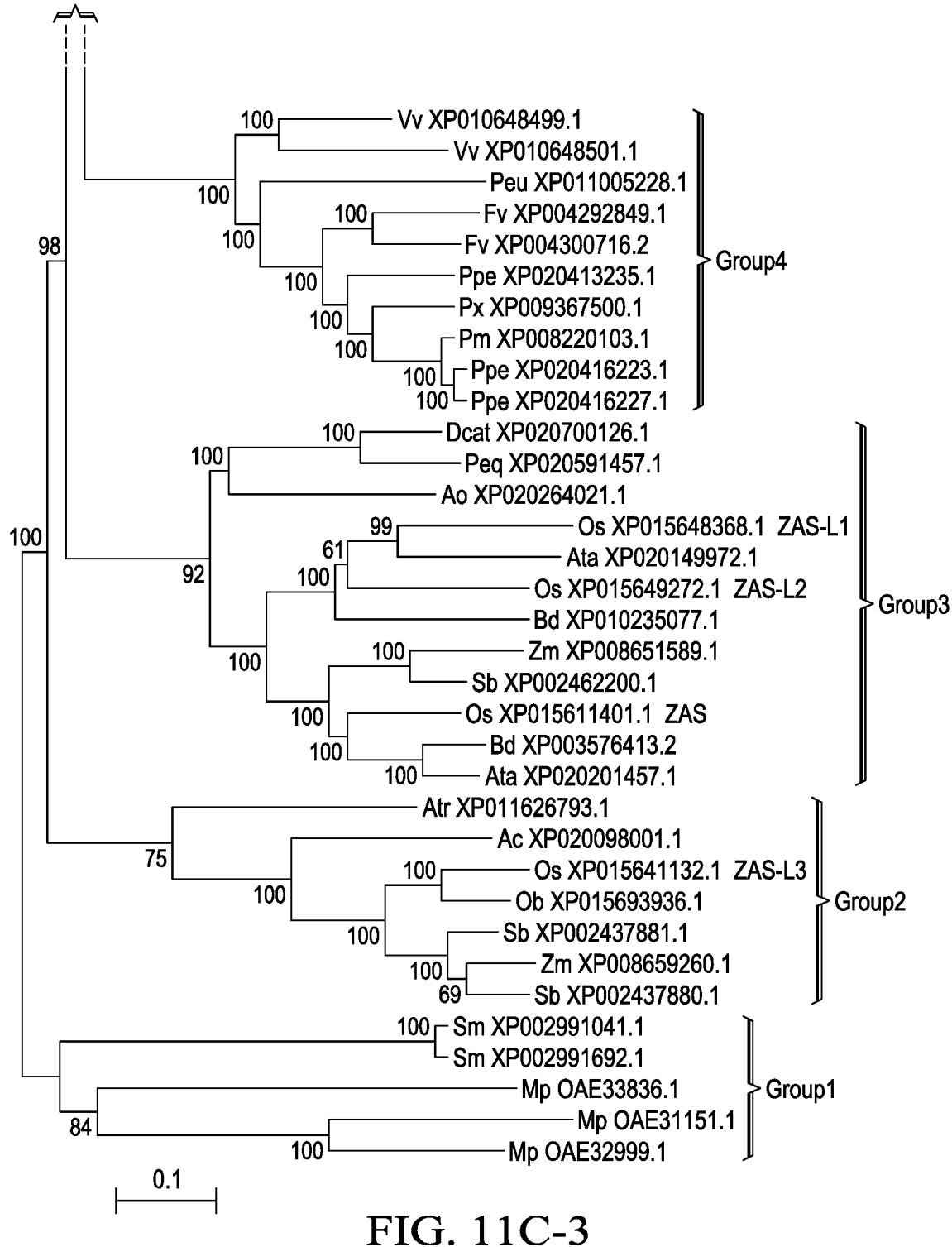
Figure 11D:
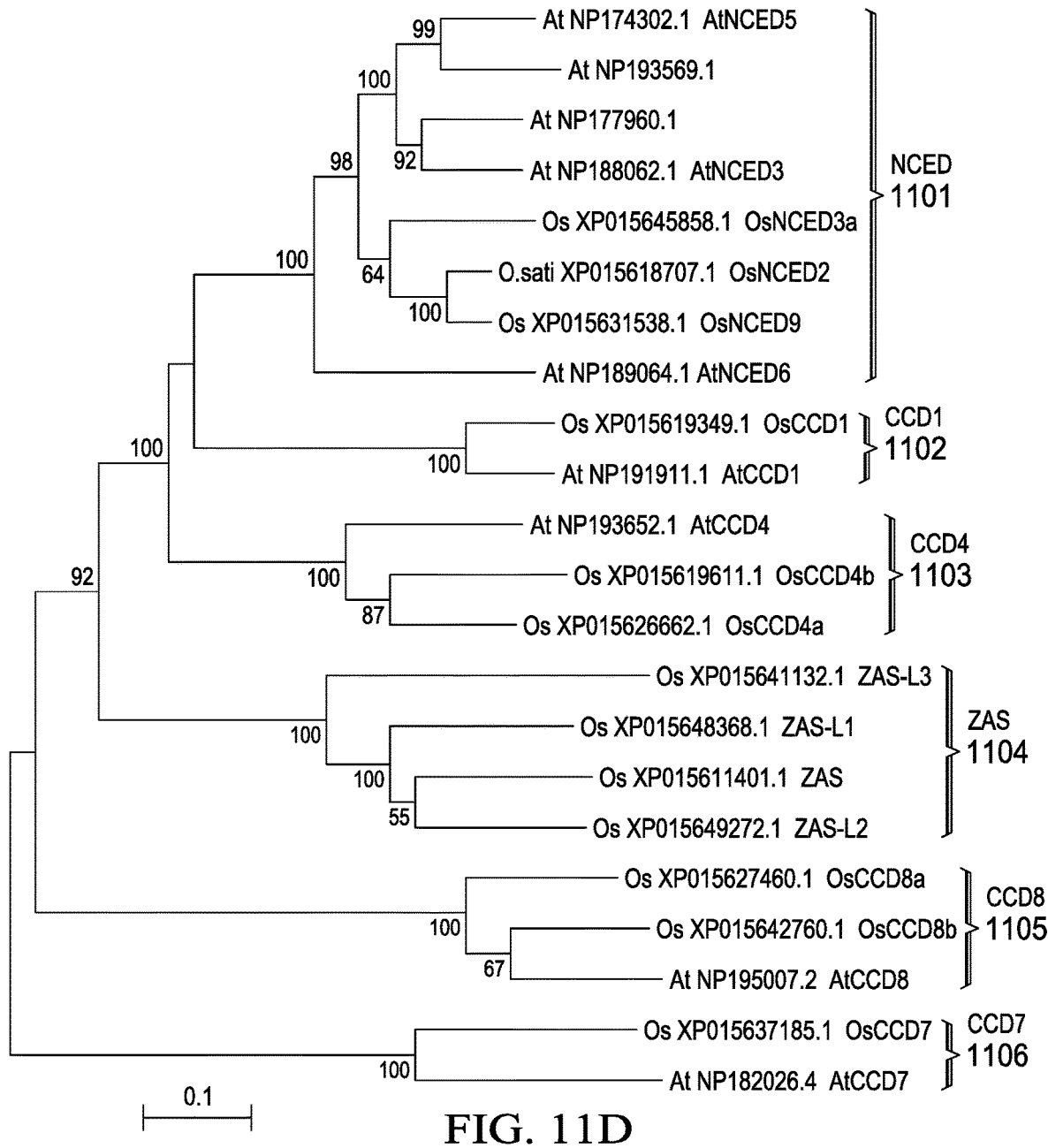
Figure 12A:
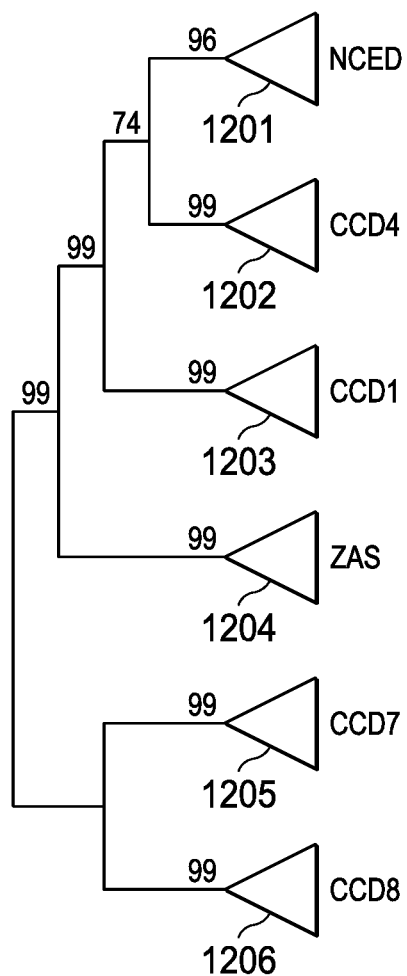
FIG. 12A-G are Neighbor-joining trees of plant CCD orthologues (dendrograms) for the whole tree, and for NCED, CCD1, CCD4, ZAS, CCD7, and CCD8.
Figures 1, 12B:
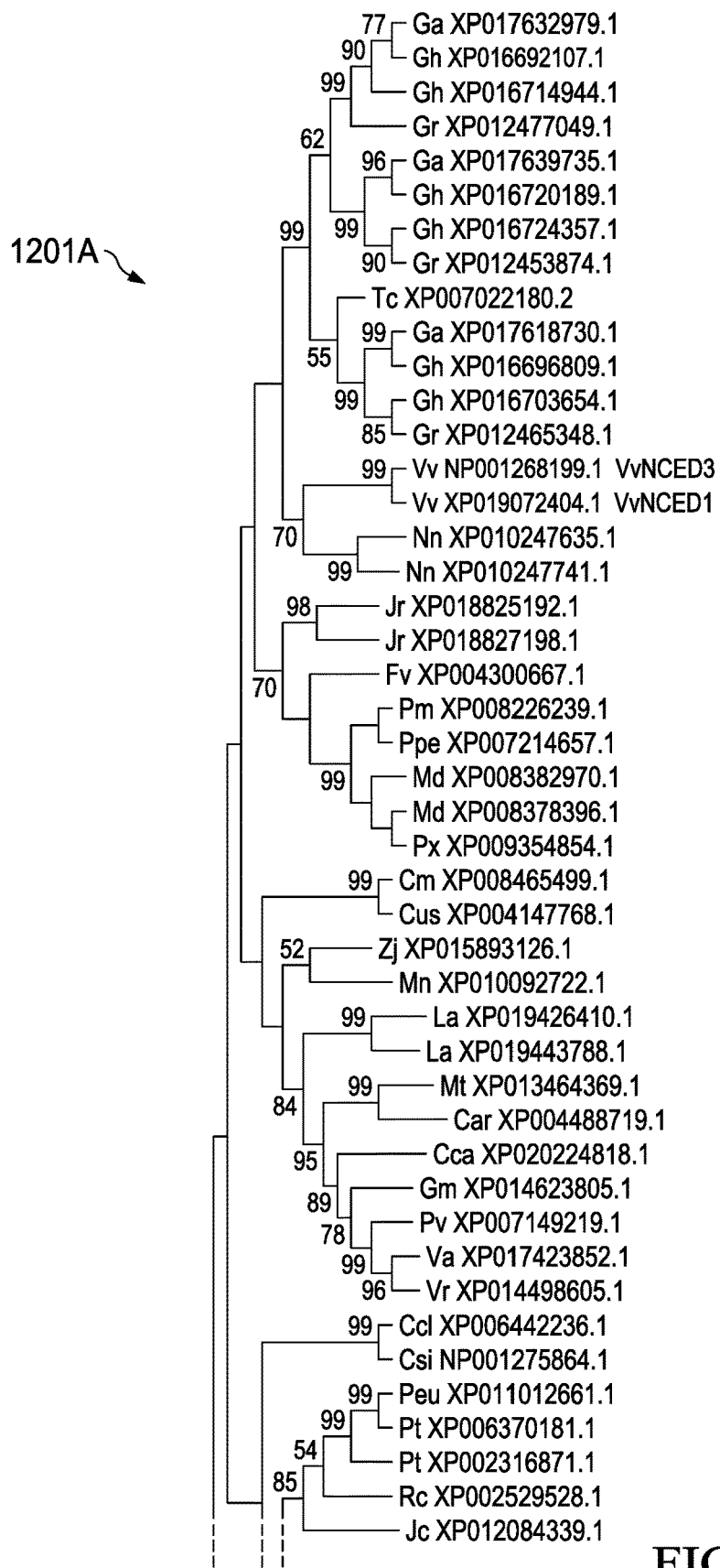
Figures 2, 12B:
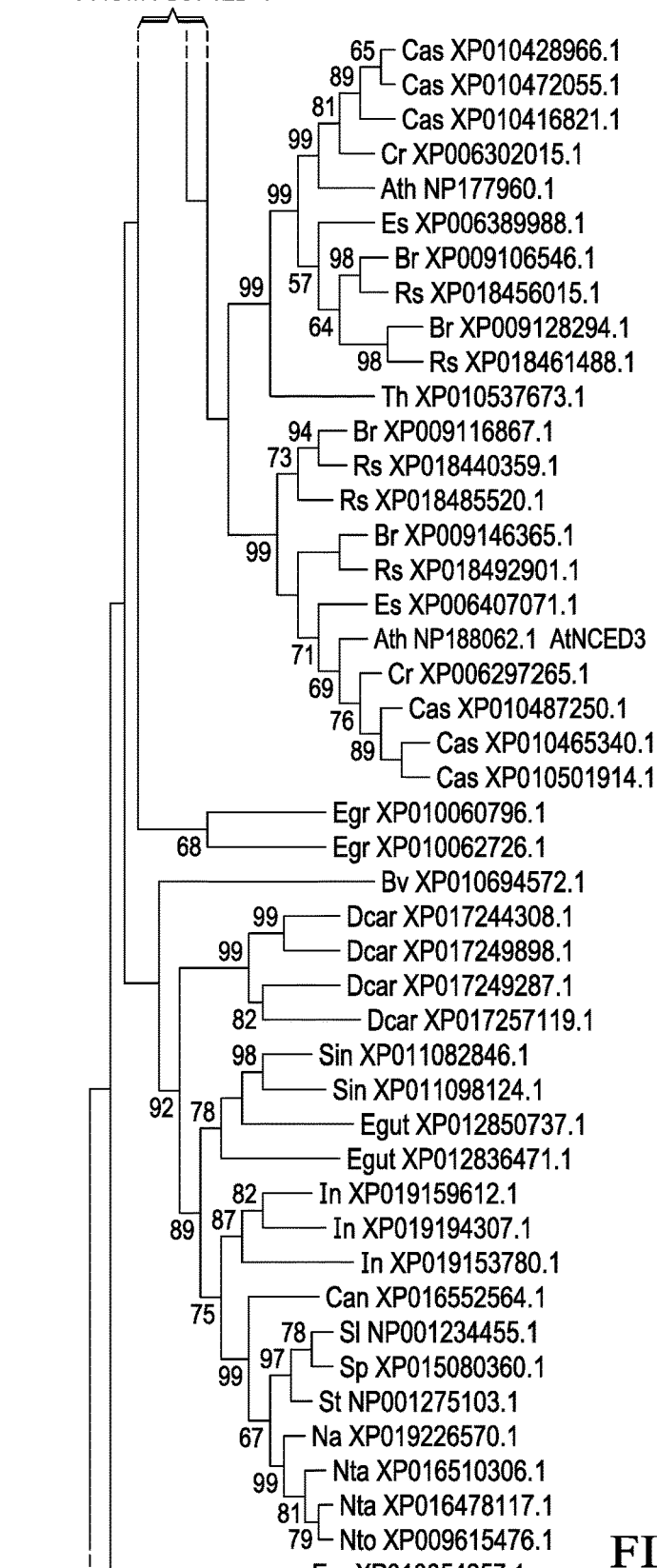
Figures 3, 12B:
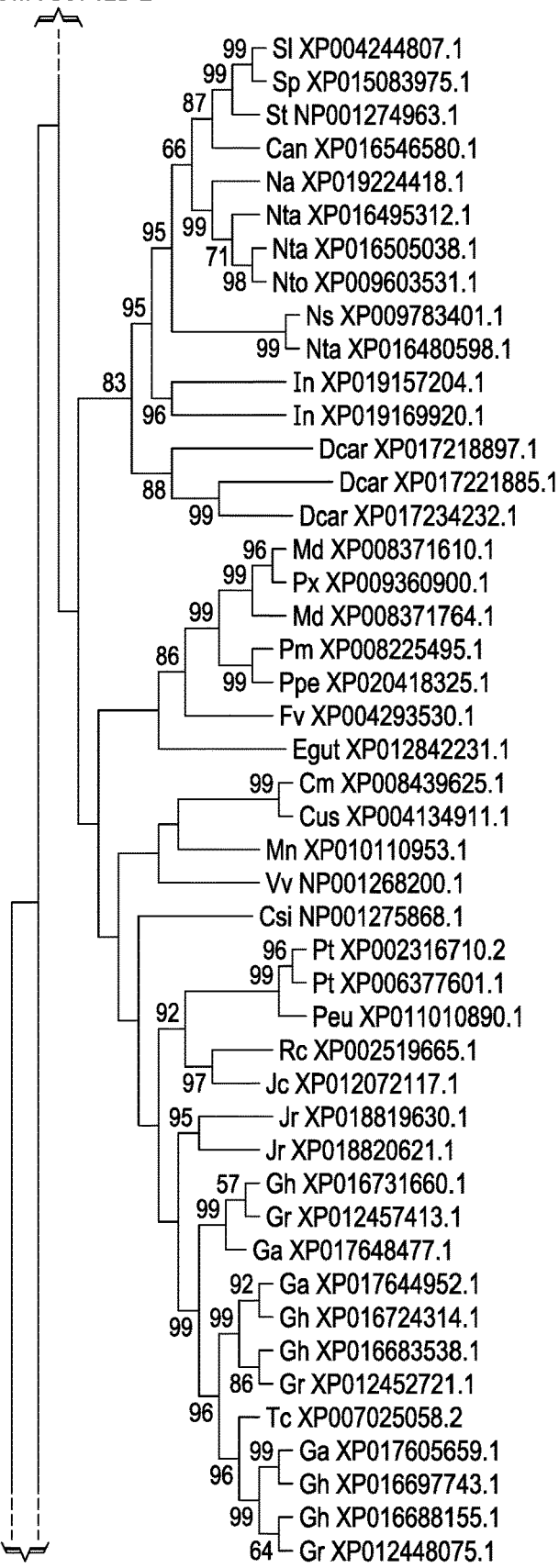
Figures 4, 12B:
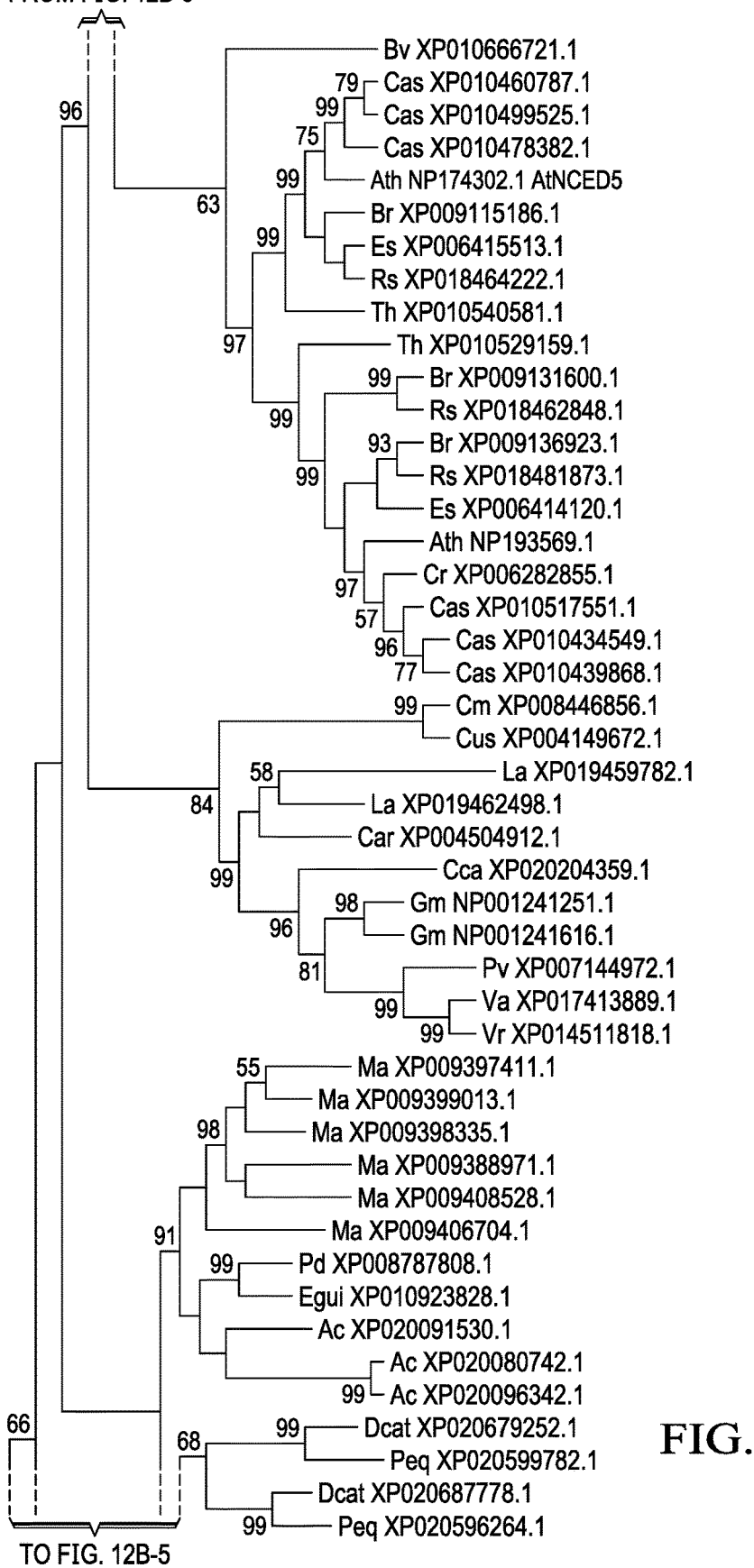
Figures 5, 12B:
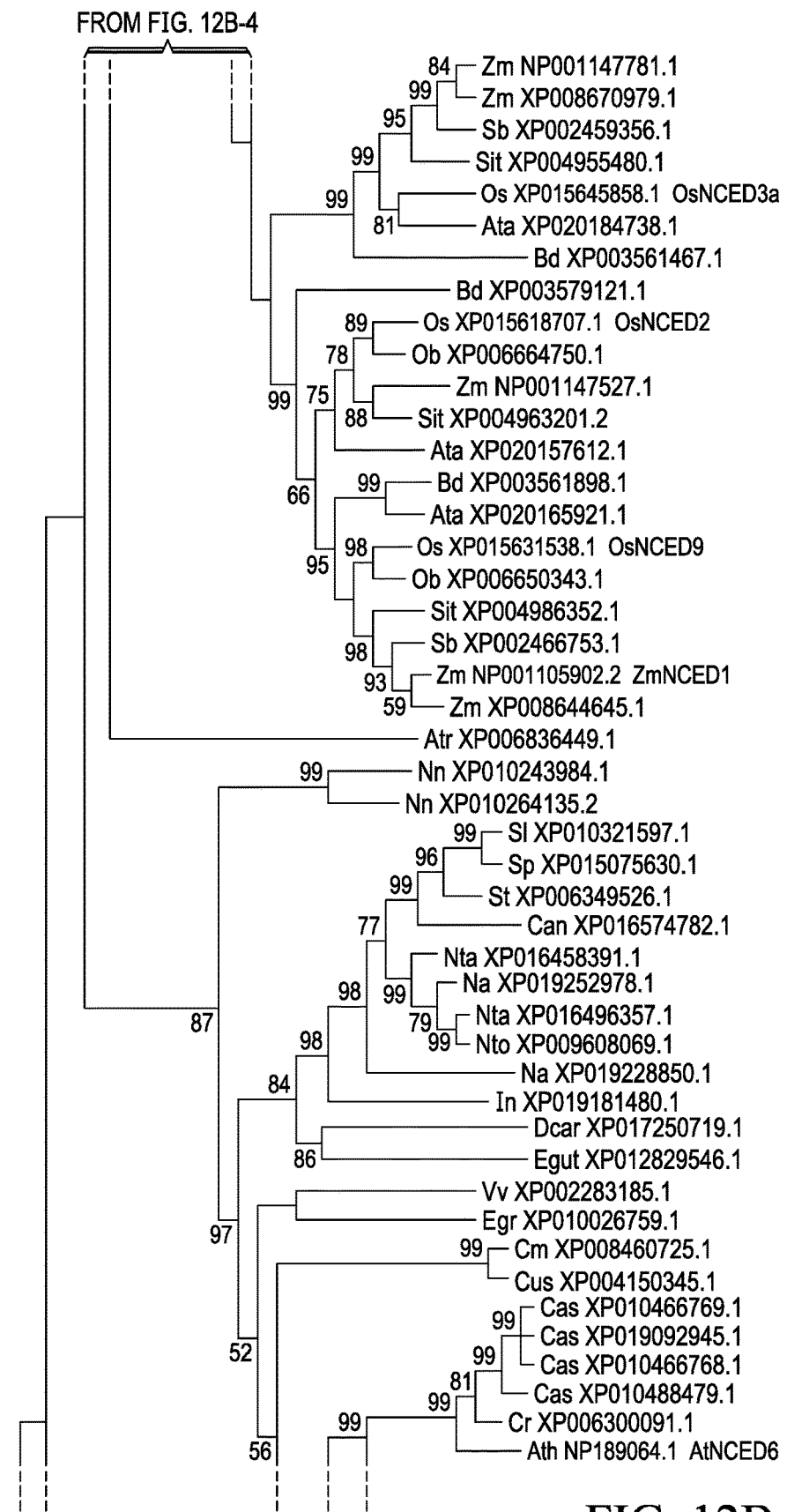
Figures 6, 12B:
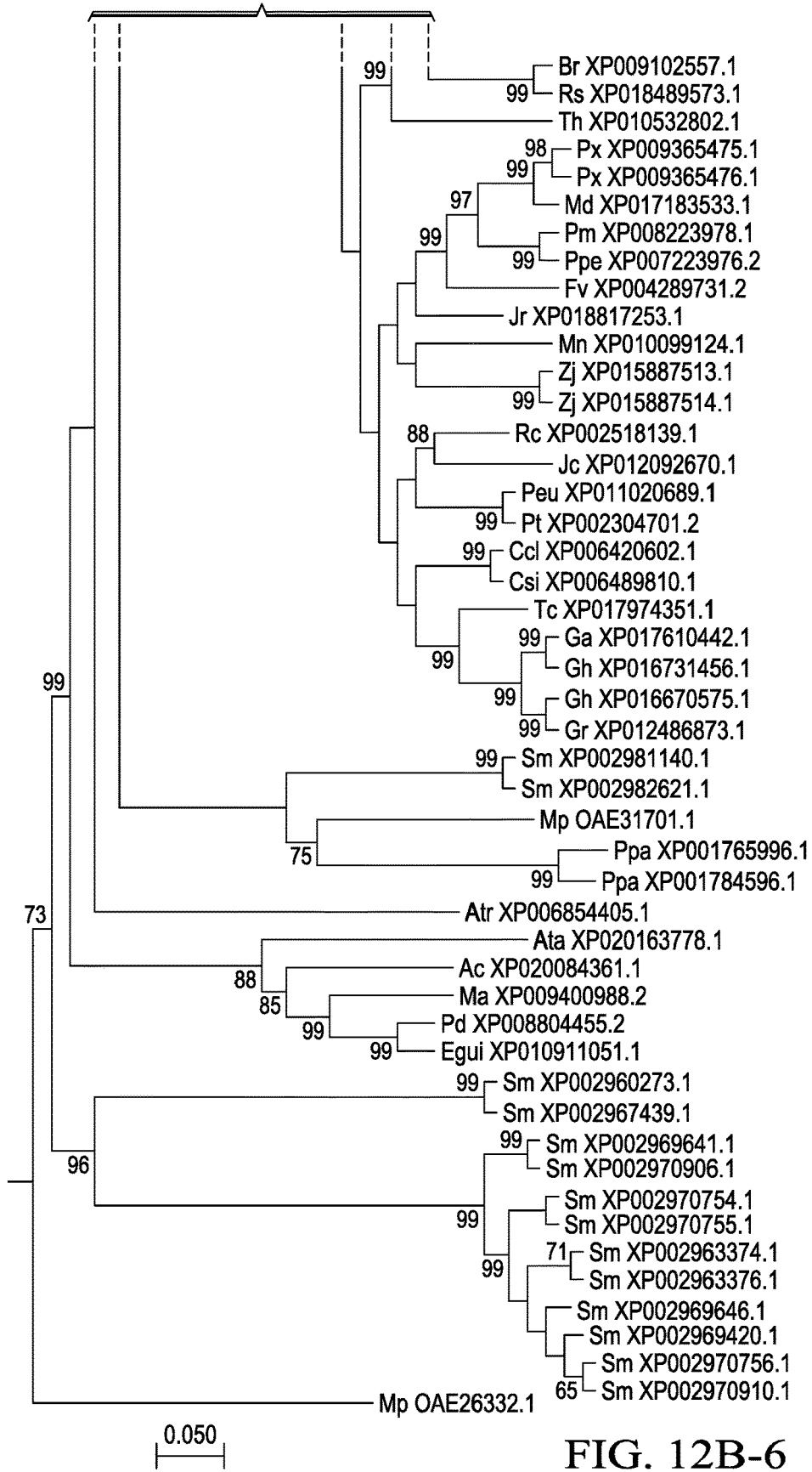
Figures 1, 12C:
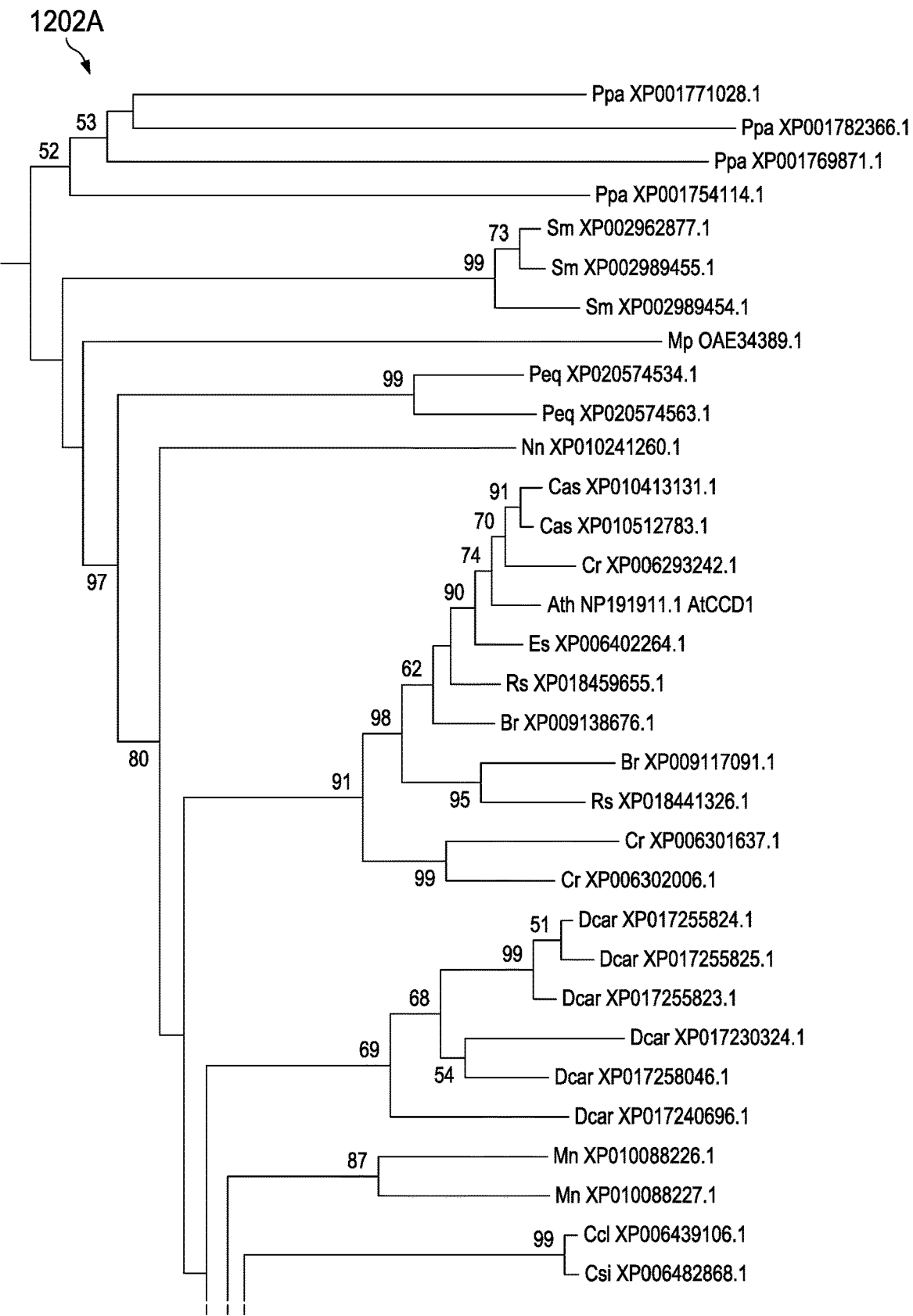
Figures 2, 12C:
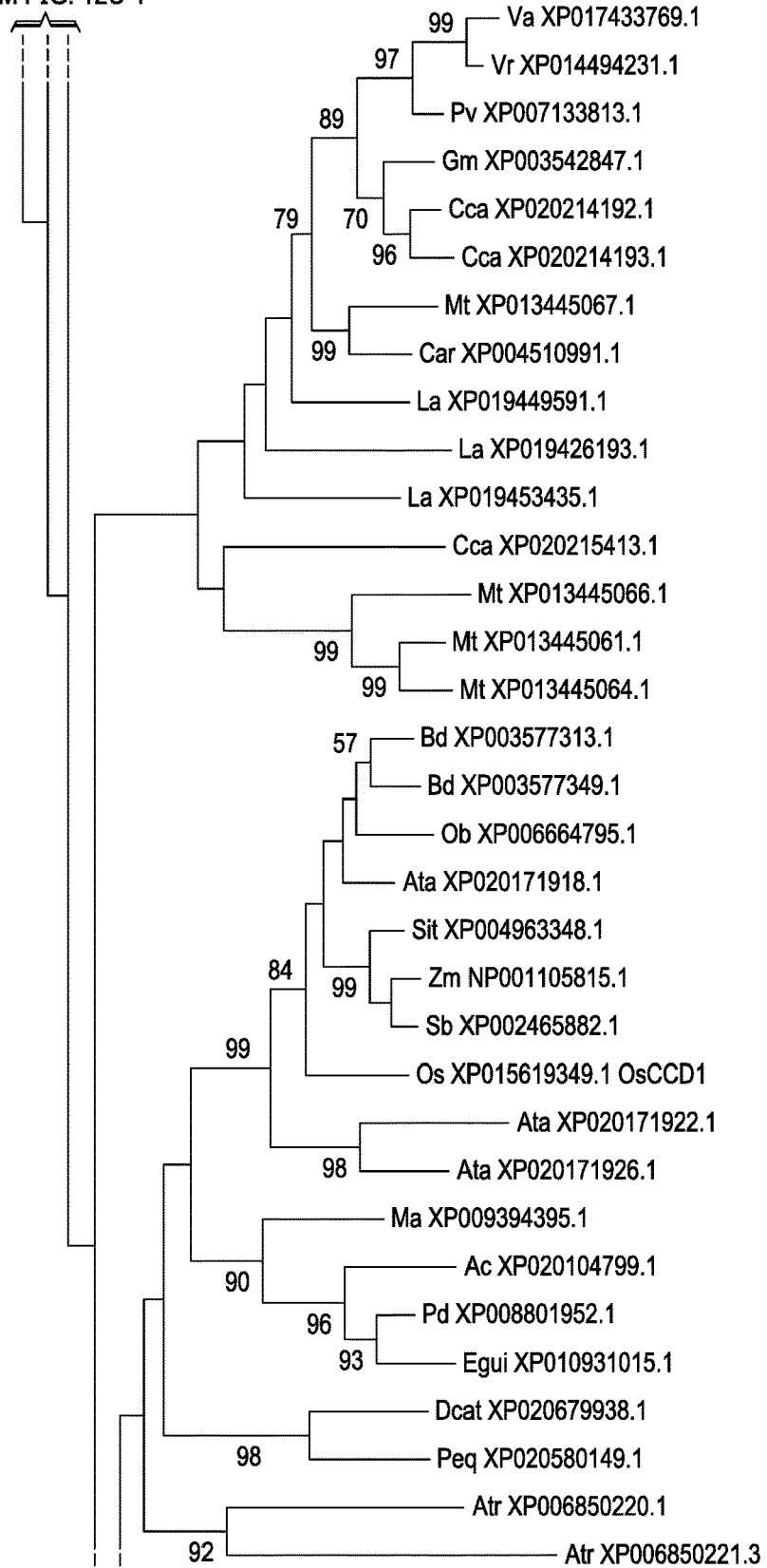
Figures 3, 12C:
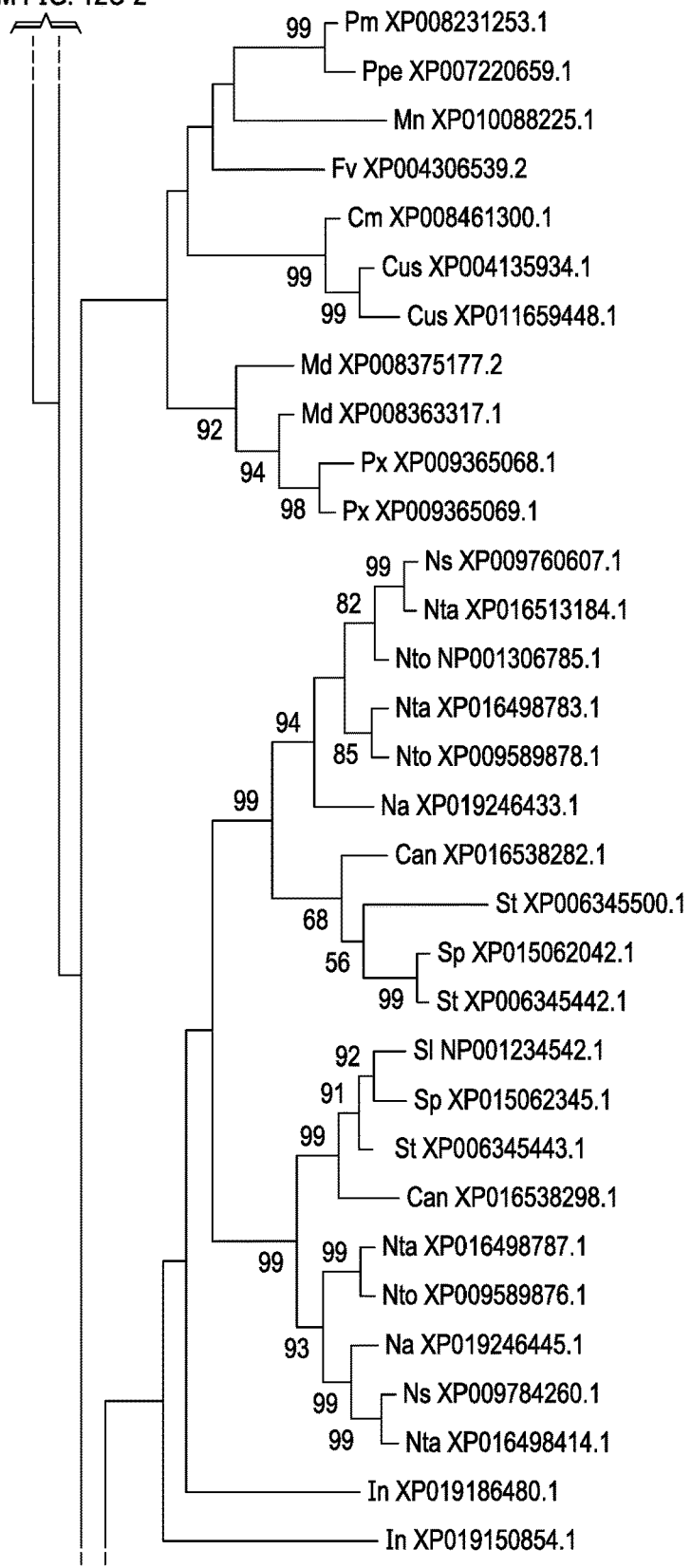
Figures 4, 12C:
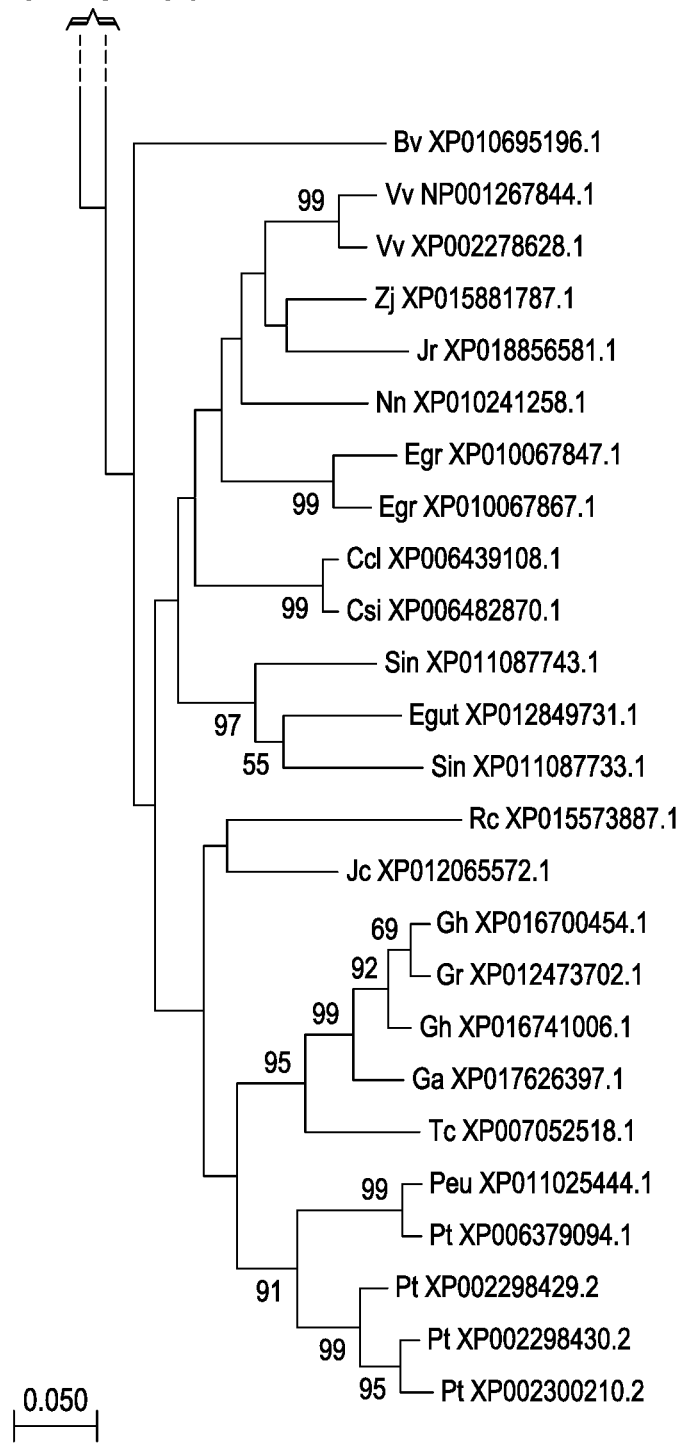
Figures 1, 12D:
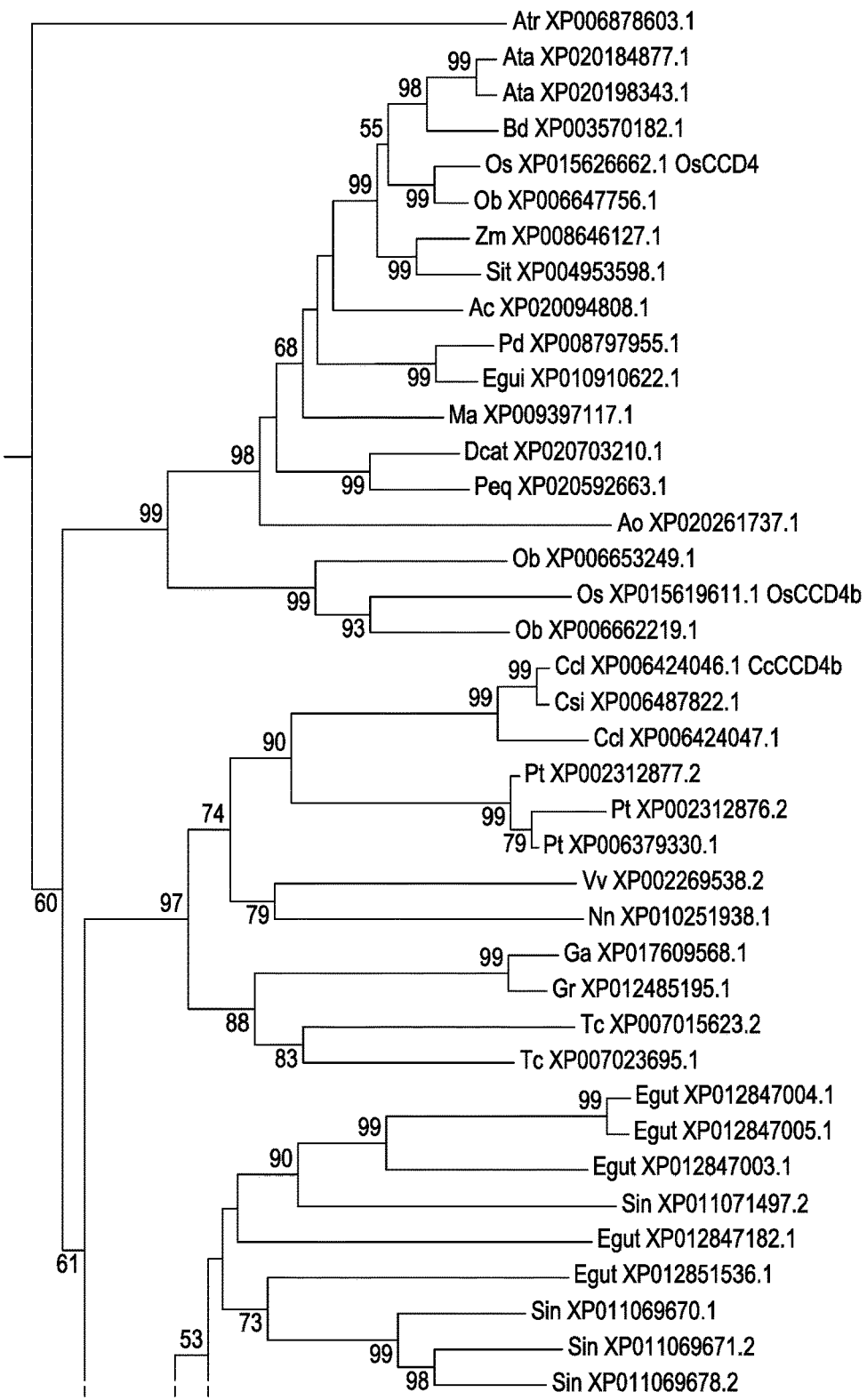
Figures 2, 12D:
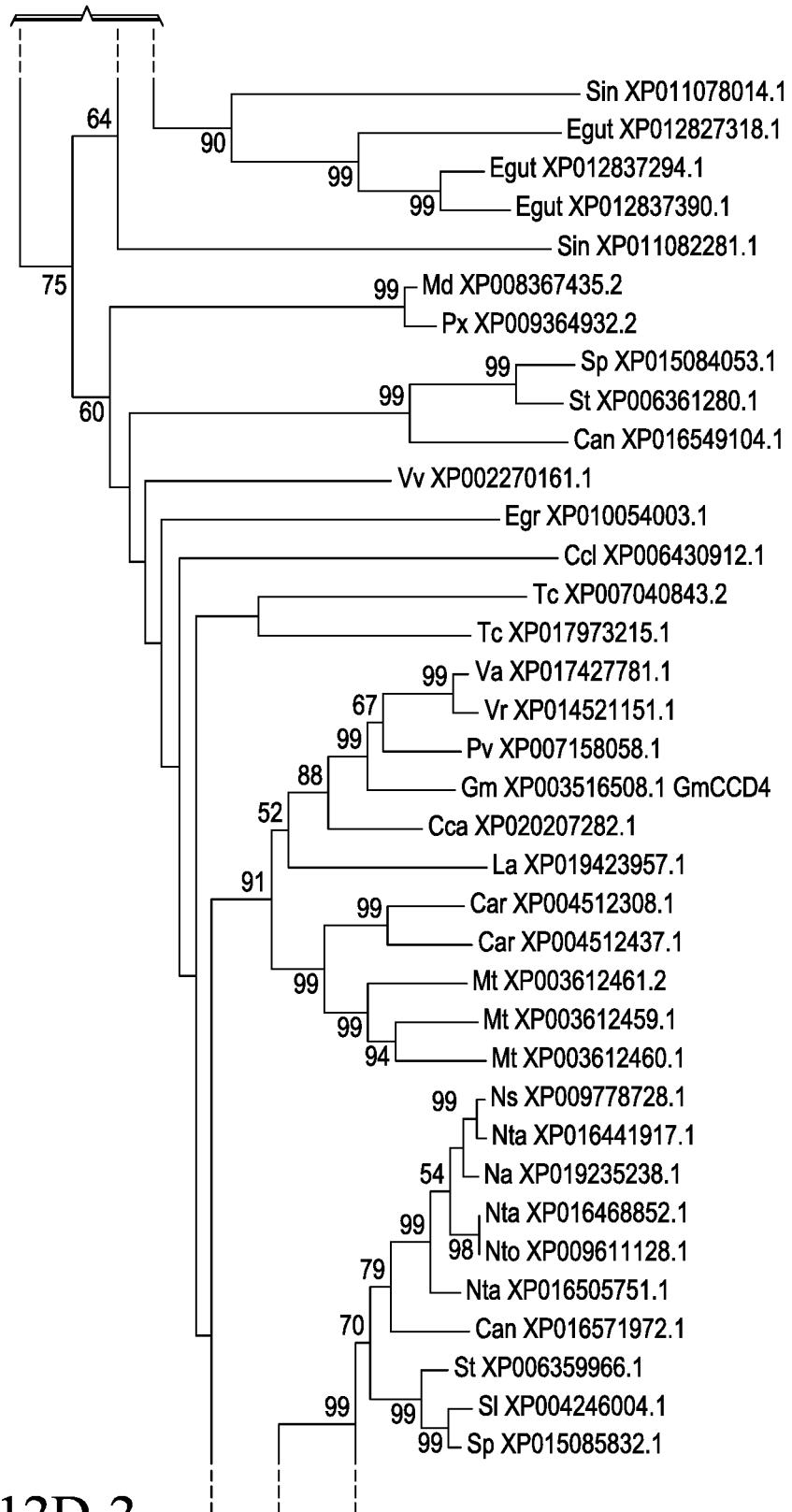
Figures 3, 12D:
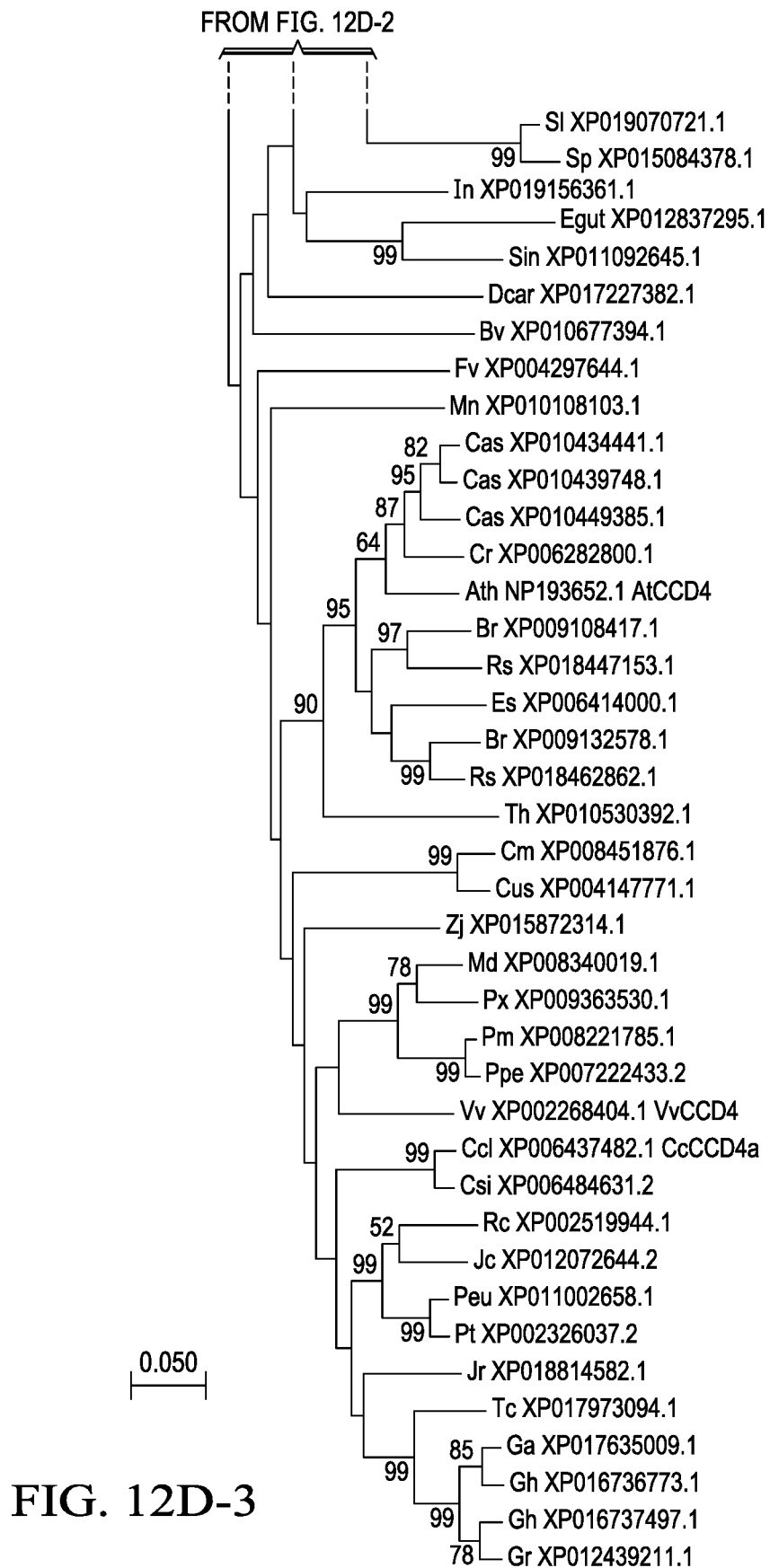
Figures 1, 12E:
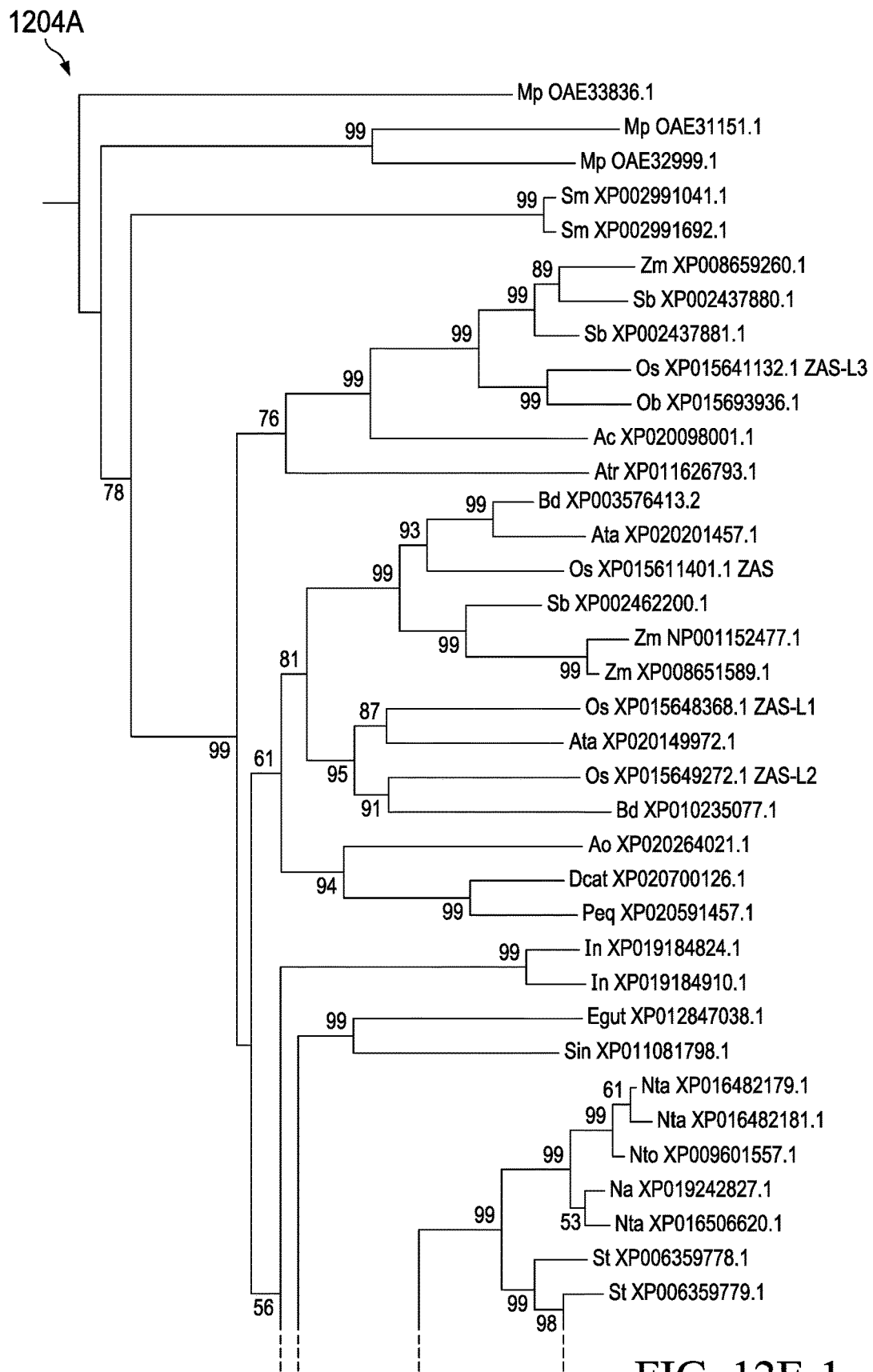
Figures 2, 12E:
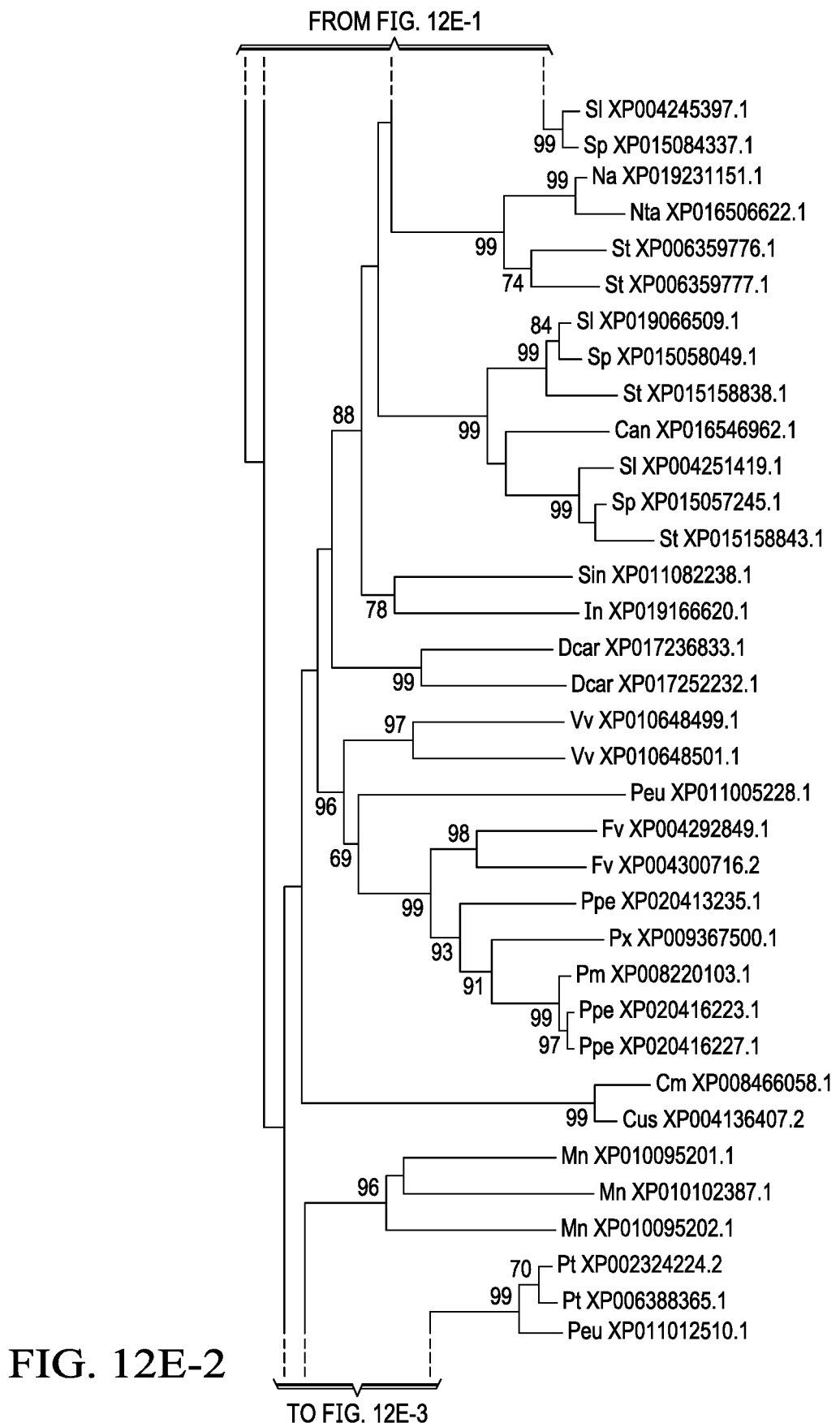
Figures 3, 12E:
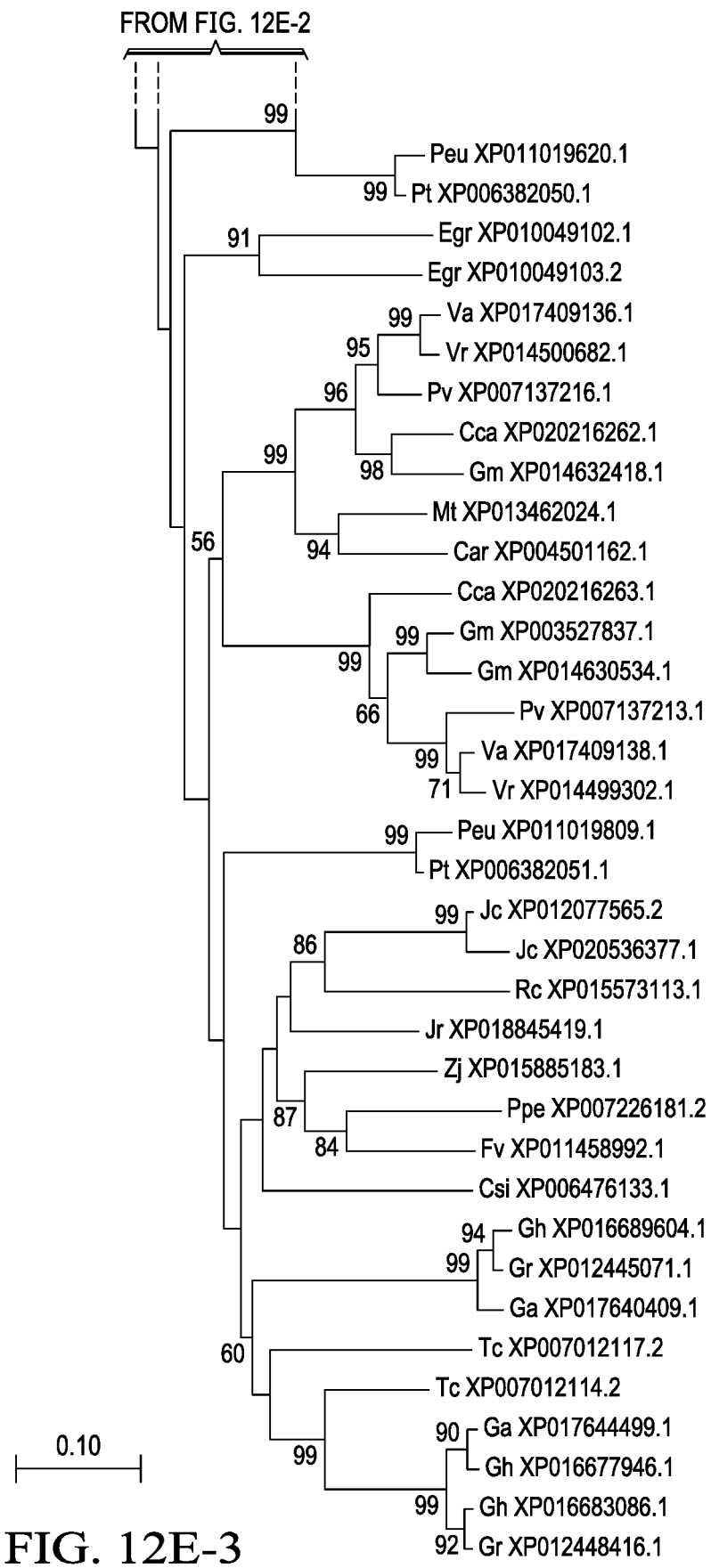
Figures 1, 12F:
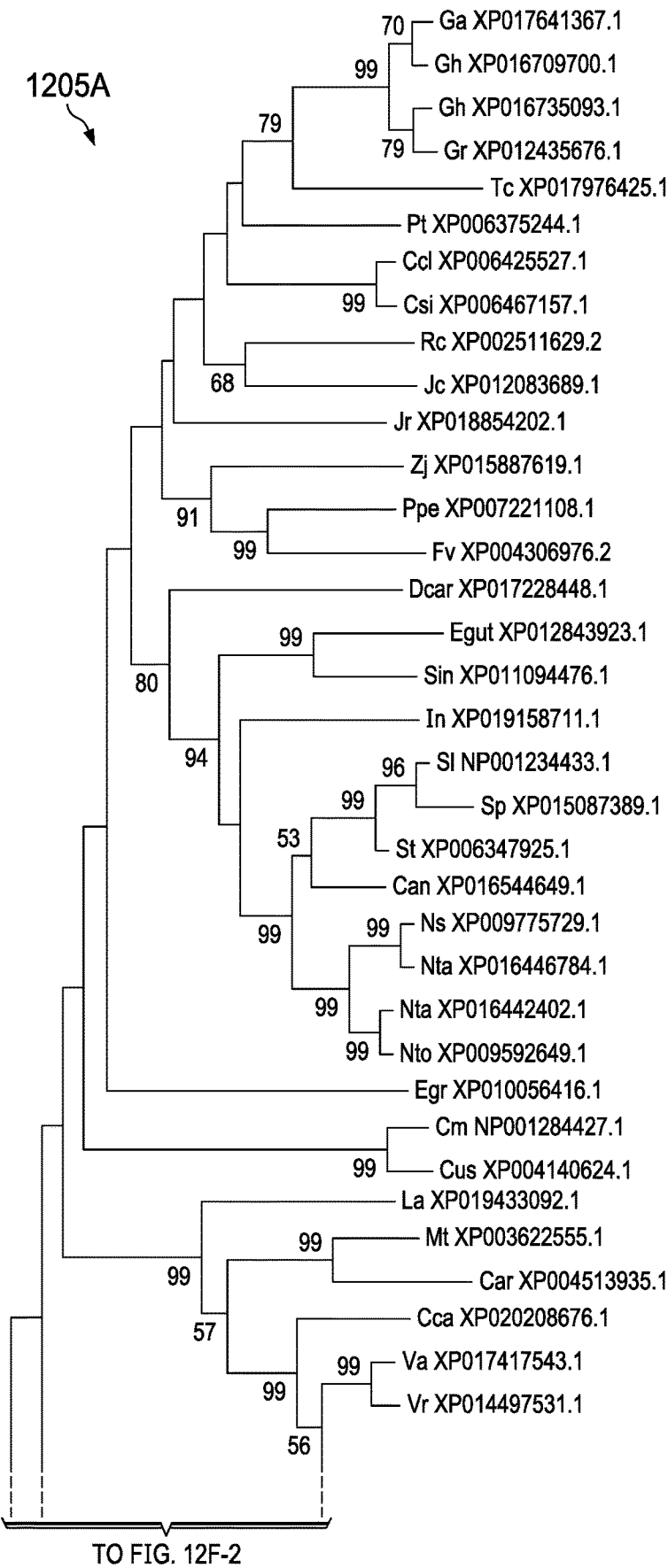
Figures 2, 12F:
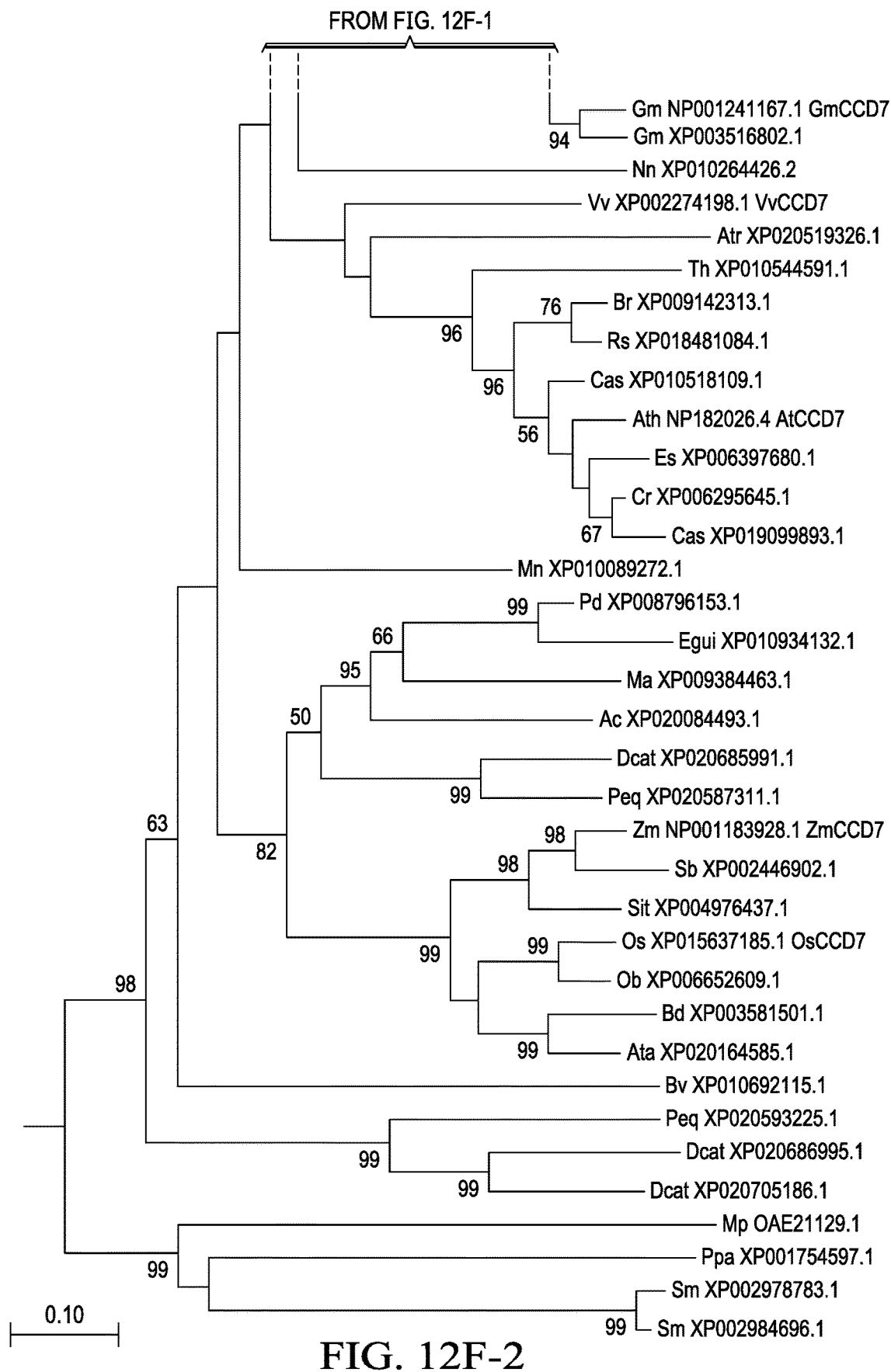
Figures 1, 12G:
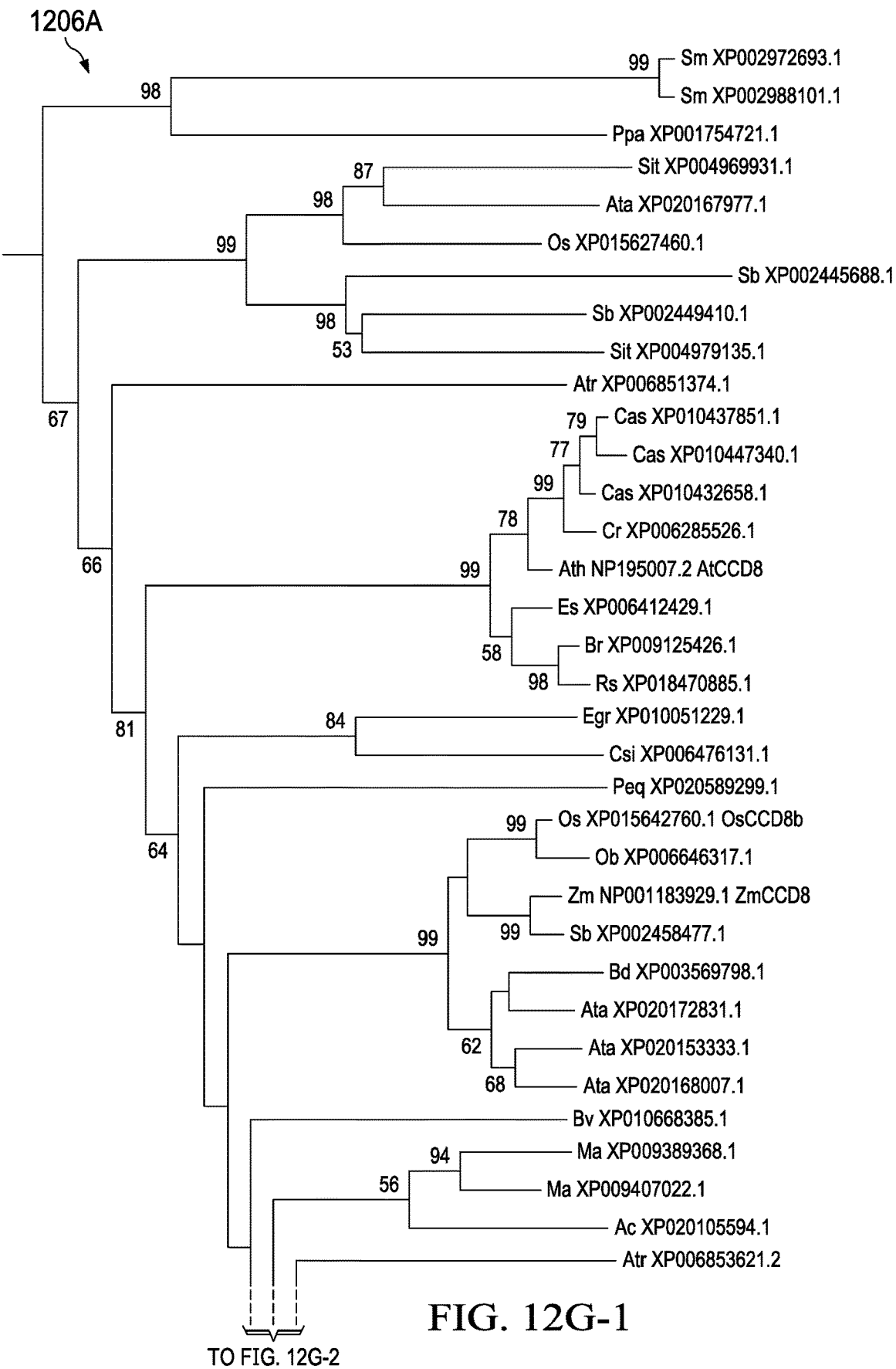
Figures 2, 12G:
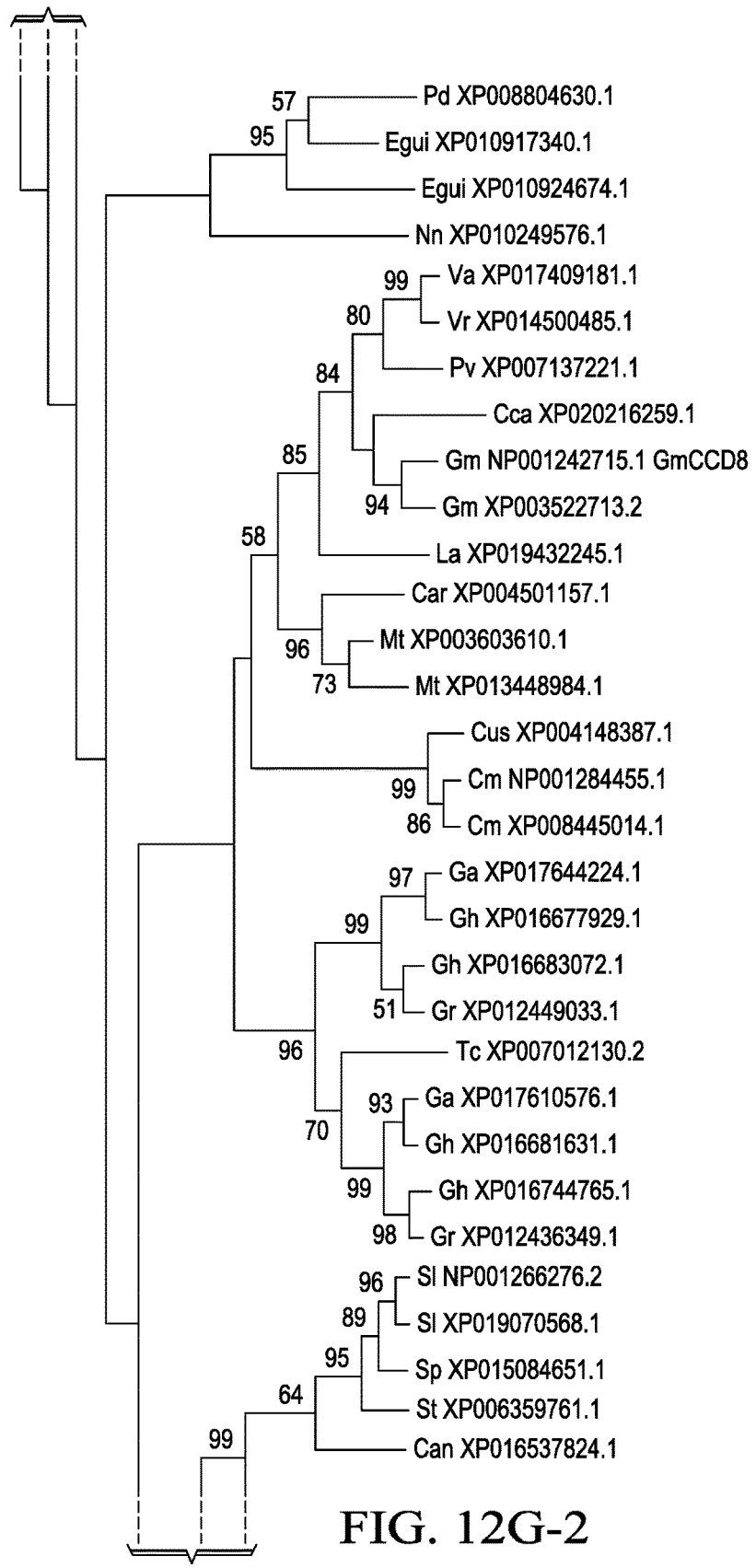
Figures 3, 12G:
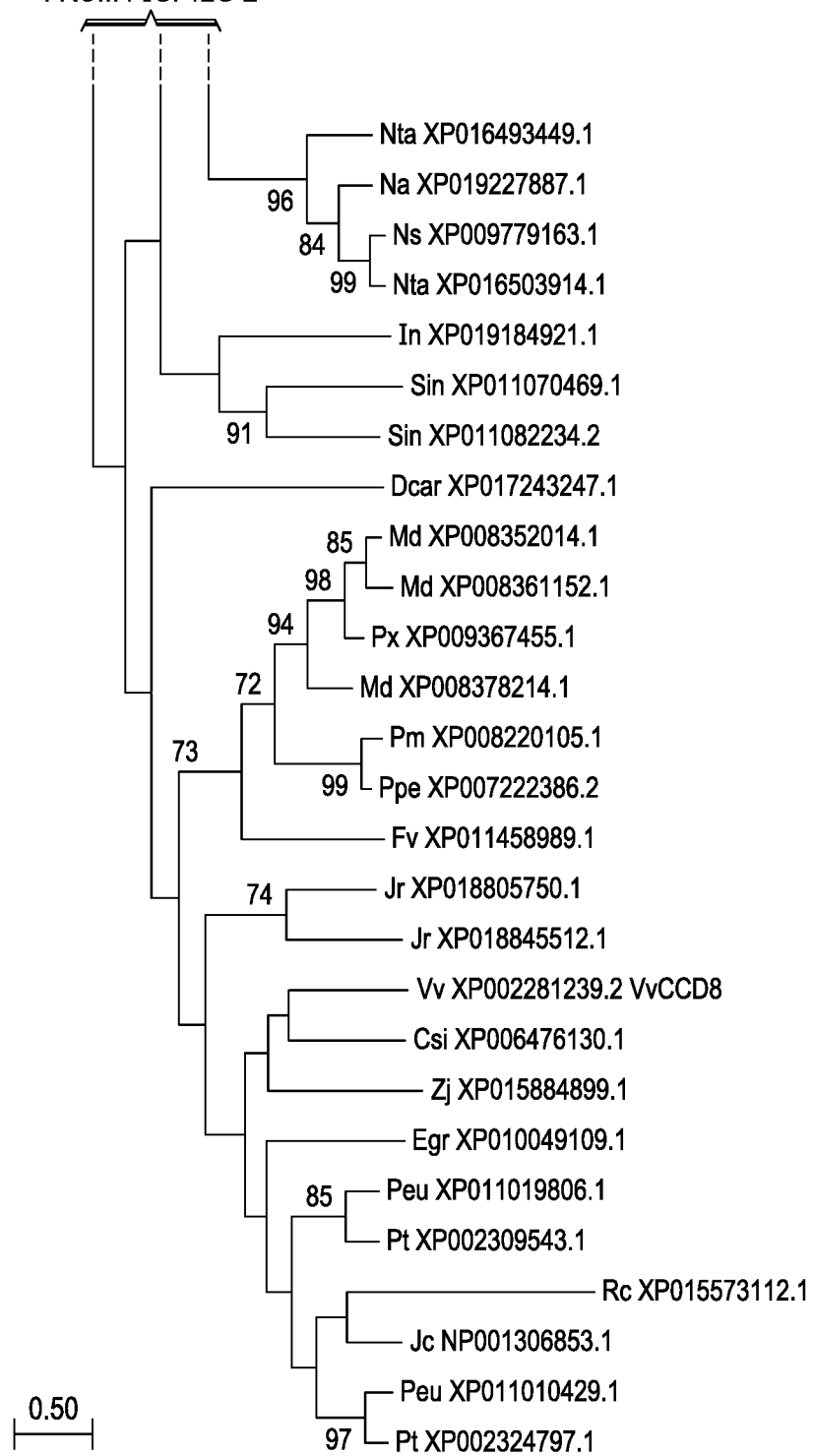

To explore the distribution of ZAS in plants, 748 sequences were extracted representing all CCD genes in 67 genomes of land plant species including moss, fern, monocots and dicots, which are summarized in FIG. 11A (Table 1). ZAS orthologues are widely conserved in land plants and can be classified in at least 10 subgroups as seen in FIG. 11B (Table 2). FIG. 11C shows a Neighbor-joining tree of ZAS orthologues re-constructed using 106 sequences belonging to the ZAS sub cluster in FIG. 7B. Sequence names are composed of two parts separated by a space. The former one represents shortened names of species whereas the latter one describes NCBI protein sequence ID. Species names corresponding to shortened names in the tree are described in FIG. 11A (Table 1). The scale bar indicates estimated 0.1 changes per amino acid. Bootstrap values more than 50% are only shown in the tree. FIG. 11D is a Neighbor-joining tree of *A. thaliana* and *O. sativa* CCD orthologues. At and Os in sequence names represent *A. thaliana* and *O. sativa* respectively and XP or NP numbers represent protein sequence IDs in NCBI. The scale bar indicates estimated 0.1 change per amino acid. Bootstrap values more than 50% are only shown in the tree, which are distributed in a taxon-dependent manner.

FIGS. 12 A-G are Neighbor-joining trees of plant CCD orthologues (dendrograms). The sub-clusters in FIG. 12A represent the whole tree (schematic). The remaining dendrograms represent the individual CCD orthologues: NCED (FIG. 12B), CCD1 (FIG. 12C), CCD4 (FIG. 12D), ZAS (FIG. 12E), CCD7 (FIG. 12F), and CCD8 (FIG. 12G) formed in the tree of FIG. 7B. Species names corresponding to shortened names in the tree are described in Table 2 of FIG. 11B. The scale bar on the bottom right of each figure indicates estimated substitutions per amino acid. Bootstrap values more than 50% are only shown in the tree Phylogenetic analysis suggests that ZAS represents a sixth CCD subfamily, besides the five previously known ones (FIG. 7B; FIG. 12A). *O. sativa* ZAS belongs to an accordingly designated cluster (FIG. 11C), which also includes three ZAS orthologues (FIG. 11C and FIG. S5B 11D). ZAS orthologues are widely conserved in land plants (FIG. 11B, Table 2) and can be classified in at least 10 subgroups (Group 1-Group10 as seen in FIG. 11B, Table 2), which are distributed in a taxon-dependent manner. Monocot ZASs build two different groups, Group 2 and Group 3, while ZASs of other species belong to only one subgroup. Hence, it can be speculated that ZAS orthologues might have differentiated functionally in monocots. However, there are plant species, particularly *Brassicales* species, such as *Arabidopsis*, that have lost ZAS orthologues through their evolution (Table 1 in FIG. 11A and FIG. 7B). This suggests that zaxinone is formed by ZAS-independent mechanism in *Arabidopsis*.

Materials and Methods

Plant Materials and Growth Conditions

Rice plants were grown under controlled conditions (day/night temperature of 28/22° C. and a 12 h photoperiod, 200 µmol photons m-2 s-1). Seeds of zas mutant and its corresponding wild-type of Nipponbare background were surface-sterilized in 50% sodium hypochlorite solution with 0.01% Tween-20 for 20 min. The seeds were rinsed with sterile water and germinated in the dark. The pre-germinated seeds were transferred to petri dishes containing half-strength liquid Murashige and Skoog (MS) medium and incubated in an environmentally controlled chamber (Percival Incubator) for 7 days.

For phenotyping of the zas mutant, the seedlings were further transferred into pots filled with soil containing half-strength modified Hoagland nutrient solution. The nutrient solution consisted of 5.6 mM $NH_4NO_3$, 0.8 mM $MgSO_4.7H_2O$, 0.8 mM $K_2SO_4$, 0.18 mM $FeSO_4.7H_2O$, 0.18 mM $Na_2EDTA.2H_2O$, 1.6 mM $CaCl_2.2H2O$, 0.8 mM $KNO_3$, 0.023 mM $H_3BO_3$, 0.0045 mM $MnCl_2.4H_2O$, 0.0003 mM $CuSO_4.5H_2O$, 0.0015 mM $ZnCl_2$, 0.0001 mM $Na_2MoO_4.2H_2O$, and with or without 0.4 mM $K_2HPO_4.2H_2O$, resulting in the +Pi and −Pi conditions, respectively. The pH of the solution was adjusted to 5.8, and the solution was applied every third day. On day 56, phenotypic data were recorded.

For rescue of zas mutant phenotype with zaxinone, one week-old seedlings were grown hydroponically in Hoagland nutrient solution containing $K_2HPO_4.2H_2O$ (+Pi) for 3 weeks with 2.5 µM zaxinone treatment or Mock treatment (0.1% acetone). The solution was changed every other day, adding the chemical at each renewal. Plants grown without zaxinone served as the controls and phenotypic data were recorded.

Rescue of zas mutant phenotype with zaxinone was demonstrated with plants grown in a rhizotron root analysis system (48 cm×24 cm×5 cm). Three days-old seedlings were grown in soil in Hoagland nutrient solution containing $K_2HPO_4.2H_2O$ (+Pi) with 10 µM zaxinone treatment. The solution was changed every other day for 2 weeks, adding the chemical at each renewal. Plants grown without zaxinone served as the controls and phenotypic data were recorded. To prevent zaxinone degradation from light exposure, 1 µl/ml emulsifier was added into the Hoagland nutrient solution.

For investigation of the zaxinone effect on CCD mutant phenotypes, one week-old seedlings were grown hydroponically in Hoagland nutrient solution containing $K_2HPO_4.2H_2O$ (+Pi) for 3 weeks with 2.5 µM zaxinone treatment or Mock treatment (0.1% acetone). The solution was changed every other day, adding the chemical at each renewal. Plants grown without zaxinone served as the controls and phenotypic data were recorded.

For the analysis of SL transcript levels in the zas mutant, one week-old seedlings were grown hydroponically in half-strength modified Hoagland nutrient solution with $K_2HPO_4.2H_2O$ (+Pi) and without $K_2HPO_4.2H_2O$ (−Pi) for 7 days. Seedlings were further treated with zaxinone for 6 h and tissues were collected.

For the analysis of SLs, one week-old seedlings were further transferred into 50 ml falcon tube (three seedlings per tube) containing Hoagland nutrient solution with $K_2HPO_4.2H_2O$ (+Pi) and grown in the growth cabinet for one week. The rice seedlings were then subjected to phosphate deficiency for another one week period. On the day of root exudates collection, rice seedlings were first treated with 5 µM zaxinone for 6 h and then root exudates and root tissues were collected from each tube for LC-MS/MS analysis and *Striga* bioassays.

Qualitative and Quantitative Analysis of Zaxinone and Apo-10'-Zeaxanthinal in Planta For the identification and quantification of apo-10'-zeaxanthinal in planta, plant material was lyophilized and ground. 25 mg tissue powder, spiked with 1.65 ng of D3-zaxinone, was extracted with 2 ml of ethyl acetate, twice, with sonicating for 15 minutes in an ultrasonic bath, and centrifuging for 8 minutes at 3800 rpm at 4° C. The two supernatants were combined and dried under vacuum. The residue was dissolved in 100 µl of ethyl acetate and 2 ml of hexane following purification. This sample was run through a Silica gel SPE column (500 mg/3 ml) preconditioned with 3 ml of ethyl acetate and 3 ml of hexane.

After washing with 3 ml Hexane, zaxinones were eluted in 3 ml ethyl acetate and evaporated to dryness under vacuum. The residues were re-dissolved in 200 μl of acetonitrile:water (25:75, v:v) for zaxinone, or 200 μl of acetonitrile:water (90:10, v:v) for apo-10'-zeaxanthinal, and filtered through a 0.22 μm filter for LC-MS/MS analysis. Qualitative analysis of zaxinone extracted from plant material was performed on a Dionex Ultimate 3000 UHPLC system coupled with a Q-Exactive plus MS (Thermo Scientific) with a heated-electrospray ionization source. Chromatographic separation was carried out on a Phenomenex Gemini C18 column (150×2.0 mm, 5 μm) with the mobile phase of water:acetonitrile:formic acid (95:5:0.1, v:v:v, A) and acetonitrile:formic acid (100:0.1, v:v, B) in a gradient program (0-20 min, 25%-100% B, followed by washing with 100% B and equilibration with 25% B). The flow rate was 0.2 ml/min. The injection volume was 10 μl, and the column temperature was maintained at 35° C. for each run. The MS conditions were as follows: positive mode, spray voltage of 4.0 kV, auxiliary gas heater temperature of 310° C., sheath gas flow rate of 30 μl/min, auxiliary gas flow rate of 10 μl/min, capillary temperature of 320° C., S-lens RF level of 55, resolution of 70,000, and HCE of 15 eV for MS/MS.

The quantification of zaxinone and apo-10'-zeaxanthinal in rice tissues was performed by using HPLC-Q-Trap-MS/MS with MRM mode. Chromatographic separation was achieved on an Acquity UPLC BEH C18 column (50×2.1 mm; 1.7 μm; Waters) with mobile phases consisting of water:acetonitrile (95:5, v:v, A) and acetonitrile (B), both containing 0.1% formic acid. A linear gradient was optimized as follows (flow rate, 0.2 ml/min): 0-20 min, 25% to 100% B, followed by washing with 100% B and equilibration with 25% B. The injection volume was 5 μl, and the column temperature was maintained at 30° C. for each run. The MS parameters were as follows: positive ion mode, ion source of turbo spray, ionspray voltage of 5500 V, curtain gas of 40 psi, collision gas of medium, gas 1 of 60 psi, gas 2 of 50 psi, turbo gas temperature of 400° C., declustering potential of 60 V, entrance potential of 10 V, collision energy of 20 eV, collision cell exit potential of 10 V. The characteristic MRM transitions (precursor ion→product ion) were 275→257, 275→239, 275→173 for zaxinone; 393→239, 393→173 for apo-10'-zeaxanthinal; and 278→260, 278→242, 278→173 for D3-zaxinone.

Quantitative Analysis of 4-Deoxyorobanchol in Rice Root Exudates and Root Tissues For the quantification of 4-deoxyorobanchol in rice root exudates, 50 ml of root exudate spiked with 0.672 ng of D6-5-deoxystrigol, was brought on a 500 mg/3 ml fast SPE C18 column preconditioned with 6 ml of methanol and 6 ml of water. After washing with 6 ml of water, strigolactones were eluted in 5 ml of acetone. The 4-deoxyorobanchol fraction (acetone-water solution) was concentrated to SLs aqueous solution (~1 ml), followed by extraction with 1 ml of ethyl acetate. Then 750 μl of 4-deoxyorobanchol enriched organic phase was transferred to a 1.5 ml tube and evaporated to dryness under vacuum. The residue was dissolved in 100 μl of acetonitrile:water (25:75, v:v) and filtered through a 0.22 μm filter for LC-MS/MS analysis.

For the quantification of 4-deoxyorobanchol in rice root, plant tissue material was lyophilized and ground. 30 mg root tissue spiked with 0.672 ng of D6-5-deoxystrigol was extracted with 2 ml of ethyl acetate in an ultrasound bath (Branson 3510 ultrasonic bath) for 15 minutes, followed by centrifugation for 8 minutes at 3800 rpm at 4° C. The supernatant was collected and the pellet was re-extracted with 2 ml of ethyl acetate. The two supernatants were then combined and dried under vacuum. The residue was dissolved in 100 μl of ethyl acetate and 2 ml of hexane. The resulting extract solution was loaded on a Silica gel SPE column (500 mg/3 ml) preconditioned with 3 ml of ethyl acetate and 3 ml of Hexane. After washing with 3 ml of Hexane, 4-deoxyorobanchol was eluted in 3 ml of ethyl acetate and evaporated to dryness under vacuum. The residue was re-dissolved in 200 μl of acetonitrile:water (25:75, v:v) and filtered through a 0.22 μm filter for LC-MS/MS analysis.

4-Deoxyorobanchol was analyzed by using HPLC-Q-Trap-MS/MS with MRM mode. Chromatographic separation was achieved on an Agilent 1200 HPLC system with an Acquity UPLC BEH C18 column (50×2.1 mm; 1.7 μm; Waters Corp.). Mobile phases consisted of water:acetonitrile (95:5, v:v, A) and acetonitrile (B), both containing 0.1% formic acid. A linear gradient was optimized as follows (flow rate, 0.2 ml/min): 0-10 min, 25% to 100% B, followed by washing with 100% B and equilibration with 25% B. The injection volume was 5 μl and the column temperature was maintained at 30° C. for each run. The MS parameters were listed as follows: positive ion mode, ion source of turbo spray, ionspray voltage of 5500 V, curtain gas of 20 psi, collision gas of medium, gas 1 of 80 psi, gas 2 of 70 psi, turbo gas temperature of 400° C., declustering potential of 60 V, entrance potential of 10 V, collision energy of 20 eV, collision cell exit potential of 15 V. The characteristic MRM transitions (precursor ion→product ion) were 331→216, 331→97 for 4-deoxyorobanchol; and 337→222, 337→97 for $D_6$-5-deoxystrigol.

In Vitro Assays

The cDNA of ZAS was expressed as thioredoxin-fusion in BL21 cells. Bacterial growth, induction and the crud cell lysate preparation were carried out. To study the enzymatic activity of ZAS, the recombinant protein was incubated in vitro, with the following carotenoids; β-carotene, 9-cis-β-carotene, zeaxanthin and lycopene. Tests were also performed with 3-OH-β-apo-10'-carotenal, 3-OH-β-apo-8'-carotenal, 3-OH-β-apo-12'-carotenal, β-apo-10'-carotenal, β-apo-8'-carotenal, 9-cis-α-apo-10-carotenal, 3-OH-9-cis-α-apo-10-carotenal, 9-cis-β-apo-10-carotenal, 3-OH-9-cis-β-apo-10-carotenal, apo-10-lycopena, and apo-8-lycopenal (FIG. 6). Synthetic substrates were purchased from BASF (Germany) and Buchem B. V. (Apeldoorn, Netherlands).

Substrates were quantified, prepared, and incubated with the crude lysate in the incubation buffer according in an in vitro assay protocol. A conversion rate study was done using in vitro assays, stopped by freezing in liquid nitrogen at nine different time points during 2 h of incubation. Analysis of ZAS in vitro sample assays was performed on Ultimate 3000 UHPLC system with a YMC Carotenoid C30 column (250× 4.0 mm, 5 μm) at a flow rate of 0.6 ml/min and a column temperature of 30° C. Mobile phases included methanol:tert-butylmethyl ether (1:1, v:v, A) and methanol:water:tert-butylmethyl ether (30:10:1, v:v:v, B). The gradient started from 100% B to 45% B in 15 minutes followed by isocratic elution with 45% B for 9 minutes. Retinal was used as internal standard in the HPLC quantitative analysis.

To confirm that ZAS cleaves β-apo-10'-zeaxanthinal specifically at C13-C14 double bond to form zaxinone and $C_9$-dialdehyde, $C_9$-dialdehyde was identified by using LC-MS via a derivation reaction with O-(2,3,4,5,6-Pentafluorobenzyl) hydroxylamine hydrochloride. Analysis of $C_9$ dialdehyde was performed on a Dionex Ultimate UHPLC system coupled with a Q-Exactive plus MS. Chromatographic separation was carried out on a Phenomenex Gemini $C_{18}$ column (150×2.0 mm, 5 μm) with the mobile phase of acetonitrile:water:formic acid (95:5:0.1, v:v:v, A) and acetonitrile:water:formic acid (5:95:0.1, v:v:v, B) at the flow rate of 0.2 ml/min and a column temperature of 35° C. The gradient was as follows: 0-20 min, 50% to 100% B, followed by washing with 100% B and equilibration with 50% B. The MS parameters were as follows: positive mode, spray voltage of 4.0 kV, auxiliary gas temperature of 310° C., sheath gas flow rate of 30 µl/min, auxiliary gas flow rate of 10 µl/min, capillary temperature of 320° C., S-lens RF level of 55, resolution of 70,000, and HCE of 15 eV.

*Striga hermonthica* Seed Germination Bioassays

The *Striga* seed germination bioassay was carried out in the following manner. After 10 days of pre-conditioning (30° C. under moisture for 10 days), *Striga* seeds were supplied with 50 µl of SL collected from root exudates of zaxinone treated and non-treated wild-types and zas mutants. After SLs application, *Striga* seeds were incubated at 30° C. in the dark for two days. Germinated (seeds with radicle) and non-germinated seeds were counted under a binocular to calculate germination rates (%).

*Striga hermonthica* Infection in Rice

About 10 mg (~4000) of *Striga* seeds were thoroughly mixed in 2 L soil and sand mixture (1:1), and added to a 3 L plastic pot. The pots with *Striga* seeds were kept under moist conditions at 35° C. for 10 days. Five days-old three rice seedlings (*Oryza sativa* L. cv. IAC-165) were then planted in the middle of each pot. A stock of 10 mM of zaxinone was prepared by mixing with an emulsifier (cyclohexanone+Atlas G1086). Three days after rice planting, zaxinone was applied at 10 µM through 20 ml water in each pot. Zaxinone was applied twice a week for up-to five weeks. *Striga* emergences were recorded six weeks after rice planting.

Gene Expression Analysis

Total RNA was extracted from the roots and shoots using a Qiagen Plant RNeasy Kit according to the manufacturer's instruction. cDNA was synthesized from 1 µg of total RNA using iScript cDNA Synthesis Kit (BIO-RAD Laboratories, Inc, 2000 Alfred Nobel Drive, Hercules, Calif., Cat. No #170-8890) according to instructions in the user manual. For mycorrhizal samples, single-strand cDNA was synthesized from 1 µg of total RNA using Super-Script II (Invitrogen) according to instructions in the user manual. Primers used for real-time quantitative RT-PCR (qRT-PCR) analysis are listed below in Table 3. qRT-PCR was performed using SYBR Green Master Mix (Applied Biosystems; www.lifetechnologies.com) in a StepOnePlus (Life Technologies, Carlsbad, Calif., USA). For mycorrhizal samples, qRT-PCR was performed using a Rotor-Gene Q 5plex HRM Platform (Qiagen). The 2-ΔCt method was used to calculate the relative gene expression levels and rice Ubiquitin (OsUBQ or OsRubQ1) gene was used as the internal control to normalize target gene expression.

TABLE 3

Primer sequences

| Experiment | Primer name | Sequence (5'-3') |
|---|---|---|
| qRT-PCR | D27-F | TCTGGGCTAAAGAATGAAAAGGA |
| | D27-R | AGAGCTTGGGTCACAATCTCG |
| | CCD7/D17-F | CATTGGAAAAGTGAGGTTCTTTGG |
| | CCD7/D17-R | AATGCACTTGTGGCAAAACTAGAG |
| | CCD8/D10-F | GTTCCAGTACACGGACAAG |
| | CCD8/D10-R | ACTGCCTCTCGTTGCTA |
| | OsCO/MAX1-F | GGCTTCTCTGCTTGCTGCTTC |
| | OsCO/MAX1-R | ACCAACGGTTGCCTTCCC |

TABLE 3-continued

Primer sequences

| Experiment | Primer name | Sequence (5'-3') |
|---|---|---|
| | OsUBQ-F | GCCCAAGAAGAAGATCAAGAAC |
| | OsUBQ-R | AGATAACAACGGAAGCATAAAAGTC |
| | RiEFα-F | GCTATTTTGATCATTGCCGCC |
| | RiEFα-R | TCATTAAAACGTTCTTCCGACC |
| | OsRubQ1-F | GGGTTCACAAGTCTGCCTATTTG |
| | OsRubQ1-R | ACGGGACACGACCAAGGA |
| | OsPT11-F | GAGAAGTTCCCTGCTTCAAGCA |
| | OsPT11-R | GAGAAGTTCCCTGCTTCAAGCA |
| zas mutant screening | ZAS-F | AGTTATGCCCCGTTATGGTG |
| | ZAS-R | AGCACCTTCAAATGTTTGGG |
| | Tos17-R | ATTGTTAGGTTGCAAGTTAGTTAAGA |

Statistical Analysis

Statistical tests were carried out through one-way analysis of variance (one-way ANOVA) and Tukey's post hoc test, using a probability level of $P<0.05$. All statistical elaborations were performed using PAST statistical package version 2.16.

Comprehensive Survey of CCD Orthologues in Plants 68 land plant genomes (protein fasta files) were obtained from the NCBI RefSeq assembly and one genome was obtained from the NCBI Genbank assembly. Information regarding genome assemblies used is described in FIG. 11A, Table 1. Obtained protein sequences were annotated by Pfam-A database using Hmmscan program included in HMMER v3.1b1 package. Protein sequences were then extracted annotated as PF03055 (Retinal pigment epithelial membrane protein). The obtained sequences were filtered with respect to their length of PF03055 regions (>=400 aa). Positions were then checked of the sequences on their species genomes and transcript variants removed (the longest one was used for the analysis). After filtration, 783 sequences were obtained and used as CCD orthologues for the phylogenetic analysis.

Phylogenetic Analysis

The sequence alignment of CCD orthologues were obtained using MAFFT ver. 3 (2) with default settings. Neighbor-joining trees were constructed from the aligned sequences with MEGA7(3). Bootstrap values were generated from 100 pseudo-replicates using MEGA7. The 106 sequences belonging to ZAS sub-cluster in the resultant tree were extracted. The Neighbor-joining tree of ZAS orthologues was reconstructed using the same method as described above. A Neighbor-joining tree was also constructed using *O. sativa* and *A. thaliana* sequences only. Tree construction in FIGS. 11 and 12 was performed with the same methods described above.

Field Trials

Field experiments were carried out at the experimental farm of CREA-RIS (Consiglio per la ricerca in agricoltura e l'analisi dell'economia agraria, Unità di ricerca per la risicoltura) located in Northern Italy (45° 19'17" N 8° 25'11"E). Seeds of wild-type (cv. Nipponbare) and zas mutant were germinated into the soil. During the growing season (May to October), irrigation treatments by flushing was provided from July (panicle initiation) to September (late flowering), taking into consideration climatic conditions and rainfalls. In detail, the irrigation treatment consisted of an input of water to reach the complete submersion of the field; after the complete flooding, the flux of water was interrupted.

The experimental plot size was 2 m×1 m. Three treatments of organic N (12.5%) were applied before sowing (May), during tillering (June), and once in July (panicle initiation). Phenotyping of wild-type shoots and zas mutant shoots, including node and spike length, number of tillers, panicle and seed number, was performed in October, immediately before harvest. For each genotype, twelve plants were considered. Statistical tests were carried out through one-way analysis of variance (one-way ANOVA) and Tukey's post hoc test, using a probability level of P<0.05. All statistical elaborations were performed using PAST statistical package version 2.16.

Plant and Fungal Materials and Treatments

Seeds of WT (cv. Nipponbare) and zas mutant were germinated in pots containing sand and incubated for 10 days in a growth chamber under conditions having a 14 h light (23° C.)/10 h dark (21° C.) cycle. Plants used for mycorrhization were inoculated with *Funelliformis mosseae* (BEG 12, MycAgroLab, France) or *Rhizophagus irregularis* (INOQ GmbH, Germany). Both fungi inocula (25%) were mixed with sterile quartz sand and used for colonization. Plants were watered with a modified Long-Ashton (LA) solution containing 3.2 µM $Na_2HPO_4 \cdot 12H_2O$ and were grown in a growth chamber under the 14 h light (24° C.)/10 h dark (20° C.) regime.

Over the course of the experiment, wild-type and zas plants inoculated with *R. irregularis* were sampled at 7, 20, 29 and 35 days post-inoculation (dpi).

Wild-type and zas mycorrhizal plants were grown in sand and watered twice a week with different concentrations of zaxinone (5 µM; 0.5 µM; 50 nM) directly applied in the Long Ashton nutrient solution. Data were collected 35 days post germination (dpg).

Wild-type and zas mycorrhizal roots were stained with 0.1% cotton blue in lactic acid and the estimation of mycorrhizal parameters was performed using MYCOCALC. For the molecular analyses, roots were immediately frozen in liquid nitrogen and stored at −80° C.

Assessment of the Arbuscule Phenotype

Roots of wild-type and zas plants were embedded in agarose (8%). Agarose blocks were cut into 180 µm vibratome slices, and placed on slides. Slices were treated for 5 minutes in 0.5% commercial bleach diluted in Pi buffer (pH 7), washed again, and then inoculated for 2 h with wheat germ agglutinin-fluorescein isothiocyanate (WGA-FITC) (Sigma-Aldrich) at a final concentration of 10 µg mL$^{-1}$, to detect chitin of the fungal cell walls. Working conditions for the Leica TCS SP2 confocal microscope (Leica Microsystem GmbH, Wetzlar, Germany) for observation and image acquisition were performed.

EXAMPLES

Example 1: Effect of Zaxinone on SL Levels in Rice Plant Roots at the Transcript Level The elevated transcript levels in the Oszs mutant (zas mutant) were found to be significantly reduced by the application of zaxinone (3-OH-β-apo-13-carotenone). Application of zaxinone also led to a reduction in the transcript levels of these SL genes in the wild type.

FIGS. 13A-D are bar graphs demonstrating the effect of zaxinone on SL levels in rice plant roots at the transcript level. 14-day-old rice seedlings were transferred to new hydroponic pots containing fresh media with or without chemicals for 6 hours. SL biosynthetic (D27, D10, D17 and MAX1-Os900) gene expression were determined under −Pi conditions (phosphate deficient) with zaxinone (2.5 and 5 µM) treatment of both Nipponbare wild-type (WT) rice roots and zas mutant rice roots. The expression levels (1301) were detected by quantitative RT-PCR. Ubiquitin was used as a reference gene. Mock treatment (control) treatment consisted of 0.1% acetone. Bars (1302) show comparisons between the treatments and represent mean±SD (n=3). Decrease in SLs levels in the plants treated with zaxinone ranged from approximately 40% to 70%.

Figures 13A, 13B:
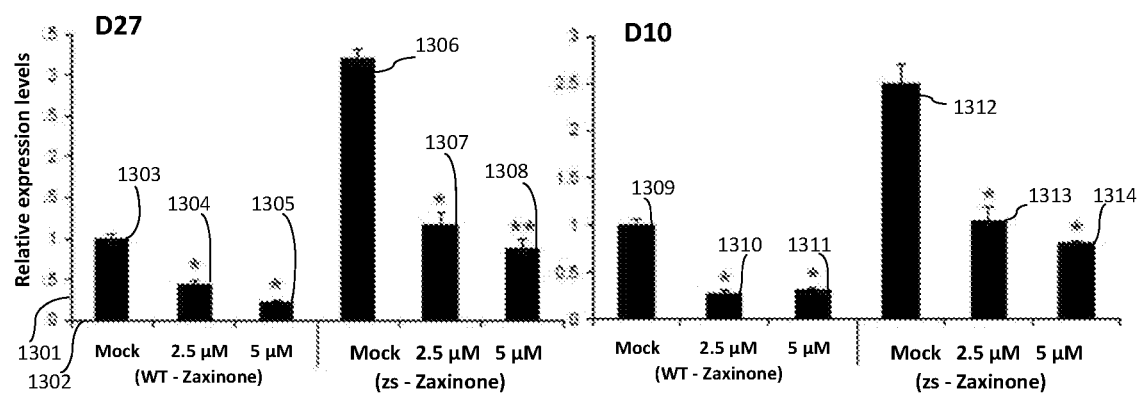
FIG. 13A-D shows bar graphs of the effects of zaxinone on SLs levels in Nipponbare wild-type rice and a zas mutant rice in roots at transcript level with the D27, D10, D17 and MAX1-Os900 biosynthetic genes

FIG. 13A shows the effect of zaxinone on SL levels in wild-type rice (WT) and zas mutant rice for D27 gene expression. The Mock (1303) treatment (no zaxinone) of the WT rice shows a relative expression of approximately 1.0 compared to the approximately 0.5 relative expression for the 2.5 µM (1304) zaxinone treatment and the approximately 0.25 relative expression of the 5.0 µM (1305) zaxinone treatment of the WT rice (decreases of approximately 50% and 75%, respectively). The Mock (1306) treatment (no zaxinone) of the zas mutant rice shows a relative expression of approximately 3.25 compared to the approximately 1.2 relative expression for the 2.5 µM (1307) zaxinone treatment and the approximately 0.75 relative expression of the 5.0 µM (1308) zaxinone treatment of the zas mutant rice (decreases of approximately 63% and 77%, respectively).

FIG. 13B shows the effect of zaxinone on SL levels in wild-type rice (WT) and zas mutant rice for D10 gene expression. The Mock (1309) treatment (no zaxinone) of the WT rice shows a relative expression of approximately 1.0 compared to the approximately 0.25 relative expression for the 2.5 µM (1310) zaxinone treatment and the approximately 0.3 relative expression of the 5.0 µM (1311) zaxinone treatment of the WT rice (decreases of approximately 75% and 70%, respectively). The Mock (1312) treatment (no zaxinone) of the zas mutant rice shows a relative expression of approximately 2.5 compared to the approximately 1.0 relative expression for the 2.5 µM (1313) zaxinone treatment and the approximately 0.8 relative expression of the 5.0 µM (1314) zaxinone treatment of the zas mutant rice (decreases of approximately 60% and 68%, respectively).

Figures 13C, 13D:
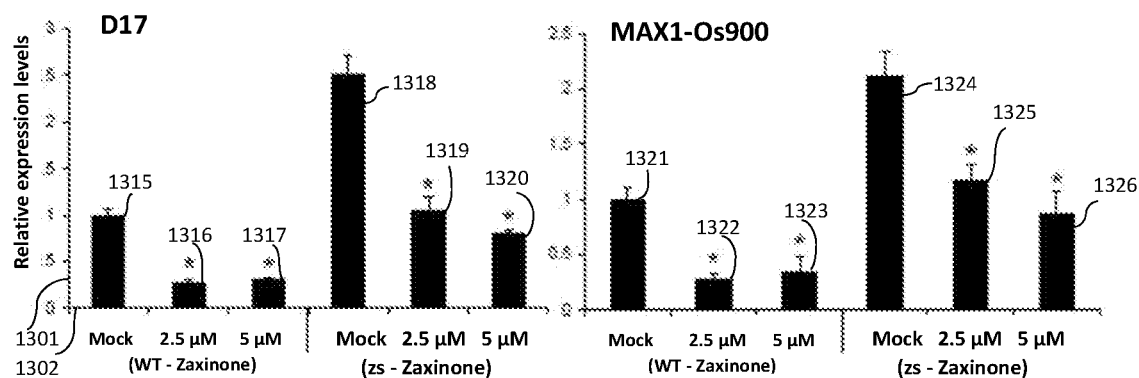

FIG. 13C shows the effect of zaxinone on SL levels in wild-type rice (WT) and zas mutant rice for D17 gene expression. The Mock (1315) treatment (no zaxinone) of the WT rice shows a relative expression of approximately 1.0 compared to the approximately 0.25 relative expression for the 2.5 µM (1316) zaxinone treatment and the approximately 0.3 relative expression of the 5.0 µM (1317) zaxinone treatment of the WT rice (decreases of approximately 75% and 70%, respectively). The Mock (1318) treatment (no zaxinone) of the zas mutant rice shows a relative expression of approximately 2.5 compared to the approximately 1.0 relative expression for the 2.5 µM (1319) zaxinone treatment and the approximately 0.8 relative expression of the 5.0 µM (1320) zaxinone treatment of the zas mutant rice (decreases of approximately 60% and 68%, respectively).

FIG. 13D shows the effect of zaxinone on SL levels in wild-type rice (WT) and zas mutant rice for MAX1-Os900 gene expression. The Mock (1321) treatment (no zaxinone) of the WT rice shows a relative expression of approximately 1.0 compared to the approximately 0.25 relative expression for the 2.5 µM (1322) zaxinone treatment and the approximately 0.4 relative expression of the 5.0 µM (1323) zaxinone treatment of the WT rice (decreases of approximately 75% and 60%, respectively). The Mock (1324) treatment (no zaxinone) of the zas mutant rice shows a relative expression of approximately 2.1 compared to the approximately 1.2 relative expression for the 2.5 µM (1325) zaxinone treatment and the approximately 0.9 relative expression of the 5.0 μM (1326) zaxinone treatment of the zas mutant rice (decreases of approximately 43% and 57%, respectively).

In each case represented in FIGS. 13A-13D, application of zaxinone led to a marked decrease in strigolactone release in both the wild-type rice and the zas mutant rice as compared to the mock (control) treatment. As expected, higher levels of SL were seen for overall for the zas mutant rice than for the WT rice, and generally commensurate decreases in SL levels were seen following zaxinone treatment.

Example 2: Confirmation of ZAS Activity in Planta

To confirm the ZAS (zaxinone synthase) activity in planta and explore the biological function of zaxinone, a retrotransposon Tos17-insertion mutant (NC0507) with an insertion in the tenth ZAS exon was characterized (FIG. 5A). Zaxinone was quantified in roots and shoots of the zas mutant under normal conditions and upon phosphate deficiency that causes a considerable increase in ZAS transcript levels (FIGS. 14A-C). Under normal conditions, zas roots contained significantly less zaxinone than wild-type roots (12 versus 27 pgmg$^{-1}$ dry weight). This difference increased under phosphate-deficient conditions (6 versus 16 pgmg$^{-1}$ dry weight; FIG. 7D).

In contrast, zas and wild-type shoots showed similar zaxinone contents regardless of phosphorus supply. The ZAS substrate apo-10'-zeaxanthinal was quantified in wild-type and zas seedlings. Consistent with lower zaxinone amounts, roots of phosphate starved zas seedlings contained more apo-10'-zeaxanthinal compared to wild-type, while the amounts of the non-substrate apocarotenal β-apo-10'-carotenal were similar in both samples (FIGS. 6A-B, FIGS. 8A-B). These results confirm the in vitro data on ZAS substrate and products and are in line with the effect of phosphate deficiency on ZAS transcript level (FIGS. 14A-C). However, the remaining presence of zaxinone in zas plants (FIG. 7D) also points to further, ZAS-independent biosynthesis route, which may involve different enzyme(s) or originate from ROSs attack as seen with cyclocitral.

FIGS. 14A-14C show transcript levels of Zaxinone Synthase (ZAS) in wild type roots and shoots. In FIG. 14A, the relative expression levels of ZAS under normal (+Pi) and phosphate-starved (−Pi) conditions in Nipponbare wild-type (WT) roots and shoots is seen. The expression levels in the WT root were normalized to 1. In FIG. 14B, the relative expression levels of ZAS under −Pi conditions with 5 μM of Zaxinone and GR24 treatment in WT rice root and shoot is seen. Three weeks-old seedlings were transferred to new hydroponic pots containing fresh media with or without chemicals for 6 h. The expression levels in the WT-mock were normalized to 1 and the expression levels were detected by qRT-PCR. Ubiquitin was used as a reference gene. Bars represent mean±SD (n=3). Mock treatment (0.1% acetone). Different letters above each bar denote significant difference following a One-way ANOVA test (P<0.05).

Example 3: Levels of Epi-5DS (5-Deoxystrigol) in Root Exudates and Roots

The zas mutant rice showed increased SL content in both root tissues and root exudates and the elevated SL levels in the exudates resulted in an increase in germination activity of root parasitic weed seeds. SL levels in root exudates and roots of WT rice and zas mutant rice with and without zaxinone treatment were measured to determine the extent of the SL decrease attributable to the zaxinone, and also to determine whether the decrease in SL release led to an overall decrease in germination of root parasitic weed seeds. The rice seedling were maintained in a manner similar to the protocol in FIG. 13.

The levels of epi-5DS (5-deoxystrigol) in root exudates (FIG. 15A) and roots (FIG. 15B) for WT and zas mutant rice under −Pi conditions (phosphate deficient) with zaxinone (5 μM) treatment were determined by LC-MS/MS. The bar graph shows pg/mg of epi-5DS (1501) for each comparison bar (1502). Mock (control) treatment consisted of 0.1% acetone added to the plant growth media in the same manner as the zaxinone addition.

The level of epi-5DS in root exudates (FIG. 15A) decreased by around 75% from Mock (1503) treatment to the zaxinone (1504) treatment for the WT rice and also showed an approximately 64% decrease from Mock (1505) treatment to the zaxinone (1505) treatment for the zas mutant rice.

Figures 15A, 15B:
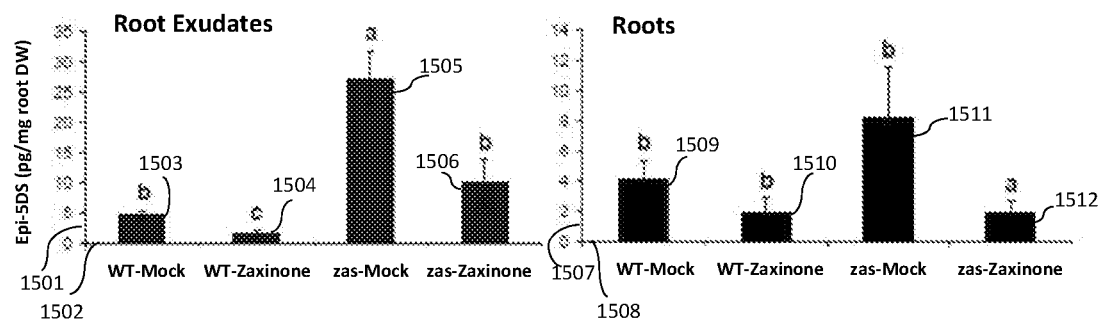
FIG. 15A-B shows bar graphs of levels of epi-5DS in Nipponbare wild-type and zas mutant rice root exudates with and without zaxinone treatment.

The FIG. 15B comparison bars (1508) show epi-5DS levels (1507) in roots decreased by around 50% from Mock (1509) treatment to the zaxinone (1510) treatment for the WT rice and a decrease of around 75% was seen from Mock (1511) treatment to the zaxinone (1512) treatment for the zas mutant rice. The application of zaxinone rescued the zas mutant rice phenotype and caused a significant decrease in SL release and biosynthesis in roots and root exudates of wild type rice plants.

Example 4: *Striga* Seed Germination for Treated and Untreated Rice Plants

Figure 15C:
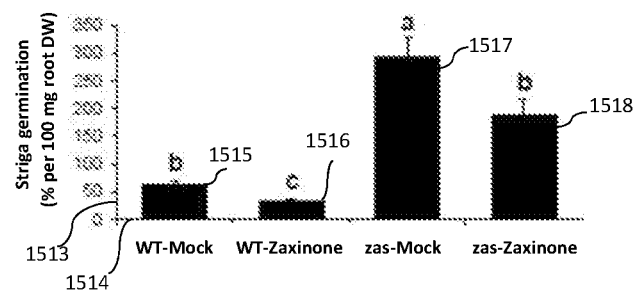
FIG. 15C shows a bar graph of percentages of S. hermontica seeds germinating after treatment with and without zaxinone.

In FIG. 15C the bars (1514) show comparison of *Striga* seed germination (1513) for treated and untreated rice plants. Significant decreases (40-50%) were observed in the germination rates of *S. hermonthica* seeds after being exposed to culture medium from zaxinone treated WT rice (1516) and zaxinone treated zas mutant rice (1518) as compared to exposure to culture medium from the Mock (control) WT rice (1515) and Mock zas mutant rice (1517). A decrease in germination rate of approximately 50% was seen for *S. hermonthica* seeds exposed to zaxinone treated WT rice culture medium as compared to seeds exposed to the Mock-treated WT rice culture medium. When exposed to zaxinone treated zas mutant rice culture medium, a decrease in germination rate of approximately 40% was seen for *S. hermonthica* seeds as compared to seeds exposed to the Mock-treated zas mutant rice culture medium. Letters (a, b, c) above each bar denote significant difference following a one-way ANOVA test (P<0.05). Data are means±SD, n=3.

The zas mutant rice contains and releases higher amounts of the epi-5DS (4-deoxyorobanchol, as seen in the FIG. 4 biosynthetic pathway), a major SL in rice. Application of zaxinone caused a decrease in SL release and biosynthesis, effectively rescuing the mutant and wild-type rice phenotypes (FIGS. 15A and 15B), and the decreased strigolactones release led to significantly reduced *Striga* seed germination activity (FIG. 15C).

Example 5: Phenotypic Characterization and Rescue of Zas Mutant In Vitro

Phenotypic characteristics of hydroponically grown Nipponbare wild-type and zas mutant rice plants were examined to determine the effect of zaxinone treatment on plant growth. Root and shoot characteristics were examined visually and measured, and the results are shown in FIGS. 16A-16D. Data are means±SD [(FIG. 16A), n=12; (FIG. 16B), n=6; (FIG. 16C), n=4; (FIG. 16D), n=8; Con=Control, Zax=Zaxinone]. Different letters denote significant difference following a One-way ANOVA test (P<0.05).

Figure 16:
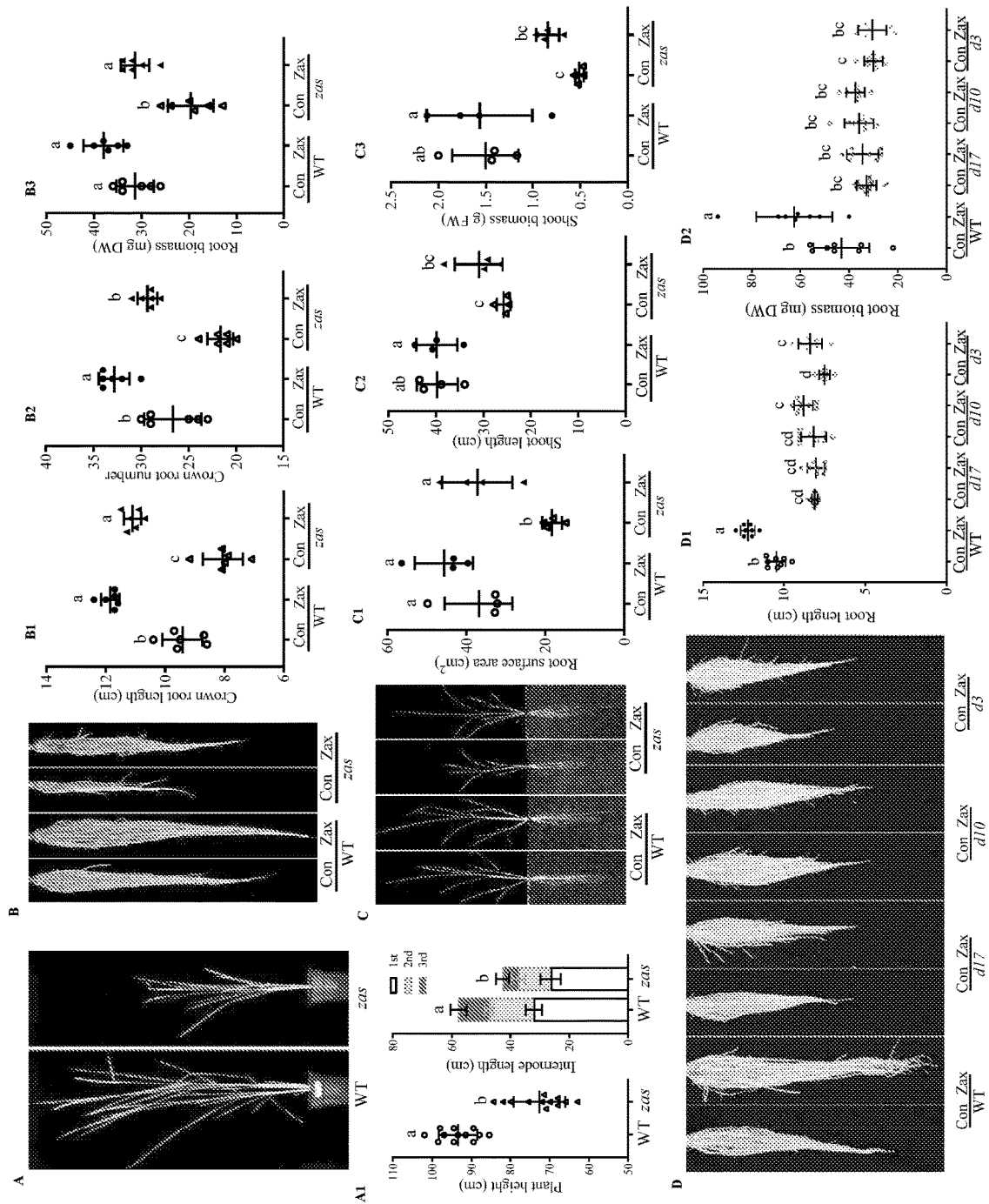
FIG. 16A-D shows visual and measured determinations of phenotypic characterization of wild-type and zas mutant rice plants with and without zaxinone treatment, and rescue of zas mutant shoots and roots with zaxinone treatment.

FIG. 16A shows Nipponbare wild-type and zas mutant plants at the heading stage. Hydroponically grown zas mutant seedlings had markedly shorter plant heights as compared to the wild-type plants. As seen in the FIG. 16A1 graphs, wild type plants had a height between 85 and 105 cm, while the zas mutant plants only attained heights from 65 to 85 cm. Internode lengths were also reduced in the zas mutants.

FIG. 16B shows roots of hydroponically grown wild-type and zas mutant rice seedlings in the absence (Control or mock treatment) and presence of zaxinone (2.5 µM). Hydroponically grown zas mutant seedlings grown without additional zaxinone showed reduced main crown root length, number of crown roots, and root biomass as compared to the wild-type (WT). Assuming that these phenotypes are caused by the observed lower roots zaxinone content, zas mutant seedlings were supplied with exogenous zaxinone at a concentration of 2.5 µM for three weeks. This treatment rescued the crown root length, crown root number and roots biomass phenotypes for the zas mutants seedlings. (FIG. 16B) When grown with the addition of 2.5 µM zaxinone, a considerable increase was seen for the zas mutant plants in the crown root length (10-11 cm compared to 7-9 cm), crown root number (27-32 compared to 20-23) and root biomass (28-35 mg DW compared to 12-22 mg DW) as seen in the FIGS. 16B1, 16B2 and 16B3 graphs. The wild type plants also showed an increase in root growth with the zaxinone, indicating that zaxinone treatment also has a positive effect on growth for plants that are not genetically deficient in zaxinone.

FIG. 16C shows the effect of zaxinone (10 µM) on soil-grown (rhizotron root system) wild-type and zas mutant rice plants for root surface area, shoot length, and shoot biomass. In this figure, the shoots and roots of wild type plants and zas mutant plants, grown with and without (control) zaxinone treatment, are compared side by side. It can be seen that the wild-type seedlings treated with zaxinone showed some improvement over the untreated control seedlings, while the zas mutant seedlings showed substantial improvement.

The visually determined improvements are supported by measurement data in the graphs for root surface area (FIG. 16C1), shoot length (FIG. 16C2), and shoot biomass (FIG. 16C3). The zaxinone treated zas mutant plants experienced significant visual and measurable improvement over the untreated control zas plants, with root surface area (FIG. 16C1) of the zaxinone treated zas mutants more than doubling (approximately 25-50 cm$^2$ as compared to 15-20 cm$^2$). Shoot length (FIG. 16C2) for the zaxinone treated zas mutant plants increased by about 10 cm over the untreated seedlings and shoot biomass (FIG. 16C3) doubled for zaxinone treated zas mutant seedlings.

As seen in FIG. 16A, the zas mutant plants showed generally reduced plant height when grown in a greenhouse as compared to a wild-type plant under the same conditions. In soil, zaxinone application at 10 µM concentration increased the shoot length of zas mutant and rescued root surface area and shoot biomass phenotypes (FIG. 16B-16C). These data suggest that zaxinone is a positive regulator of growth in rice, which is required at certain concentrations for normal development. These results also demonstrate a crucial role of zaxinone synthase (ZAS) in rice growth and development.

The effect of zaxinone (2.5 µM) on root phenotypes of hydroponically grown Shiokari wild-type and ccd mutant seedlings was also studied. FIG. 16D is a visual determination of root growth with (2.5 µM) zaxinone added to the growth medium and without zaxinone (control) for Shiokari wild-type seedlings and ccd mutant seedlings, d17, d10 and d3. The roots of seedlings grown with zaxinone were visually determined to be increased over the controls, with the wild-type (WT) showing the greatest increase. The visual results are confirmed by the root length and root biomass measurements seen in graphs FIG. 16D1 and FIG. 16D2. These measurements agree with the visual determinations of zaxinone increasing the root growth for all of the seedlings, with the wild-type showing the greatest increase.

Example 6: Above-Ground Phenotypic Characterization of the Zas Mutant and Wild-Type Rice Grown in Field Conditions Rice plants typically have round hollow stems and flat leaves. The plants comprise vegetative organs, including roots, stems (initial shoots and tillers), leaves, and reproductive organs, including panicles at the top of the plant. Panicles are loosely clustered flower structures made up of spikelets and are located at the end of the tillers. Two of the key parts of a rice crop are the tiller and the panicle, and studies of rice plants generally focus on the development of these structures. The vegetative phase for rice is characterized by the development of tillers, which are stems produced by rice plants after the initial shoot. Tillers in rice crops appear as soon the rice crop is self-supporting. Seeds or grains of rice grow in the panicles of the rice crops and these panicles are one of the identifying characteristics of a fully developed tiller. Type and number of tillers and panicles is largely a function of the rice variety, but growth and development of these structures are affected by environmental conditions.

Figure 17:
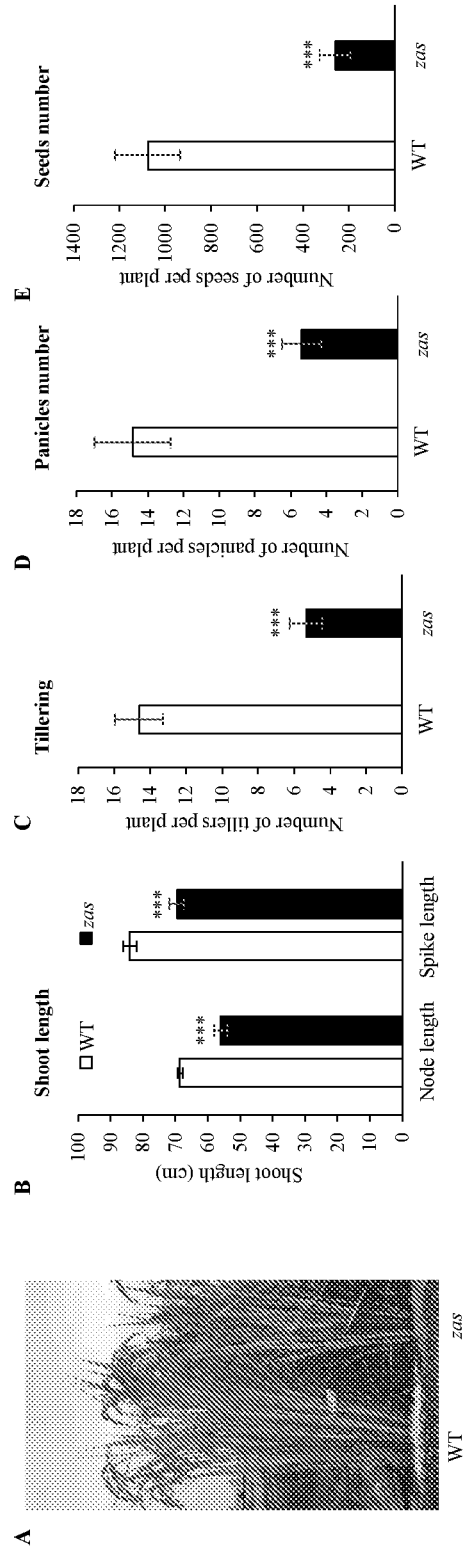
FIG. 17A shows above-ground phenotypic characterization of the zas mutant line and WT rice grown in field conditions.
FIGS. 17B-E show measurements of shoot length, tillering, panicle number and seed number for wild-type and zas mutant rice plants grown in field conditions.

FIG. 17 shows a characterization of the above grown features of zas mutant and wild-type rice plants grown in field conditions. Plants were grown in a soil field and data were collected after five months (May-October). Data are means±SE, n=12 plants. Significant values (by t-test) are shown as follows: ***P<0.001.

When zas mutant rice plants are grown in the field, a reduction in numbers of panicles, seeds and tillers was observed. (FIG. 17A and FIG. 17C). The zas mutant showed a statistically significant reduction in all the morphological parameters analysed, including shoot length (FIG. 17B), in terms of node and spike length, as compared to the WT plants. Significant reductions were observed in the zas mutant for tillering, with an average of 5 tillers compared to 14 in the wild-type (FIG. 17C), in panicle formation, with an average of 5 panicles compared to 15 in the wild-type (FIG. 17D), and in seed number, with an average of 300 seeds per zas mutant plant compared to over 1100 in the wild-type plants (FIG. 17E). The tillering phenotype indicated an alteration in SL content or perception in zas mutant. Hence, SL (4-deoxyorobanchol) content was measured in root tissues and exudates of hydroponically grown zas seedlings exposed to one week of phosphate starvation, using LC-MS/MS.

Example 7: Effect of Zaxinone on Rice SL Biosynthesis Release

Figure 18:
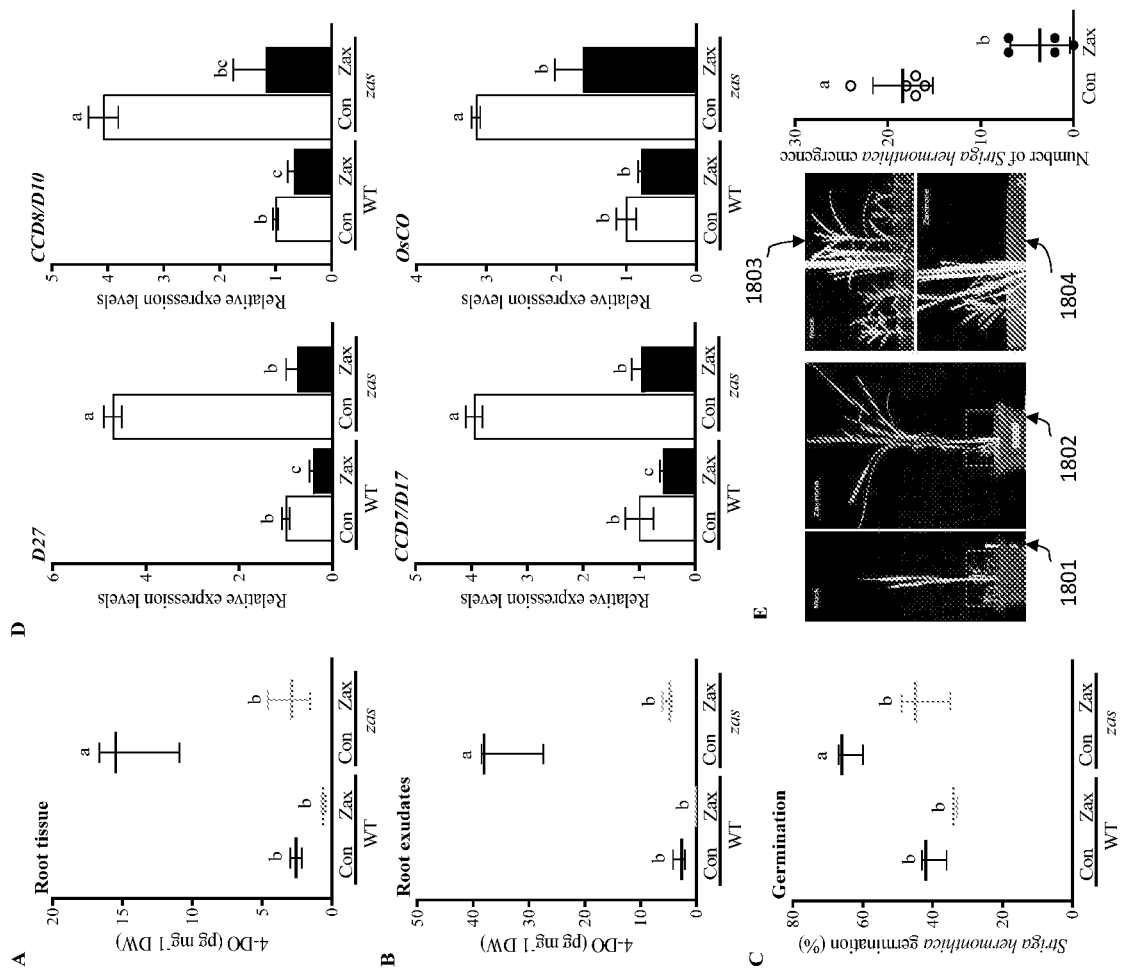
FIG. 18A-B shows the effect of zaxinone on rice SL biosynthesis release in wild-type and zas mutant root tissues and exudates.
FIG. 18C shows germination rates of Striga seeds treated with the root exudates.
FIG. 18D shows qRT-PCR analysis of transcript levels of SL biosynthesis genes (D27, CCD7, CCD8 and CO)
FIG. 18E shows visual determination of Striga inhibition in response to zaxinone treatment.

FIG. 18 shows the effect of zaxinone on rice SL biosynthesis release. SL, 4-deoxyorobanchol (4-DO), was quantified in wild-type and zas mutant roots (FIG. 18A) and root exudates (FIG. 18B) without added zaxinone and in response to zaxinone (5 µM) under phosphate starvation. Without the added zaxinone, the zas mutant roots and thereof derived exudates (zas/Con) showed around 8-9 fold higher 4-deoxyorobanchol content than the wild-type samples (WT/Con). Phosphate-starved zas seedlings and wild-type seedlings were then exposed to zaxinone (5 µM) for 6 h and SL measurements were repeated. As seen in FIGS. 18A and 18B, this treatment significantly reduced SL content in both roots (from 13 to 5 pgmg$^{-1}$ dry-root-weight) and root exudates (from 35 to 5 pgmg$^{-1}$ dry-root-weight) of the zas mutant seedlings (zas/Zax). Reduction of SL content was also seen in roots and root exudates of the wild-type seedlings (WT/Zax).

The Striga seed germinating activity of collected root exudates was also determined, which usually correlates with the total amount of released SLs. Striga seed germination rates upon treatment with exudates analyzed in (FIG. 18B) are seen in FIG. 18C. Consistent with the LC-MS-quantification, untreated zas root exudates (zas/Con) showed 20-30% higher Striga seed germination activity, compared to exudates from the untreated wild-type (WT/Con). When Striga seeds were exposed to root exudates from the zaxinone treated zas mutant (zas/Zax), germination of the Striga seeds decreased to levels near the germination rates for the wild-type control (WT/Con). This treatment reduced SL content in both roots (from 13 to 5 pgmg$^{-1}$ dry-root-weight) and root exudates (from 35 to 5 pgmg$^{-1}$ dry-root-weight) and lowered the germinating activity by 40%.

When zaxinone (10 µM) was applied to the Striga susceptible rice cv. IAC-165 plants grown in pots with Striga infested soil, the treatment clearly reduced (by around 80%) the number of emerging Striga plants, compared to the untreated control. The pronounced ability of zaxinone to inhibit Striga seed germination shows that zaxinone treatment can be beneficially employed to combat root parasitic weeds when applied to soil or growth medium.

The transcript levels of the SL biosynthesis enzymes DWARF27 (D27), CCD7 (D17), CCD8 (D10) were measured and the 4-deoxyorobanchol-forming carlactone oxidase (CO) was quantified in wild-type and zas seedlings exposed to phosphate starvation and upon treatment with zaxinone (5 µM). These genes exhibited 2-3 fold higher transcript levels in zas mutant than in wild-type (FIG. 3D FIG. 18D). Zaxinone treatment decreased the transcript levels in the zas mutant, and also in wild-type (FIG. 3D 18A-E). These experiments demonstrate that zaxinone negatively regulates SLs biosynthesis at transcript level under Pi limiting conditions.

FIG. 18D shows qRT-PCR analysis of transcript levels of SL biosynthesis genes (D27, CCD7, CCD8 and CO) of transcript levels in root tissues analyzed in FIG. 18A. Transcript levels in wild-type mock (WT/Con) samples were normalized to 1. Relative expression of the transcript levels for all four (D27, CCD7, CCD8 and CO) were 2-3 times higher for the untreated zas mutant (zas/Con) than for the untreated wild-type (WT/Con). Relative expression of the transcript levels for all four (D27, CCD7, CCD8 and CO) for the zaxinone treated zas mutants (zas/Zax) was at or near levels for the wild-type controls (WT/Con).

FIG. 18E shows the effect of zaxinone (10 µM) on Striga infestation of six-week old rice cv.IAC-165 plants in soil. Rice plants which received a mock treatment (1801) and rice plants treated with zaxinone (1802) are shown in FIG. 18E. The effect of zaxinone on rice and Striga growth is seen in the number of Striga plants emerging from the soil at the base of the plants. With the mock treatment (1801) numerous Striga plants are emerging around the rice plant. Only a few Striga plants are seen around the plant treated with zaxinone (1802). Enlargements (1803, 1804) of the Striga plants emerging around the mock treated (1801) and zaxinone treated (1804) plants highlight the differences in the numbers of the emerging parasitic plants. The numbers of Striga plants are shown on the graphs with around 15-25 emerging Striga plants numbered for in the mock treated plants and less than 10 numbered for the zaxinone treated plants. Bars represent mean±SD [(FIG. 18A-(D), n=3; (FIG. 18E), n=5; Con=Control, Zax=Zaxinone]. Different letters denote significant difference following a One-way ANOVA test (P<0.05).

This reduction in parasitic seed germination following zaxinone treatment represents a significant advantage for survival of cereal crops, such as rice and grains. Treatment of cereal crops with zaxinone in areas prone to infestation by root parasitic weeds would reduce the losses associated with the parasitic weeds and increase yields of usable food materials from these crops. Over time, the overall incidence of root parasitic weed infestation in growing fields would be reduced by preventing the parasitic weeds from access to the obligate host plants. Consistent use of the treatment could reduce the number of viable parasitic weed seeds in the soil.

Figure 19:
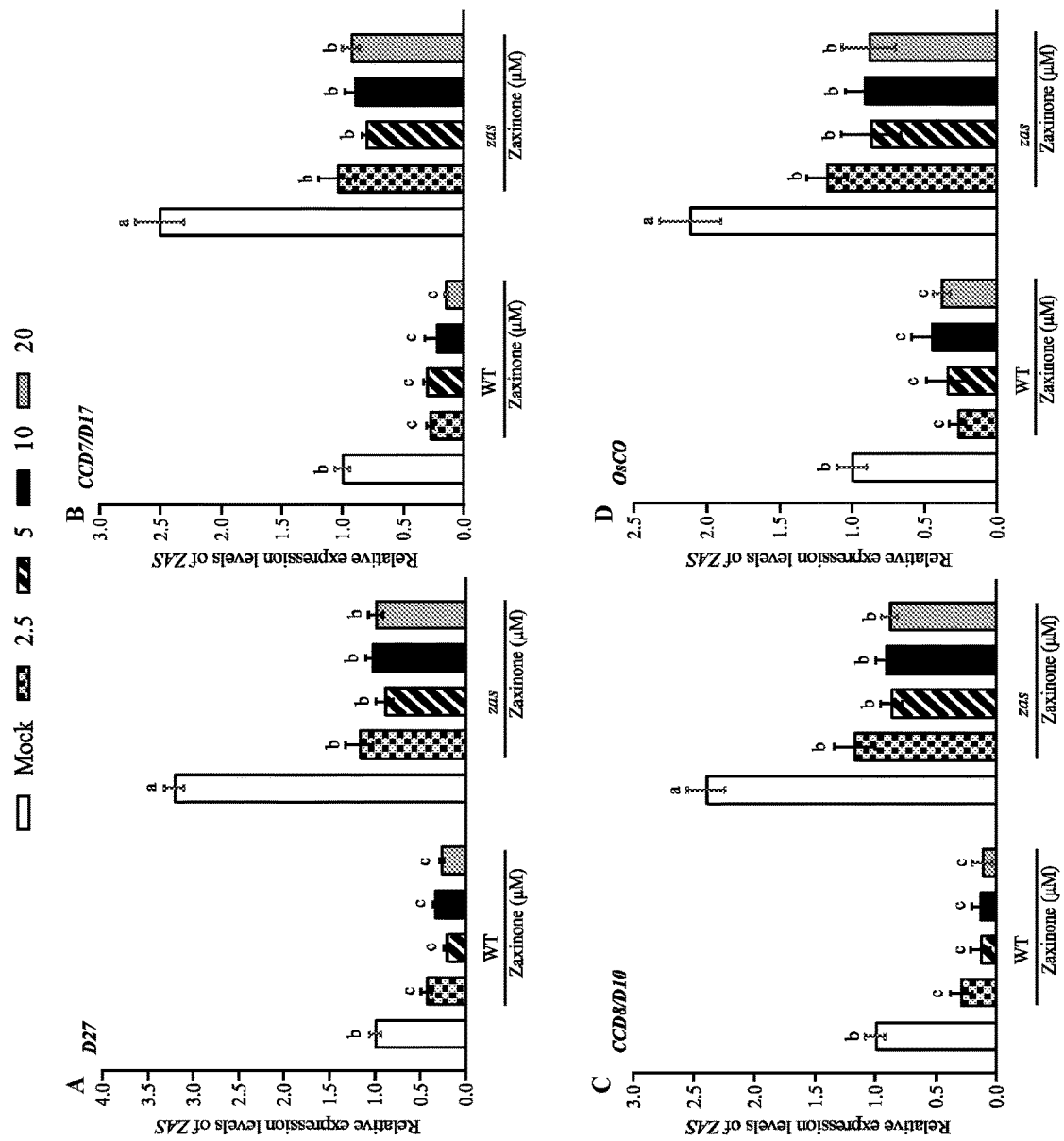
FIG. 19A-D shows bar graphs of the effects of Zaxinone on transcript levels of SL biosynthesis genes in phosphate starved (−Pi) rice roots.

FIG. 19 shows the effects of varying levels of zaxinone on transcript levels of SL biosynthesis genes in phosphate-starved (-Pi) rice roots. Two week-old seedlings were grown for another one week in -Pi solution and then transferred to new vials containing fresh -Pi solution with and without the indicated concentrations (2.5 µM, 5 µM, 10 µM and 20 µM) of zaxinone for 6 h and samples were collected. SL biosynthetic genes expression for D27 (FIG. 19A), CCD7 (FIG. 19A), CCD8 (FIG. 19C), and CO (Carlactone oxidase—FIG. 19D) in WT and zas mutants. Controls were for each had a Mock treatment with 0.1% acetone. The expression levels were detected by quantitative RT-PCR. Ubiquitin was used as a reference gene and the expression levels in the WT-mock were normalized to 1. Bars represent mean±SD (n=3). Different letters above each bar denote significant difference following a One-way ANOVA test (P<0.05).

As seen in FIGS. 19A-19D, the expression levels for the zas mutant/mock treatment for D27 (FIG. 19A), CCD7 (FIG. 19A), CCD8 (FIG. 19C), and CO (Carlactone oxidase—FIG. 19D) were two to three times the expression level seen for the WT/Mock. Treatment with zaxinine reduced the expression levels to near the WT/Mock level with the lowest level of zaxinone (2.5 µM). Only slight decreases were noted when increased concentrations of zaxinone were used, indicating that zaxinone is effective even in small amounts. Zaxinone also decreased the expression levels of the wild-type to levels below the WT/Mock control level, but again, increasing the concentration of zaxinone did not lead to a further decrease in the expression levels. Zaxinone treatment decreased the transcript levels in both the zas mutant and in the wild-type, with a noticeable decrease for both seen the lowest zaxinone concentration used (2.5 µM).

Figure 20:
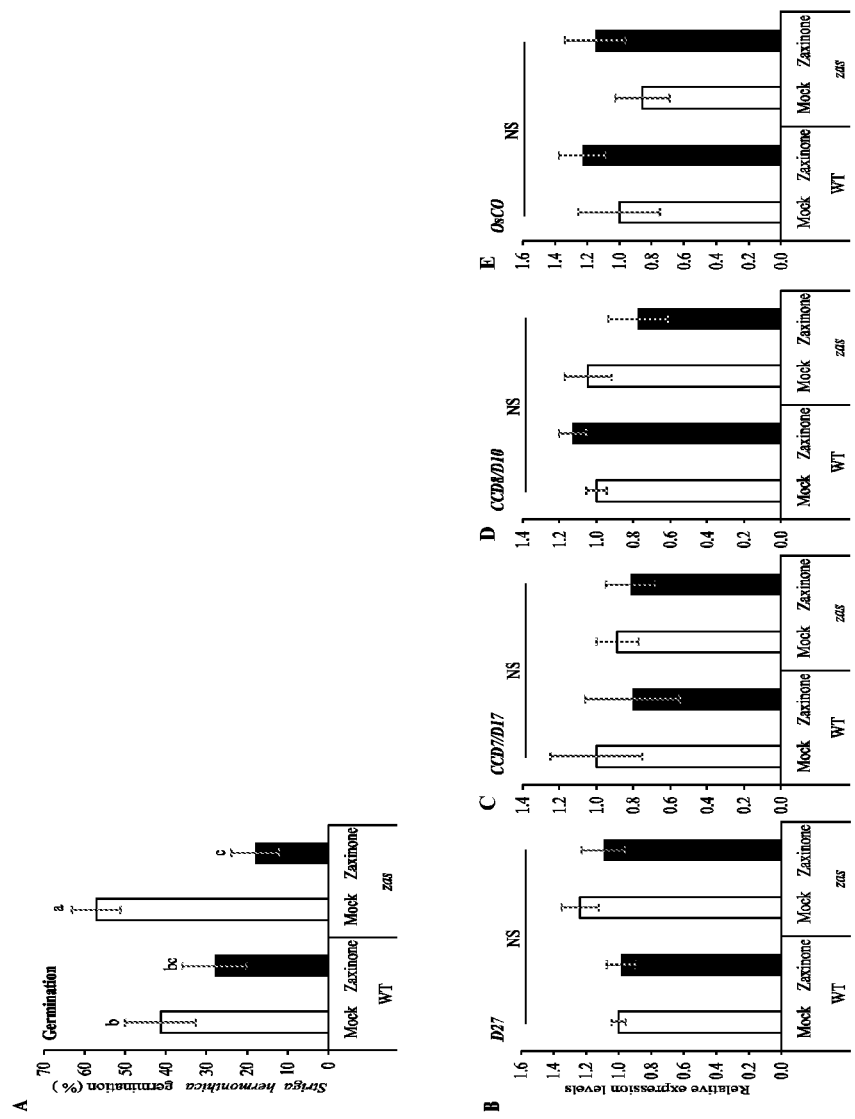
FIG. 20A shows the effect of zaxinone on Striga germination.
FIG. 20B-E shows transcript level SL biosynthetic gene expression in Nipponbare wild-type (WT) and zas mutant in normal +Pi conditions for SL biosynthesis genes (D27, CCD7, CCD8 and CO).

FIG. 20 shows the effect of zaxinone on Striga germination and SL biosynthetic gene expression in Nipponbare wild-type (WT) and zas mutant in normal phosphorus (+Pi) conditions. FIG. 20A shows the percentage of Striga hermonthica seed germination in root exudates from mock treated (0.1% acetone) wild-type (WT/Con) and zas mutant (zas/Con), and with root exudates from zaxinone treated wild-type (WT/Zax) and zas mutants (zas/Zax), wherein the root exudates were diluted 9 times. Root exudates of zas seedlings (zas/Con) under normal phosphorus conditions were found to supply higher (30%) germinating activity compared to the germinating activity for wild-type (WT/Con), as seen in FIG. 20A. Under these conditions, zaxinone application (5 µM) decreased germinating activity of zas exudates (zas/Zax) to a level below that of the wild-type sample (WT/Zax). (FIG. 20A). These data demonstrate that zaxinone is a negative regulator of rice SL biosynthesis and release. Data are means±SD, n=4 (50 to 100 seeds per replicate).

FIGS. 20B-E show the transcript levels of SL biosynthesis genes for D27 (FIG. 20B), CCD7 (FIG. 20C), CCD8 (FIG. 20D) and CO (Carlactone oxidase—FIG. 20E) in root tissues under normal phosphorus (+Pi) conditions. Three week-old seedlings were grown in normal +Pi solution and then transferred to new vials containing fresh +Pi solution with and without 5 µM zaxinone for 6 h and samples were collected. The expression levels were detected by qRT-PCR. Ubiquitin was used as a reference gene and the expression levels in the WT-mock were normalized to 1. Bars represent mean±SD (n=3). Mock treatment (0.1% acetone). Different letters above each bar denote significant difference following a One-way ANOVA test (P<0.05). Possibly due to the generally very low level of the investigated transcripts, a difference was not detected in this regard between zas mutant and wild-type plants nor was there a pronounced effect of zaxinone application under normal phosphorus supply.

Example 8: Effect of ZAS Transcript Levels and Zaxinone on Mycorrhization of Rice Roots The impact of zaxinone on SL biosynthesis and release, together with up-regulation of ZAS transcript in rice mycorrhizal roots indicates a role of this enzyme during mycorrhization. ZAS transcript levels were determined in wild-type rice roots during different stages of colonization by the arbuscular mycorrhizal (AM) fungus, *Rhizophagus irregularis*.

Figure 21:
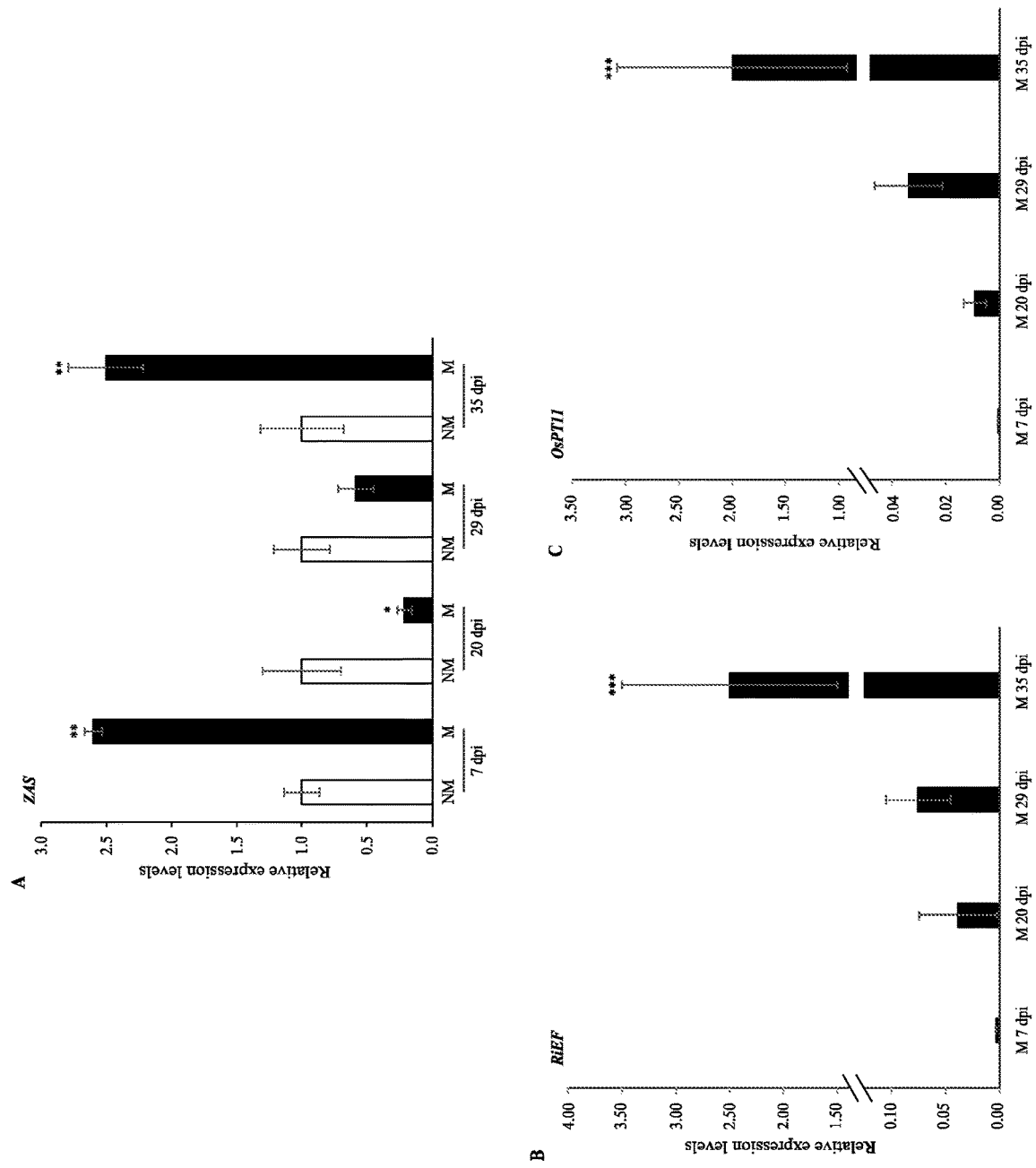
FIG. 21A-C shows ZAS expression analysis assessed by qRT-PCR in a time course experiment of WT mycorrhizal root.

As shown in FIG. 21A, ZAS transcript abundance in mycorrhizal roots (M) increased at early and late stages of the colonization process: at 7 days, when the fungus is not yet colonizing the root, and at 35 days when the fungal arbuscles are abundant, and lower levels were seen in the interval. ZAS expression analysis assessed by qRT-PCR is shown in a time course experiment of wild-type mycorrhizal root. FIG. 21A shows the relative expression of ZAS was evaluated in qRT-PCR during a time-course experiment performed on Nipponbare wild-type (WT) roots colonized by *R. irregularis* from 7 to 35 days-post-inoculation (dpi). Data are the average of four biological replicates and the bars represent ±SE. One-way analysis of variance (ANOVA) and Tukey's post hoc test were performed considering data coming from single time point. Asterisks indicate significant differences, *P<0.05, P<0.01, *P<0.001.

The relative expression of RiEF (fungal housekeeping) (FIG. 21B) and OsPT11 (AM marker gene) (FIG. 21C) was evaluated in qRT-PCR to evaluate the level of mycorrhization in the different time points. Both of these markers were seen to increase over time indicating an increase in the level of mycorrhization. Data are the average of four biological replicates and the bars represent ±SE. Asterisks indicate significant differences (***P<0.001).

Figure 22:
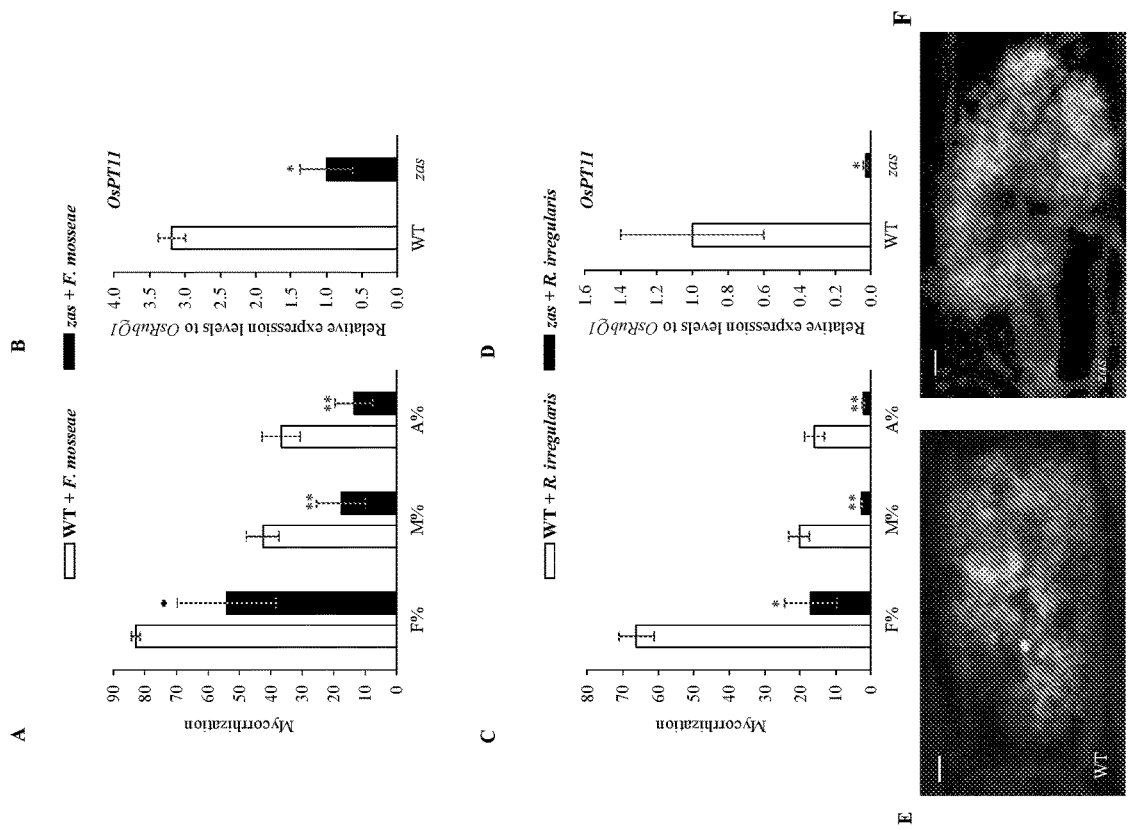
FIG. 22A-F shows mycorrhizal colonization in Nipponbare wild-type (WT) and zas mutant rice roots by the AM fungi *Funneliformis mosseae* and *Rhizophagus irregularis*.

Mycorrhization capacity of the zas mutant was investigated using two phylogenetically diverse AM fungi (*Rhizophagus irregularis* and *Funneliformis mosseae*). FIG. 22 shows mycorrhizal colonization levels in Nipponbare wild-type (WT) and zas mutant by the AM fungi *Funneliformis mosseae* and *Rhizophagus irregularis*. FIG. 22A and FIG. 22C show the degree of colonization expressed as mycorrhizal frequency (F %), intensity (M %) and arbuscule abundance (A %) in the root system of both WT and zas mutant plants for *F. mosseae* and *R. irregularis*, respectively. As seen in FIG. 22A and FIG. 22C, compared to wild-type (WT), zas mutant plants (zas) showed much lower colonization with both fungi. Data are the average of five biological replicates and ±SE are represented by bars. Asterisks indicate significant differences (One-way ANOVA test, P<0.05).

Expression level of OsPT11 gene, a plant marker of a functional symbiosis, was analyzed by qRT-PCR in mycorrhizal roots of WT and zas mutant plants for both *Funneliformis mosseae* and *Rhizophagus irregularis*. Accordingly, transcripts of the phosphate transporter used as a symbiosis marker were far less than seen in the wild-type plants (WT). The relative expression level for the mutant (zas) was less than a third of that seen for the wild-type (WT) for *F. mosseae* (FIG. 22B), and the level was barely detectable in zas roots for *R. irregularis* (FIG. 22D). Data are the average of four biological replicates and the bars represent ±SE. Asterisk indicates significant differences, with a P value <0.05

FIGS. 22E and 22F show cortical cells from WT and zas mutant plants containing mycorrhizal arbuscules, respectively. Visualization of the arbuscules was enhanced with wheat germ agglutinin-fluorescein isothiocyanate, and the scale bars are 10 µm. As seen in FIG. 22F, the disruption of ZAS did not impact the phenotype of the arbuscule for the zas mutant, which appeared well developed and regularly branched.

Figure 23:
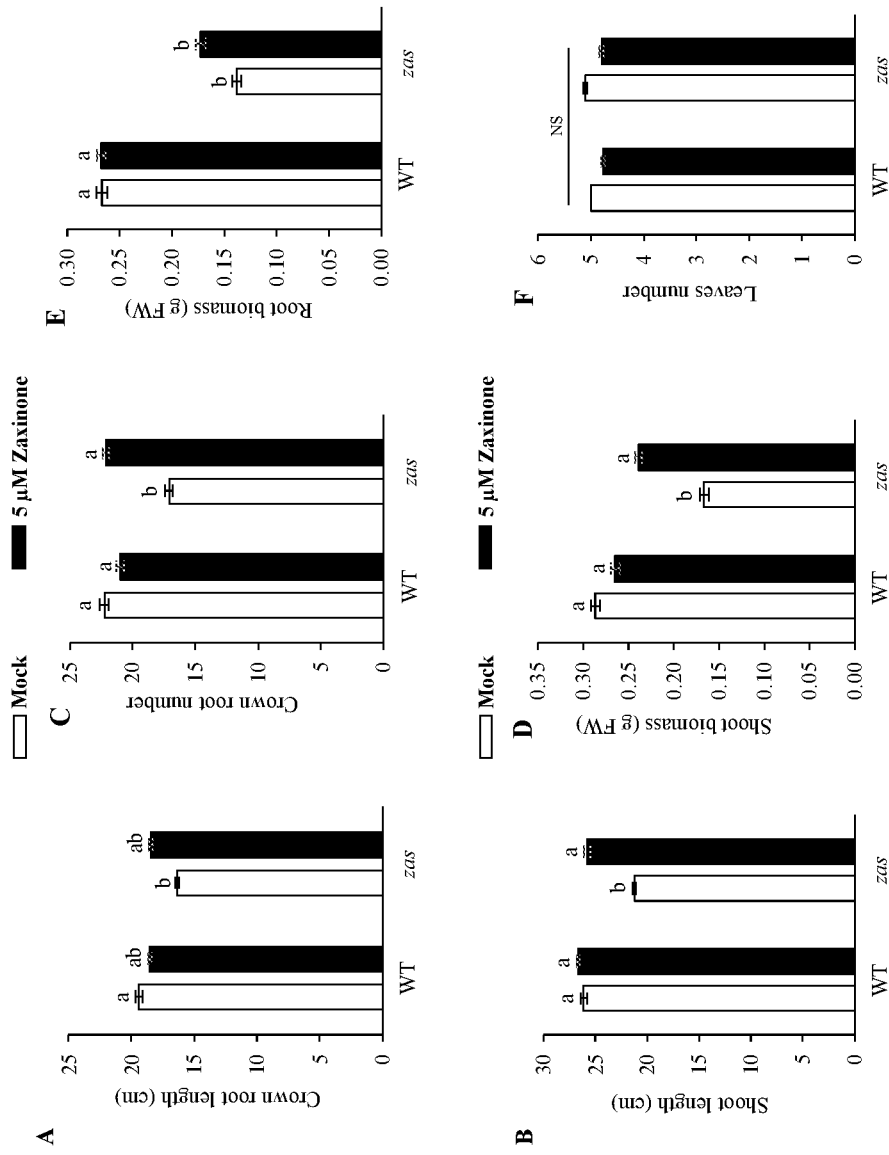
FIG. 23AF shows the effect of zaxinone on in Nipponbare wild-type (WT) and zas mutant shoot and root phenotype in mycorrizhal plants.

FIG. 23 shows the effect of zaxinone on Nipponbare wild-type (WT) and zas mutant shoot and root phenotype. Mycorrizhal plants were grown in sand and watered with Long Ashton solution (3.2 µM Pi) for five weeks post AM fungus inoculation. FIGS. 23A-23F show the effect of twice a week treatment with zaxinone (5 µM) for wild-type (WT) and zas mutant (zas) plants. Data are means±SE, n=9 plants. Different letters above the bars indicate significant differences according to Tukey's test (P<0.05).

Zaxinone treatment rescued the roots and shoots of the zas mutants, especially for the crown root number (FIG. 23C), root biomass (FIG. 23E), shoot length (FIG. 23B) and shoot biomass (FIG. 23F), each of which experienced a significant increase when treated with zaxinone. A Mock treatment (0.1% acetone) was applied twice a week for the control plants. Growth of the WT plants with zaxinone treatment did not significantly differ from that seen with Mock treatment for the WT plants.

Application of zaxinone (5 µM) did not improve the AM colonization capacity (FIG. 22), but it did rescue the root phenotype in mycorrhizal roots (FIG. 23). These results demonstrate that zaxinone is required for AM symbiosis, acting not on the fungal morphology but on the success of the colonization. It can be assumed that zaxinone formation is modulated depending on the different stages of fungal colonization, as indicated by the ZAS expression profile and that precise zaxinone-SL balance is crucial for the success of mycorrhization.

Figure 24:
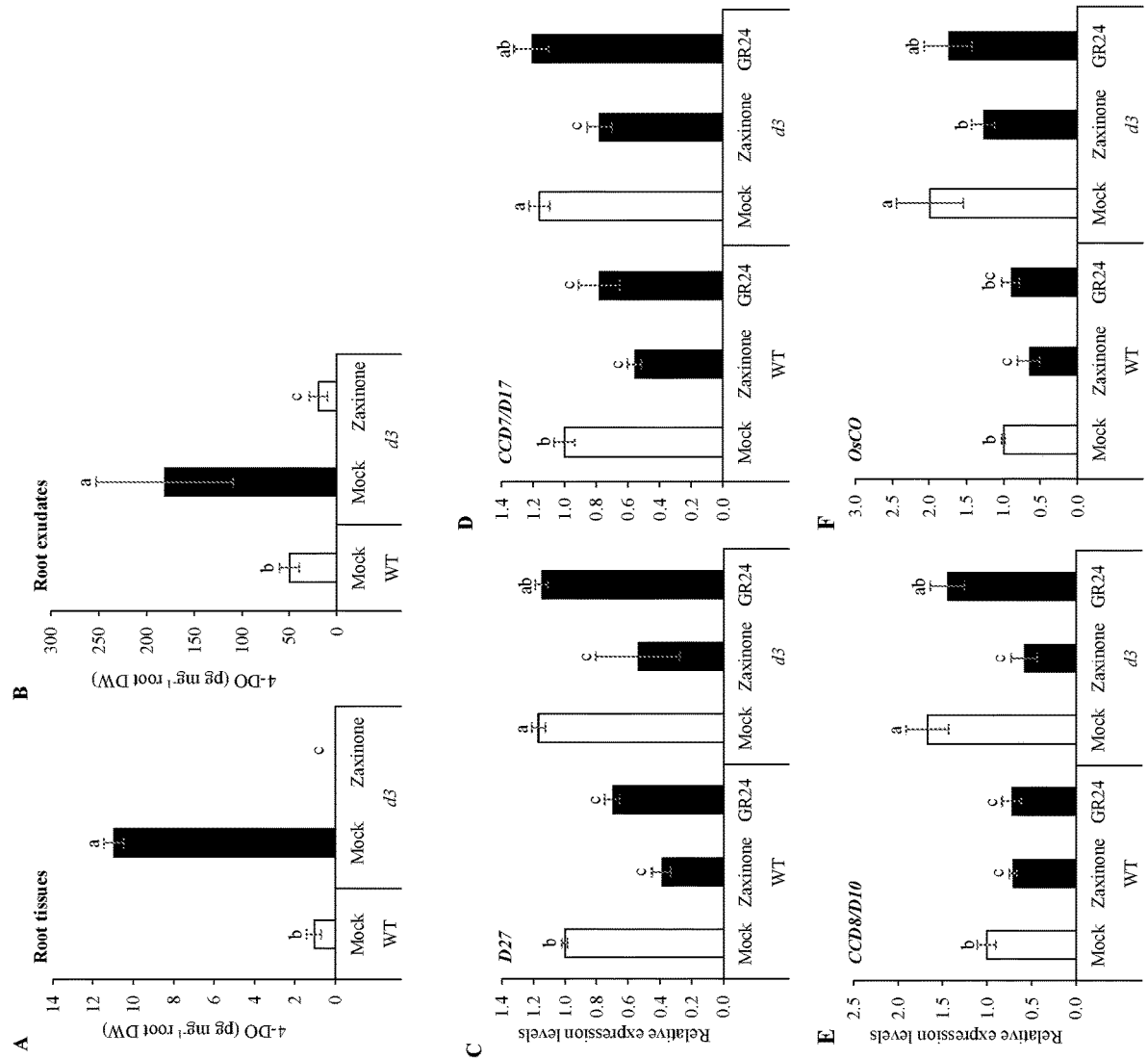
FIG. 24A-F shows the effects of Zaxinone on SL in Shiokari wild-type (WT) and d3 mutant in phosphate starved (–Pi) rice roots, and transcript levels of SL biosynthesis genes (D27, CCD7, CCD8 and CO (Carlactone oxidase) in root tissues.

Example 9: Effects of Zaxinone on SL in Shiokari Wild-Type (WT) and d3 Mutant in Phosphate-Starved (−Pi) Rice Roots To test whether zaxinone effect requires the F-box protein D3 involved in SL-dependent negative feed-back regulation of SL biosynthesis, phosphate-starved d3 mutant and corresponding wild-type seedlings were treated with zaxinone and the SL analog GR24, with a Mock treatment (0.1% acetone) used as a control, for 6 h. FIG. 24 shows the effects of zaxinone on SL in Shiokari wild-type (WT) and d3 mutant in phosphate-starved (−Pi) rice roots. FIGS. 24A and 24B show the amount of 4-DO (4-deoxyorobanchol) in root tissues (FIG. 24A) and root exudates (FIG. 24B) in response to 5 µM zaxinone treatment.

Transcript levels of SL biosynthesis genes, D27 (FIG. 24C), CCD7/D17 (FIG. 24D), CCD8/D10 (FIG. 24E) and OsCO (Carlactone oxidase—FIG. 24F) in root tissues were collected for SL quantification. The expression levels were detected by qRT-PCR. Ubiquitin was used as a reference gene and the expression levels in the WT-mock were normalized to 1. Two week-old seedlings were grown for another one week in −Pi solution and then transferred to new vials containing fresh −Pi solution with and without 5 µM of zaxinone and GR24 for 6 h and samples were collected. Bars represent mean±SD (n=3). Different letters above each bar denote significant difference following a One-way ANOVA test ($P<0.05$).

Zaxinone application lowered SL content in d3 roots and root exudates and decreased SL transcript levels in roots of both wild-type and d3 seedlings (FIGS. 24A and 24B), while the Mock treatment did not decrease the SL transcript levels for either the zas mutant root tissues or root exudates.

Figure 14:
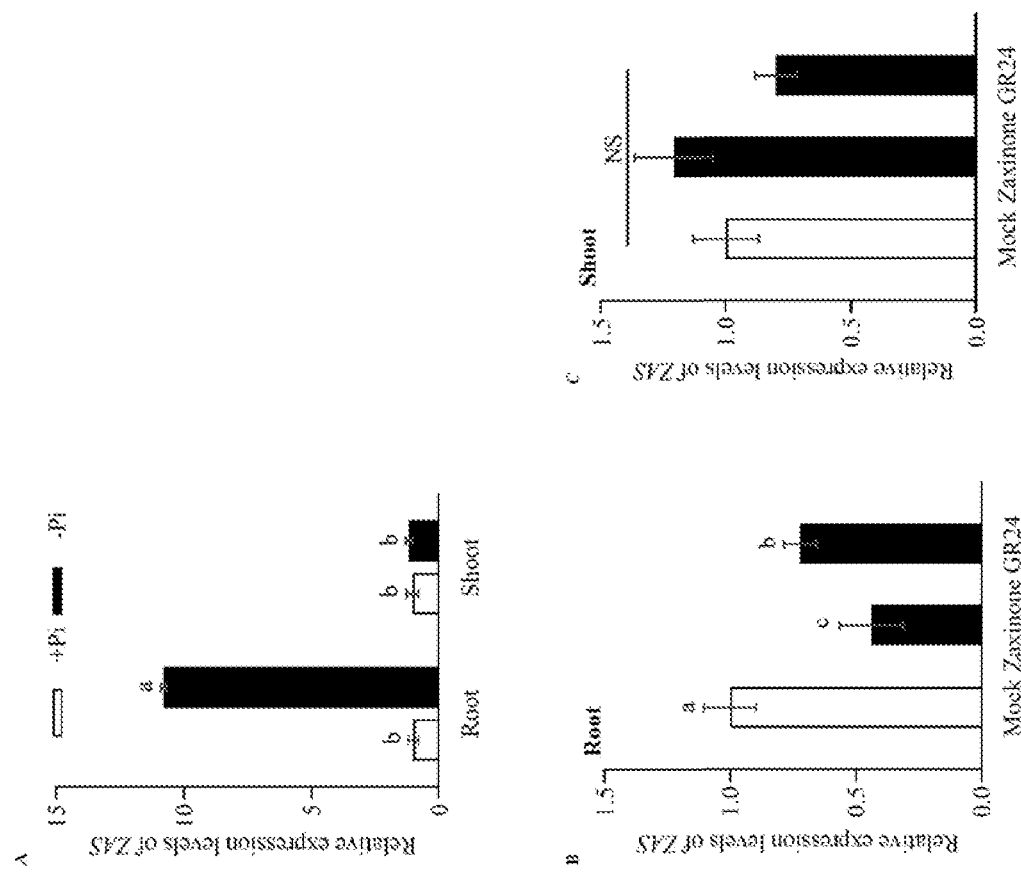
FIG. 14A-C shows bar graphs of the transcript levels of Zaxinone Synthase (ZAS) under normal (+Pi) and phosphate-starved (−Pi) conditions in Nipponbare wild-type (WT) root and shoot.

In contrast, the SL analog, GR24, affected the transcript levels only in wild-type seedlings (FIGS. 24C-24F). These results show that D3 is not required for zaxinone signal transduction. The effect of zaxinone and GR24 on ZAS transcript levels under phosphate starvation was also tested. Both compounds negatively impacted ZAS transcript levels in root tissues (FIG. 14). However, a more pronounced effect was observed upon zaxinone application. These data suggest a negative feedback regulation of ZAS transcript levels and indicate that SLs and zaxinone contents may mutually impact each other in roots under phosphate starvation.

The role of SL in the root-growth promoting effect of zaxinone was also investigated (FIG. 2D). For this purpose, the compound was applied to SL biosynthesis and perception mutants. Interestingly, zaxinone application did not promote the growth of roots in SL deficient mutants. These data demonstrate that zaxinone promotes root growth likely by suppressing SL biosynthesis. Apart from the benefit of applying zaxinone to increase crop growth and control plant architecture, this compound can also be employed to combat root parasitic weeds by inhibiting germination of the parasitic weed seeds in the soil around the crops.

In summary, zaxinone is a member of the ubiquitous family of carotenoid-derived signaling molecules and hormones. It regulates the growth and development of a major cereal crop by determining the level of SLs, which are key regulators in establishing rice architecture, mediators of biotic and abiotic stress responses and major components in the communication with beneficial symbiotic partners and harmful parasitic invaders. Besides its application potential in agriculture, zaxinone provides further understanding of rice development and provides new insights into the crucial plant/AM-fungi interplay underlying a symbiosis common in 80% of land plants. In addition to the benefit of applying zaxinone to increase crop growth, zaxinone's ability to inhibit germination of root parasitic weed seeds, such as Striga, makes zaxinone a powerful tool to be employed for combating root parasitic weeds.

Those in the art will understand that a number of variations may be made in the disclosed embodiments, all without departing from the scope of the invention, which is defined solely by the appended claims. Disclosed are materials, compositions, and components that can be used for, can be used in conjunction with, can be used in preparation for, or are products of the disclosed methods and compositions. These and other materials are disclosed herein, and it is understood that when combinations, subsets, interactions, groups, etc. of these materials are disclosed that while specific reference of each various individual and collective combinations and permutations of these compounds may not be explicitly disclosed, each is specifically contemplated and described herein.

What is claimed is:

1. A method for inhibiting growth of a root parasitic weed comprising the step of:
applying a negative regulator of strigolactone plant hormones comprising 3-OH-β-apo-13-carotenone to a soil or growth medium to inhibit germination of one or more seed of one or more root parasitic weed of an Orobanchaceae family.

2. The method of claim 1, wherein the 3-OH-β-13-carotenone is applied to: (a) a soil or growth medium for a cereal, grain or vegetable crop that is susceptible to said one or more root parasitic weed of the Orobanchaceae family in a manner suitable to reach a root region of the cereal, grain or vegetable crop; (b) the soil or growth medium as a liquid, emulsion, diluted concentrate, powder, granular or crystalline formulation; (c) the soil or growth medium at a concentration of 1 µM to 100 µM; or (d) the soil or growth medium of the cereal, grain, or vegetable crop before planting, during planting, after planting, or any combination thereof.

3. The method of claim 1, wherein the root parasitic weed is a *Striga* species or an *Orobanche* species.

4. The method of claim 1, wherein the cereal, grain or vegetable crop is maize, sorghum, pearl millet, millet, rice, wheat, oats, barley, sunflower, tomato, sugarcane, tobacco, potato, sweet potato, hemp, clover, melon, legume, bean, pea or peanut.

5. The method of claim 2, wherein the 3-OH-β-apo-13-carotenone is applied to the soil or growth medium before planting the cereal, grain or vegetable crop.

6. The method of claim 1, comprising the step of:
applying a negative regulator of strigolactone plant hormones to a soil or growth medium to inhibit germination of one or more seed of a root parasitic weed of an Orobanchaceae family.

7. The method of claim 6, wherein the negative regulator of strigolactone plant hormones comprises 3-OH-β-apo-13-carotenone.

8. The method of claim 7, wherein the 3-OH-β-apo-13-carotenone is applied to the soil or growth medium for a cereal, grain or vegetable crop that is susceptible to one or more root parasitic weed of the Orobanchaceae family.

9. The method of claim 8, wherein: (a) the root parasitic weed is a *Striga* species or an *Orobanche* species; (b) the 3-OH-β-apo-13-carotenone is applied to the soil or growth medium in a manner sufficient to reach a root region of the cereal, grain or vegetable crop; (c) wherein the cereal, grain or vegetable crop is maize, sorghum, pearl millet, millet, rice, wheat, oats, barley, sunflower, tomato, sugarcane, tobacco, potato, sweet potato, hemp, clover, melon, legume, bean, pea or peanut; (d) the 3-OH-β-apo-13-carotenone is applied to the soil or growth medium at a concentration of 1 µM to 100 µM; (e) the 3-OH-β-apo-13-carotenone is applied to the soil or growth medium as a liquid, emulsion, diluted concentrate, powder, granular or crystalline formulation or (f) the 3-OH-β-apo-13-carotenone is applied to the soil or growth medium of the cereal, grain, or vegetable crop before planting, during planting, after planting, or any combination thereof.

10. The method of claim 9, wherein the 3-OH-β-apo-13-carotenone is applied to the soil or growth medium of the cereal, grain, or vegetable crop before planting.

11. A method of down-regulating biosynthesis and release of strigolactone plant hormones in a cereal, grain or vegetable plant comprising the step of:
contacting a soil or growth medium adjacent to said cereal, grain or vegetable plant with a negative regulator of strigolactone plant hormones comprising 3-OH-β-apo-13-carotenone.

12. The method of claim 11, wherein: (a) the 3-OH-β-apo-13-carotenone decreases the biosynthesis and release of strigolactone plant hormones from the cereal, grain or vegetable plant; (b) wherein the root parasitic weed is a *Striga* species or an *Orobanche* species of the Orobanchaceae family or (c) the 3-OH-β-apo-13-carotenone is applied to the soil or growth medium at a concentration of 1 μM to 100 μM.

13. The method of claim 12, wherein decreasing the release of strigolactone plant hormones inhibits germination of one or more seed of a root parasitic weed of an Orobanchaceae family in the soil or growth medium adjacent said cereal, grain or vegetable plant.

14. The method of claim 12, wherein the biosynthesis and release of strigolactone plant hormones from the cereal, grain or vegetable plant is decreased by 40% to 75% over an untreated cereal, grain or vegetable plant.

15. The method of claim 11, wherein (a) the 3-OH-β-apo-13-carotenone decreases the biosynthesis and release of strigolactone plant hormones from the cereal, grain or vegetable plant; or (b) wherein the concentration of the 3-OH-β-apo-13-carotenone contacting the soil or growth medium is 1 μM to 100 μM.

16. The method of claim 15, wherein: (a) decreasing the release of strigolactone plant hormones from the cereal, grain or vegetable plant inhibits germination of one or more seed of a root parasitic weed of an Orobanchaceae family residing in the soil or growth medium adjacent said cereal, grain or vegetable plant; or (b) the biosynthesis and release of strigolactone plant hormones from the cereal, grain or vegetable plant is decreased by 40% to 75% over an untreated cereal, grain or vegetable plant.

17. The method of claim 16, wherein the root parasitic weed is a *Striga* species or an *Orobanche* species of the Orobanchaceae family.

18. A method of preventing or reducing infestation of a crop by one or more root parasitic weeds of an Orobanchaceae family comprising the step of:
contacting a soil or growth medium adjacent a root region of a cereal, grain or vegetable crop with 3-OH-β-apo-13-carotenone.

19. The method of claim 18, wherein the 3-OH-β-apo-13-carotenone decreases biosynthesis and release of strigolactone plant hormones from one or more roots of said cereal, grain or vegetable crop, wherein decreasing the biosynthesis and release of strigolactone plant hormones from the cereal, grain or vegetable plant inhibits germination of one or more seeds of said root parasitic weeds residing in the soil or growth medium of the cereal, grain or vegetable crop, thereby preventing or reducing infestation by said root parasitic weeds.

* * * * *